(12) United States Patent
Fischler et al.

(10) Patent No.: US 10,341,568 B2
(45) Date of Patent: Jul. 2, 2019

(54) USER INTERFACE TO ASSIST THREE DIMENSIONAL SCANNING OF OBJECTS

(71) Applicant: QUALCOMM Incorporated, San Diego, CA (US)

(72) Inventors: Matthew Fischler, San Diego, CA (US); Arthur Pajak, San Diego, CA (US); Mithun Kumar Ranganath, San Diego, CA (US); Sairam Sundaresan, San Diego, CA (US); Michel Adib Sarkis, San Diego, CA (US); Scott Beith, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 15/459,924

(22) Filed: Mar. 15, 2017

(65) Prior Publication Data
US 2018/0103209 A1 Apr. 12, 2018

Related U.S. Application Data

(60) Provisional application No. 62/406,331, filed on Oct. 10, 2016.

(51) Int. Cl.
*G06T 7/55* (2017.01)
*G06T 19/00* (2011.01)
(Continued)

(52) U.S. Cl.
CPC ..... *H04N 5/23293* (2013.01); *G06F 3/04815* (2013.01); *G06F 3/04845* (2013.01);
(Continued)

(58) Field of Classification Search
CPC ........... H04N 5/23222; H04N 5/23238; H04N 5/23293–5/232945; H04N 13/211; H04N 13/221; G06F 3/04815
See application file for complete search history.

(56) References Cited

U.S. PATENT DOCUMENTS 6,101,272 A    8/2000 Noguchi
6,186,948 B1   2/2001 Kamiyama et al.
(Continued)

FOREIGN PATENT DOCUMENTS

CN    102364953 A    2/2012
CN    102387371 A    3/2012
(Continued)

OTHER PUBLICATIONS

Anonymous: "Hands on with Trnio, the Smartphone 3D Scanner", Jun. 30, 2014, XP055427447, Retrieved from the Internet: URL: http://www.fabbaloo.com/blog/2014/6/29/hands-on-with-trnio-the-smartphone-3d-scanner [retrieved on Nov. 21, 2017], 4 pages.
(Continued)

*Primary Examiner* — Paul M Berardesca
(74) *Attorney, Agent, or Firm* — Paradice and Li LLP

(57) ABSTRACT

Methods and apparatuses are disclosed for assisting a user in performing a three dimensional scan of an object. An example user device to assist with scanning may include a processor. The user device may further include a scanner coupled to the processor and configured to perform a three dimensional scan of an object. The user device may also include a display to display a graphical user interface, wherein the display is coupled to the processor. The user device may further include a memory coupled to the processor and the display, the memory including one or more instructions that when executed by the processor cause the graphical user interface to display a target marker for a three dimensional (3D) scan and display a scanner position marker to assist in moving the scanner to a preferred location and direction.

27 Claims, 33 Drawing Sheets

(51) Int. Cl.
  *H04N 5/232* (2006.01)
  *G06F 3/0481* (2013.01)
  *G06F 3/0484* (2013.01)
  *H04N 13/221* (2018.01)

(52) U.S. Cl.
  CPC .............. *G06T 7/55* (2017.01); *G06T 19/006* (2013.01); *H04N 5/23222* (2013.01); *H04N 5/23248* (2013.01); *H04N 13/221* (2018.05); *G06F 2203/04806* (2013.01)

(56) References Cited

U.S. PATENT DOCUMENTS

| | | |
|---|---|---|
| 6,281,904 B1 | 8/2001 | Reinhardt et al. |
| 6,297,825 B1 | 10/2001 | Madden et al. |
| 6,469,710 B1 | 10/2002 | Shum et al. |
| 6,476,803 B1 | 11/2002 | Zhang et al. |
| 6,487,304 B1 | 11/2002 | Szeliski |
| 6,750,873 B1 | 6/2004 | Bernardini et al. |
| 8,036,441 B2 | 10/2011 | Frank et al. |
| 8,149,268 B1 | 4/2012 | Meyers et al. |
| 8,326,035 B2 | 12/2012 | Ubillos et al. |
| 8,471,890 B1 | 6/2013 | Golas |
| 8,587,583 B2 | 11/2013 | Newcombe et al. |
| 8,909,625 B1 | 12/2014 | Stewenius |
| 8,941,652 B1 | 1/2015 | Allen et al. |
| 9,147,279 B1 | 9/2015 | Bruce et al. |
| 2003/0001837 A1 | 1/2003 | Baumberg |
| 2004/0189686 A1 | 9/2004 | Tanguay et al. |
| 2005/0057561 A1 | 3/2005 | El-Din et al. |
| 2005/0140670 A1 | 6/2005 | Wu et al. |
| 2005/0285872 A1 | 12/2005 | Wang et al. |
| 2006/0087517 A1 | 4/2006 | Mojsilovic |
| 2007/0132874 A1 | 6/2007 | Forman et al. |
| 2010/0074532 A1 | 3/2010 | Gordon et al. |
| 2010/0156834 A1 | 6/2010 | Sangster |
| 2010/0223032 A1 | 9/2010 | Reghetti et al. |
| 2011/0187820 A1 | 8/2011 | Gilboa et al. |
| 2012/0177269 A1 | 7/2012 | Lu et al. |
| 2012/0182392 A1 | 7/2012 | Kearns et al. |
| 2012/0300020 A1 | 11/2012 | Arth et al. |
| 2013/0004060 A1 | 1/2013 | Bell et al. |
| 2013/0100119 A1 | 4/2013 | Evertt et al. |
| 2013/0136341 A1 | 5/2013 | Yamamoto |
| 2013/0148851 A1 | 6/2013 | Leung et al. |
| 2013/0253325 A1 | 9/2013 | Call et al. |
| 2013/0272570 A1 | 10/2013 | Sheng et al. |
| 2013/0286161 A1 | 10/2013 | Lv et al. |
| 2013/0293686 A1 | 11/2013 | Blow et al. |
| 2013/0314501 A1 | 11/2013 | Davidson et al. |
| 2013/0322767 A1 | 12/2013 | Chao et al. |
| 2013/0336589 A1 | 12/2013 | Takahashi et al. |
| 2014/0002597 A1 | 1/2014 | Taguchi et al. |
| 2014/0037140 A1 | 2/2014 | Benhimane et al. |
| 2014/0132715 A1 | 5/2014 | Raghoebardayal et al. |
| 2014/0168262 A1 | 6/2014 | Forutanpour et al. |
| 2014/0210947 A1 | 7/2014 | Finn et al. |
| 2014/0219551 A1 | 8/2014 | Tang |
| 2014/0225985 A1 | 8/2014 | Klusza et al. |
| 2014/0267618 A1 | 9/2014 | Esteban et al. |
| 2014/0270480 A1 | 9/2014 | Boardman et al. |
| 2014/0321702 A1 | 10/2014 | Schmalstieg |
| 2014/0368620 A1* | 12/2014 | Li .................... H04N 5/23293 348/50 |
| 2015/0049083 A1 | 2/2015 | Bidne et al. |
| 2015/0098645 A1 | 4/2015 | Leung |
| 2015/0178988 A1 | 6/2015 | Montserrat et al. |
| 2015/0187140 A1 | 7/2015 | Tseng et al. |
| 2015/0221126 A1 | 8/2015 | Liu et al. |
| 2015/0302601 A1 | 10/2015 | Rivet-Sabourin et al. |
| 2016/0005211 A1 | 1/2016 | Sarkis et al. |
| 2016/0086336 A1 | 3/2016 | Lin et al. |
| 2016/0171767 A1 | 6/2016 | Anderson |
| 2016/0221262 A1 | 8/2016 | Das et al. |
| 2016/0232715 A1 | 8/2016 | Lee |
| 2016/0323557 A1* | 11/2016 | Drazic ................ H04N 13/221 |
| 2016/0335782 A1 | 11/2016 | Sundaresan |
| 2016/0335792 A1 | 11/2016 | Forutanpour |
| 2016/0335809 A1 | 11/2016 | Forutanpour et al. |

FOREIGN PATENT DOCUMENTS

| | | |
|---|---|---|
| EP | 1022654 A2 | 7/2000 |
| EP | 2545411 B1 | 2/2014 |
| JP | 2010020487 A | 1/2010 |
| WO | WO-9926198 A2 | 5/1999 |
| WO | WO-2013165440 A1 | 11/2013 |

OTHER PUBLICATIONS

Anonymous: "Microsoft Can Turn Your Smartphone Camera into a 3D Scanner—SPAR 3D", Aug. 26, 2015, XP055427454, Retrieved from the Internet: URL:https://www.spar3d.com/news/hardware/vol13no34-microsoft-mobilefusion-smartphone-camera-3d-scanner/ [retrieved on Nov. 21, 2017], 3 pages.

Anonymous: "TRNIO: Kosten Loser 3D-Scanner fUr iPhone und iPad—3Druck.com", Jun. 28, 2014, XP055427816, Retrieved from the Internet: URL:https://3druck.com/programme/trnio-kostenloser-3d-scanner-fuer-iphone-and-ipad-2920153/ [retrieved on Nov. 22, 2017], 1 page.

International Search Report and Written Opinion—PCT/US2017/050549—ISA/EPO—dated Dec. 7, 2017 (165629WO).

Alshawabkeh Y., et al., "Automatic Multi-Image Photo-Texturing of Complex 3D Scenes," International Symposium CIPA 2005, Sep. 26, 2005 (Sep. 26, 2005), pp. 1-6, XP007914583, section 3.3 Summary of the Overall Procedure.

ARTEC Group: "Artec Studio 9 User Guide v 9.2," Jun. 5, 2014 (Jun. 5, 2014), XP055213485, 135 pages, Retrieved from the Internet: URL:http://artec-group.com/sw/ug/ug.pdf.

BAUMBERG A, "Blending images for texturing 3D models", In BMVC 2002, Canon Research Centre Europe, 2002, pp. 404-413.

Benhimane S., et al., "Real-Time Image-Based Tracking of Planes using Efficient Second-Order Minimization," Intelligent Robots and Systems (IROS 2004), Proceedings of IEEE/RSJ International Conference on , 2004, vol. 1, pp. 943-948.

Berger K., et al., "A State of the Art Report on Kinect Sensor Setups in Computer Vision," Time-of-Flight and Depth Imaging Sensors, Algorithms, and Applications, Lecture Notes in Computer Science, 2013, vol. 8200, pp. 257-272.

Cooper T., et al., "Novel Approach to Color Cast Detection and Removal in Digital Images", Optomechatronic Micro/Nano Devices and Components III : Oct. 8-10, 2007, Lausanne, Switzerland, [Proceedings of SPIE , ISSN 0277-786X], Spie, Bellingham, Wash, vol. 3963, 2000, pp. 167-177, XP002471492, DOI: 10.1117/12.373394 ISBN: 978-1-62841-730-2 the whole document.

"Dense Visual SLAM," Technical University of Munich, Retrieved date Jan. 5, 2014, Retrieved from the Internet URL: http://vision.in.tum.de/data/software/dvo pp. 4.

Du H., et al., "Interactive 3D Modeling of Indoor Environments with a Consumer Depth Camera," Proceedings of the 13th International Conference on Ubiquitous Computing, Sep. 17, 2011 (Sep. 17, 2011), pp. 75-84, XP055163337, DOI: 10.1145/2030112.2030123 ISBN: 978-1-45-030630-0 abstract p. 76, left-hand column, line 15—line 37 p. 76, right-hand column, line 4—p. 77, right-hand column, line 11 p. 78, right-hand column, line 3—p. 79, right-hand column, line 31.

Gasparini F., et al., "Color Balancing of Digital Photos Using Simple Image Statistics", Pattern Recognition, Elsevier, GB, vol. 37, No. 6, Jun. 2004 (Jun. 2004), pp. 1201-1217, XP004505321, ISSN: 0031-3203, DOI: 10.1016/J.PATCOG.2003.12.007 the whole document.

Gorman M, "Lynx A 3D point-and-shoot camera/tablet does motion capture and 3D modeling, we go hands-on," Apr. 17, 2013, pp. 3.

Grammatikopoulos L., et al., "Automatic Multi-View Texture Mapping of 3d Surface Projections", Department of Surveying, Athens, Greece, 2007, 6 Pages.

(56) References Cited

OTHER PUBLICATIONS

Ha J., et al., "Real-time Scalable Recognition and Tracking based on the Server-client Model for Mobile Augmented Reality," VR Innovation (ISVRI), 2011 IEEE International Symposium on, IEEE, Mar. 19, 2011 (Mar. 19, 2011), pp. 267-272, XP031861061, DOI: 10.1109/ISVRI.2011.5759649.
Herrera C D., et al., "Joint Depth and Color Camera Calibration with Distortion Correction", TPAMI, 2012, pp. 1-8.
Huo J-Y., et al., "Robust Automatic White Balance Algorithm using Gray Color Points in Images" Consumer Electronics,IEEE Transactions On, Online, vol. 52, No. 2, May 2006, pp. 541-546, XP007903612.
Kerl C., et al., "Dense Visual SLAM for RGB-D Cameras," Proceedings of IEEE/RSJ International Conference on Intelligent Robots and Systems (IROS), 2013, pp. 2100-2106.
Kerl C., et al., "Robust Odometry Estimation for RGB-D Cameras," IEEE International Conference on Robotics and Automation (ICRA), 2013, pp. 3748-3754.
Khalfaoui S., et al., "Fully Automatic 3D Digitization of unknown Objects using Progressive Data Bounding Box," Proceedings of SPIE, Feb. 9, 2012 (Feb. 9, 2012), vol. 8290,pp. 1-8, XP055213461, ISSN: 0277-786X, DOI: 10.1117/12.909164.
Kim S., et al., "Relocalization Using Virtual Keyframes for Online Environment Map Construction," Proceedings of the 16th ACM Symposium on Virtual Reality Software and Technology (VRST), Nov. 2009, pp. 127-134.
Klein G., et al., "Parallel Tracking and Mapping for Small AR Workspaces," 6th IEEE and ACM International Symposium on Mixed and Augmented Reality, 2007, XP031269901, ISMAR 2007. pp. 225-234.
Lempitsky V., et al., "Seamless Mosaicing of Image-Based Texture Maps", IEEE Conference on Computer Vision and Pattern Recognition, CVPR '07, Jun. 2007, 6 Pages.
Li M., et al., "3-D Motion Estimation and Online Temporal Calibration for Camera-IMU Systems", 2013 IEEE International Conference on Robotics and Automation (ICRA), May 6-10, 2013, pp. 5709-5716.
Neugebauer P.J., et al., "Texturing 3D Models of real World Objects from Multiple Unregistered Photographic Views," Computer Graphics Forum, Wiley-Blackwell Publishing Ltd, GB, vol. 18, No. 3, Sep. 7, 1999 (Sep. 7, 1999), p. C245, XP001034480, ISSN: 01677055, DOI: 10.1111/1467-8659.00345.
Niem W., et al., "Automatic Reconstruction of 3D Objects using a Mobile Camera," Image and Vision Computing, Elsevier, Guildford, GB, vol. 17, No. 2, Feb. 1999 (Feb. 1999), pp. 125- 134, XP002258790, ISSN: 0262-8856, DOI: 10.1016/S0262-8856(98)00116-4 p. 131.
Ofek E., et al., "Multiresolution Textures from Image Sequences," IEEE Computer Graphics and Applications, IEEE Service Center, New York, NY, US, vol. 17, No. 2, Mar. 1997 (Mar. 1997), pp. 18-29, XP000927819, ISSN: 0272-1716, DOI: 10.1109/38.574667 pp. 20,21.
Pighin F., et al., "Synthesizing Realistic Facial Expressions from Photographs", SIGGRAPH '98: Proceedings of the 25th annual conference on Computer graphics and interactive techniques, Jul. 1998, 10 Pages.
Pulli K., et al., "Acquisition and Visualization of Colored 3D Objects," Pattern Recognition, 1998, Proceedings. Fourteenth International Conference on Brisbane, QLD., Australia Aug. 16-20, 1998, Los Alamitos, CA, USA,IEEE Computer Society, US, vol. 1, Aug. 16, 1998 (Aug. 16, 1998), pp. 11-15, XP010297445, DOI: 10.1109/ICPR.1998.711067 ISBN: 978-0/8186-8512-5.
ROHS M., "Marker-Based Embodied Interaction for Handheld Augmented Reality Games", JVRB Journal of Virtual Reality and Broadcasting, Feb. 6, 2007, Retrieved from Internet on Oct. 24, 2016, https://www.jvrb.org/pastissues/4.2007/793, pp. 1-15.
Shinozaki M., et al., "Correction of Color Information of a 3D Model using a Range Intensity Image," Computer Vision and Image Understanding, 2009, vol. 113, pp. 1170-1179.
Vacchetti L., et al., "Fusing Online and Offline Information for Stable 3D Tracking in Real-time," Proceedings / 2003 IEEE Computer Society Conference on Computer Vision and Pattern Recognition, Jun. 18-20, 2003,Madison, Wisconsin; [Proceedings of the IEEE Computer Conference on Computer Vision and Pattern Recognition], Los Alamitos, Calif. U .A, vol. 2, Jun. 18, 2003 (Jun. 18, 2003), pp. 241-248, XP010644679, DOI: 10.1109/CVPR.2003.1211476, ISBN: 978-0/7695-1900-5, the whole document.
Weng C-C., et al., "A Novel Automatic White Balance Method for Digital Still Cameras", Conference Proceedings / IEEE International Symposium on Circuits and Systems (ISCAS) : May 23-26, 2005, International Conference Center, Kobe, Japan, IEEE Service Center, Piscataway, NJ, May 23, 2005 (May 23, 2005), pp. 3801-3804, XP010816492, DOI: 10.1109/ISCAS.2005.1465458 ISBN: 978-0/7803-8834-5 section III.
Whelan T., et al., "Robust Real-Time Visual Odometry for Dense RGB-D Mapping," IEEE International Conference on Robotics and Automation (ICRA), 2013, pp. 5724-5731.
Zhang D., et al., "Photorealistic 3D Volumetric Model Reconstruction by Voxel Coloring," Sep. 1, 2010 (Sep. 1, 2010), pp. 92-97, XP055213447, Retrieved from the Internet: URL:http://www.isprs.org/proceedings/XXXVIII/part3/b/pdf/92_XXXVIII-part3B.pdf.
Gouraud H., et al., "Continuous Shading of Curved Surfaces", IEEE Transactions on Computers, vol. C-20, No. 6, Jun. 1971, pp. 87-93.
Pollefeys M., et al., "Visual Modeling with a Hand-Held Camera", International Journal of Computer Vision, Kluwer Academic Publishers, BO, vol. 59, No. 3, Sep. 1, 2004 (Sep. 1, 2004), XP002519335, pp. 207-232.

\* cited by examiner

US 10,341,568 B2

USER INTERFACE TO ASSIST THREE DIMENSIONAL SCANNING OF OBJECTS

RELATED APPLICATION

This application claims priority to U.S. Provisional Patent Application No. 62/406,331, titled "User Interface to Assist Three Dimensional Scanning of Objects," filed Oct. 10, 2016, which is hereby incorporated by reference in its entirety.

TECHNICAL FIELD

The present aspects relate generally to image processing, user interfaces, and augmented reality, and specifically to assisting with performing three dimensional scanning.

BACKGROUND

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as one or more digital still cameras, one or more digital video cameras, one or more infrared scanners, one or more ultrasound scanners, and so on. As such, these devices can include significant computing capabilities.

With such advances, three dimensional scanning and rendering of objects is becoming more available to casual users and novices. For example, in using cameras as input devices, wireless telephones, unmanned vehicles (such as drones), robots, aircraft, automobiles, mounted cameras, personal cameras, and other devices may be configured to capture images, which may be used to generate a three dimensional (3D) model of an object.

Handheld scanning devices or otherwise portable scanning devices (such as attached to an unmanned vehicle or mounted on a vehicle) can be used to perform a three dimensional (3D) scan. However, some assistance may be needed in operating such devices when performing a scan in order to ensure that sufficient information is collected in order to properly render an object.

SUMMARY

This Summary is provided to introduce in a simplified form a selection of concepts that are further described below in the Detailed Description. This summary is not intended to identify key features or essential features of the claimed subject matter, nor is it intended to limit the scope of the claimed subject matter.

Aspects of the present disclosure are directed to methods and apparatuses for assisting with performing three dimensional scanning. In one example, a user device to assist with three dimensional scanning of an object is disclosed. The user device may include a processor. The user device may further include a scanner coupled to the processor and configured to perform a three dimensional scan of the object. The user device may also include a display to display a graphical user interface, wherein the display is coupled to the processor. The user device may further include a memory coupled to the processor and the display, the memory including one or more instructions that when executed by the processor cause the graphical user interface to display a target marker for a three dimensional (3D) scan and display a scanner position marker to assist the user in moving the scanner to a preferred location and direction.

In another example, a method for performing a three dimensional scan of an object by a user device including a scanner is disclosed. The method may include displaying, on a display of the user device, a graphical user interface (GUI) to assist with scanning the object. Displaying the GUI may include displaying a target marker for the object being scanned. Displaying the GUI may also include displaying a first scanner position marker indicating a preferred position of the scanner in relation to the target marker.

In a further example, a non-transitory computer-readable storage medium for assisting with performing three dimensional scanning is disclosed. The storage medium may store one or more programs containing instructions that, when executed by one or more processors of a user device using a scanner to perform a three dimensional scan of an object, cause the user device to perform some operations. The operations may include displaying, on a display of the user device, a graphical user interface (GUI) to assist with scanning the object. Displaying the GUI may include displaying a target marker for the object being scanned. Displaying the GUI may also include displaying a first scanner position marker indicating a preferred position of the scanner in relation to the target marker, wherein at least a portion of the first scanner position marker and at least a portion of the target marker are superimposed when the scanner is at the preferred position. Displaying the GUI may further include displaying a visual boundary. The visual boundary may be used to define, for the object, a scan path for moving the scanner. Also, the first scanner position marker may be located on the visual boundary. Displaying the GUI may also include, upon the at least portion of the target marker and the at least portion of the first scanner position marker being superimposed, displaying a second scanner position marker at a new location, on the visual boundary, indicating a new preferred position of the scanner in relation to the target marker.

In another example, a user device to assist with three dimensional scanning of an object is disclosed. The user device may include a scanner for performing a three dimensional scan of the object, means for displaying a target marker for the object being scanned, and means for displaying a first scanner position marker indicating a preferred position of the scanner in relation to the target marker.

The user device may also include means for displaying a sight between the first scanner position marker and the target marker to assist a user to move the scanner to the preferred position.

The user device may further include means for superimposing at least a portion of the first scanner position marker and at least a portion of the target marker when the scanner is at the preferred position.

The user device may also include means for displaying a scanner marker to assist a user to orient the scanner relative to the target marker.

The user device may further include means for displaying a visual boundary, wherein the visual boundary is used to define, for the object, a scan path for moving the scanner, and the first scanner position marker is located on the visual boundary. The user device may also include means for determining the visual boundary based on at least one from the group consisting of type of object being scanned and contours of the object being scanned. The user device may further include means for storing a plurality of predefined visual boundaries, means for automatically determining the type of object being scanned, and means for selecting the visual boundary from the stored plurality of predefined visual boundaries based on the determination.

The user device may also include means for displaying a second scanner position marker at a new location, on the visual boundary, indicating a new preferred position of the scanner in relation to the target marker upon the at least portion of the target marker and the at least portion of the first scanner position marker being superimposed in the GUI. The user device may further include, wherein the second scanner position marker is the first scanner position marker, means for moving the first scanner position marker along a portion of the scan path, wherein the portion indicates a desired path for moving the scanner from the preferred position to the new preferred position.

The user device may also include means for displaying a first portion of a plurality of scanner position markers in a determined sequence to assist moving the scanner along the scan path, and means for adjusting a second portion of the plurality of scanner position markers based on information from the current scan while displaying the first portion, including adjusting at least one from the group consisting of: a quantity of the plurality of scanner position markers, the determined sequence for displaying scanner position markers, and a location, on the visual boundary, of one or more of the plurality of scanner position markers. Adjusting the second portion may further be based on user information from prior scans.

The user device may also include means for displaying, during the three dimensional scan, a rendering of the object from collected scan information. The user device may further include means for determining that an actual background for the object is similar to the object being scanned, and means for displaying a rendered background altered from the actual background to assist a user to distinguish the object from the actual background during scanning.

The user device may also include means for zooming in to a portion of the rendering of the object to assist a user to scan a portion of the object associated with the portion of the rendering.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Figure 1:
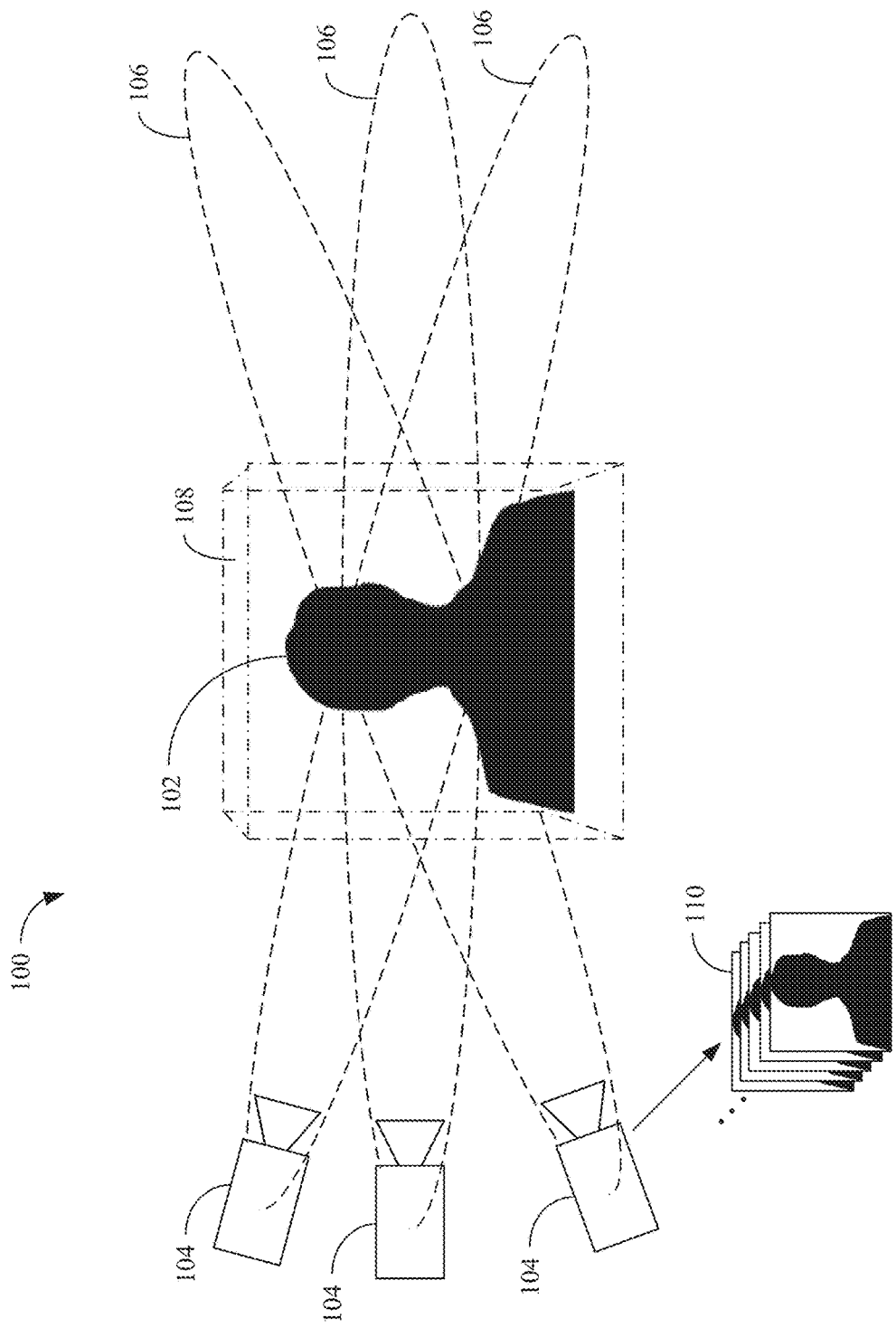
FIG. 1 is an illustration depicting an example system for performing a three dimensional (3D) scan of an object, in accordance with some aspects of the present disclosure.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice examples of the present disclosure. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example wireless communications devices may include components other than those shown, including well-known components such as a processor, memory and the like.

Handheld (or otherwise portable) scanning devices exist for performing a 3D scan of an object. Such scanners may use various input methods, including infrared, ultrasound, cameras, and so on. Using a two dimensional (2D) video or still camera for scanning purposes, image frames of an object may be collected and used to create a 3D rendition or rendering (such as a point cloud, polygon mesh, non-uniform rational B-spline surface model, and so on) for an object being scanned. The quality of the rendering may be limited by the number, quality, or positioning of the image frames. For example, holes or errors in a point cloud representing the object may exist if the captured image frames are insufficient.

A user may also have difficulty in knowing how to scan an object (or effectively scan an object in an efficient amount of time) using a 3D handheld scanning device. Thus, the user may need guidance to best scan an object. For example, a graphical user interface (GUI) may assist guiding the user in scanning an object in order to decrease the amount of time needed for scanning and/or to improve the rendering of the object. Alternatively, a vehicle (such as an unmanned vehicle) with a scanner may need commands or other movement guidance in order to move the scanner for scanning. Thus, a user device may control the vehicle in order to move the scanner during scanning.

Described below are systems and methods, which may include a graphical user interface, to assist in performing a 3D scan of an object.

FIG. 1 shows an example system 100 for performing a 3D scan of an object 102 by a scanner 104. For example, the scanner 104 may perform a 3D scan of a region 108, which includes object 102, by capturing a set or sequence of images 110. The scanner 104 may be an image capture device, such as a two-dimensional camera (2D) camera, a 3D camera, a 3D sensor, a depth-sensing camera (e.g., a Red-Green-Blue-Depth (RGB-D) camera), or any other device configured to capture images 110. In other aspects of the present disclosure, the scanner 104 may be an infrared or ultrasound transmitter and sensor. One example scanner is a device camera coupled to a laser transmitter and infrared receiver. The transmitter and receiver are used to determine depth and/or distance of object features in order to complement the images taken by the device camera. While the below examples describe capturing images when scanning, it should be understood that various methods for scanning may occur (including, e.g., sensing light or infrared energy reflected from the object to a sensor in combination with capturing RGB images). The scanner 104 may be moved around the object 102 (e.g., along paths 106) in order to capture images for different perspectives of the object. The paths 106 may be of any orientation and may be linear, curved, random, round trip, one-way, continuous, interrupted, and so on. In other aspects, multiple scanners may be used to obtain the set of captured images 110.

In the following description and examples, the scanner 104 is described as coupled to or part of a user device including one or more cameras for 3D scanning. In some aspects of the present disclosure, the user device may be a wireless communications device, such as a smartphone, personal digital assistant (PDA), tablet, laptop computer, and so on.

Figure 2:
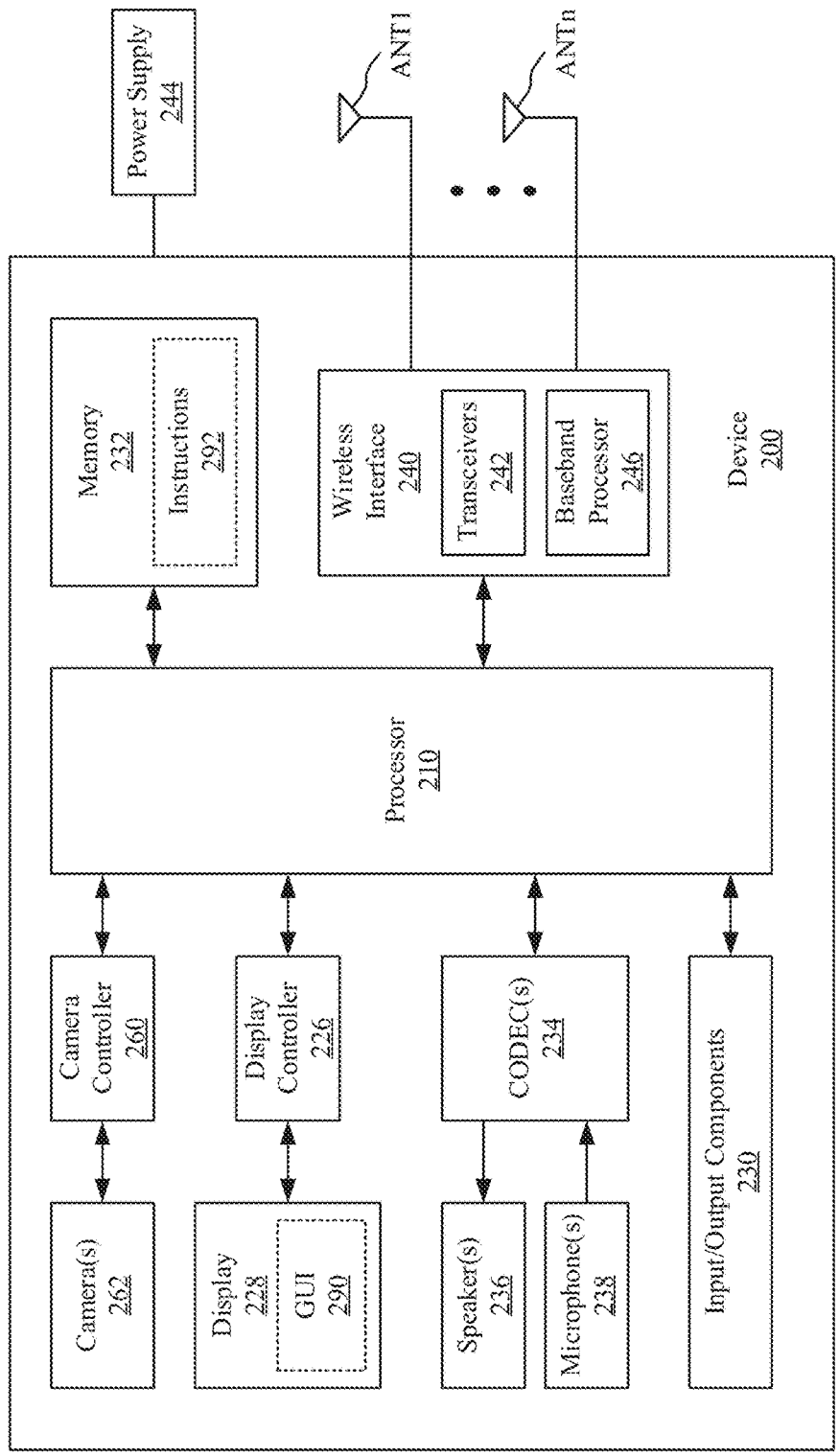
FIG. 2 is a block diagram of an example user device in FIG. 1 that may be used to perform aspects of the present disclosure.

FIG. 2 is a block diagram of an example user device 200 (such as the user device of FIG. 1) that may be used to perform aspects of the present disclosure. The user device 200 is shown to include a processor 210, a memory 232 storing instructions 292, one or more cameras (or other scanners) 262 coupled to a camera controller 260, a display 228 to provide a graphical user interface (GUI) 290, a display controller 226, one or more speakers 236 and one or more microphones 238 coupled to one or more Coder(s)/Decoder(s) (CODEC(s)) 234, a number of input/output (I/O) components 230, and a wireless interface 240 comprising a number of transceivers 242 and a baseband processor 246, the wireless interface coupled to a number of antennas (ANT1-ANTn). The user device 200 may include additional features or components not shown. The memory 232 may be a non-transient or non-transitory computer readable medium storing computer-executable instructions 292 to perform all or a portion of one or more operations described in this disclosure. The device 200 may also include a power supply 244, which may be coupled to or integrated into the device 200.

The processor 210 may be one or more suitable processors capable of executing scripts or instructions of one or more software programs (such as instructions 292) stored within memory 232. In some aspects of the present disclosure, the processor 210 may be one or more general purpose processors that execute instructions 292 to cause the device 200 to perform any number of different functions or operations. In additional or alternative aspects, the processor 210 may include integrated circuits or other hardware to perform functions or operations without the use of software.

For the wireless interface 240, the transceivers 242 may be coupled to antennas ANT1-ANTn. In some aspects, the device 200 may include an antenna selection circuit (not shown for simplicity) that can selectively couple the transceivers 242 to different antennas ANT1-ANTn. The transceivers 242 may be used to transmit signals to and receive signals from other devices including, for example, an access point, a base station, other wireless communication devices, and so on. Although not shown in FIG. 2 for simplicity, the transceivers 242 may include any number of transmit chains to process and transmit signals to other devices via antennas ANT1-ANTn, and may include any number of receive chains to process signals received from antennas ANT1-ANTn.

The baseband processor 246 may be used to process signals received from the processor 210 and the memory 232 and to forward the processed signals to transceivers 242 for transmission via one or more of antennas ANT1-ANTn, and may be used to process signals received from one or more of antennas ANT1-ANTn via transceivers 242 and to forward the processed signals to the processor 210 and the memory 232. More specifically, the baseband processor 246, which may be any suitable well-known baseband processor, encodes signals for transmission from the device 200 via the transceivers 242, and decodes signals received from other wireless devices via the transceivers 242. The transmit chains within the transceivers 242 may include mixers to up-convert signals from a baseband frequency to a carrier frequency for transmission from device 200, and the receive chains within the transceivers 242 may include mixers to down-convert received signals from the carrier frequency to the baseband frequency.

The I/O components 230 may be or include any additional suitable mechanism, interface, or device to receive input (such as commands) from the user and to provide output to the user. For example, the I/O components 230 may include (but are not limited to) a keyboard, mouse, remote, joystick, and so on. The camera controller 260 may include one or more image signal processors (not shown for simplicity) to assist in processing captures from the camera(s) 262. The camera controller 260 may further include interface circuitry that is configured to receive image frames of an object 102 of FIG. 1. The interface circuitry may correspond to circuitry that receives the captured image frames from camera(s) 262 and provides the captured image frames to the processor 210. The image frames may be used to generate a three dimensional model of the object. The camera(s) 262 may include a 2D camera, a 3D camera, a 3D sensor, a depth-sensing camera (e.g., an RGB-D camera), or any other device configured to capture images. The camera(s) 262 may further include an infrared camera, laser scanner, SONAR sensor, and so on.

The display 228 may include a GUI 290 to assist a user in performing a 3D scan of an object. In some aspects of the present disclosure, one or more instructions 292 are stored in memory 232 such that, when executed by the processor 210, cause the user device to interact with the user via the GUI 290 to assist the user in performing a 3D scan of an object 102 (FIG. 1). In some example implementations, the processor 210, the display controller 226, the camera controller 260, the memory 232, the CODEC(s) 234, and the wireless interface 240 are included in a system-in-package or system-on-chip device. A power supply 244 may be coupled to the system-on-chip device. While shown to be coupled to each other via the processor 210 in the example of FIG. 1, the processor 210, memory 232, camera controller 260, the display controller 226, I/O components 230, and wireless interface 240 may be coupled to one another in various arrangements. For example, the processor 210, memory 232, camera controller 260, the display controller 226, I/O components 230, and wireless interface 240 may be coupled to each other via one or more local buses (not shown for simplicity).

Figure 3:
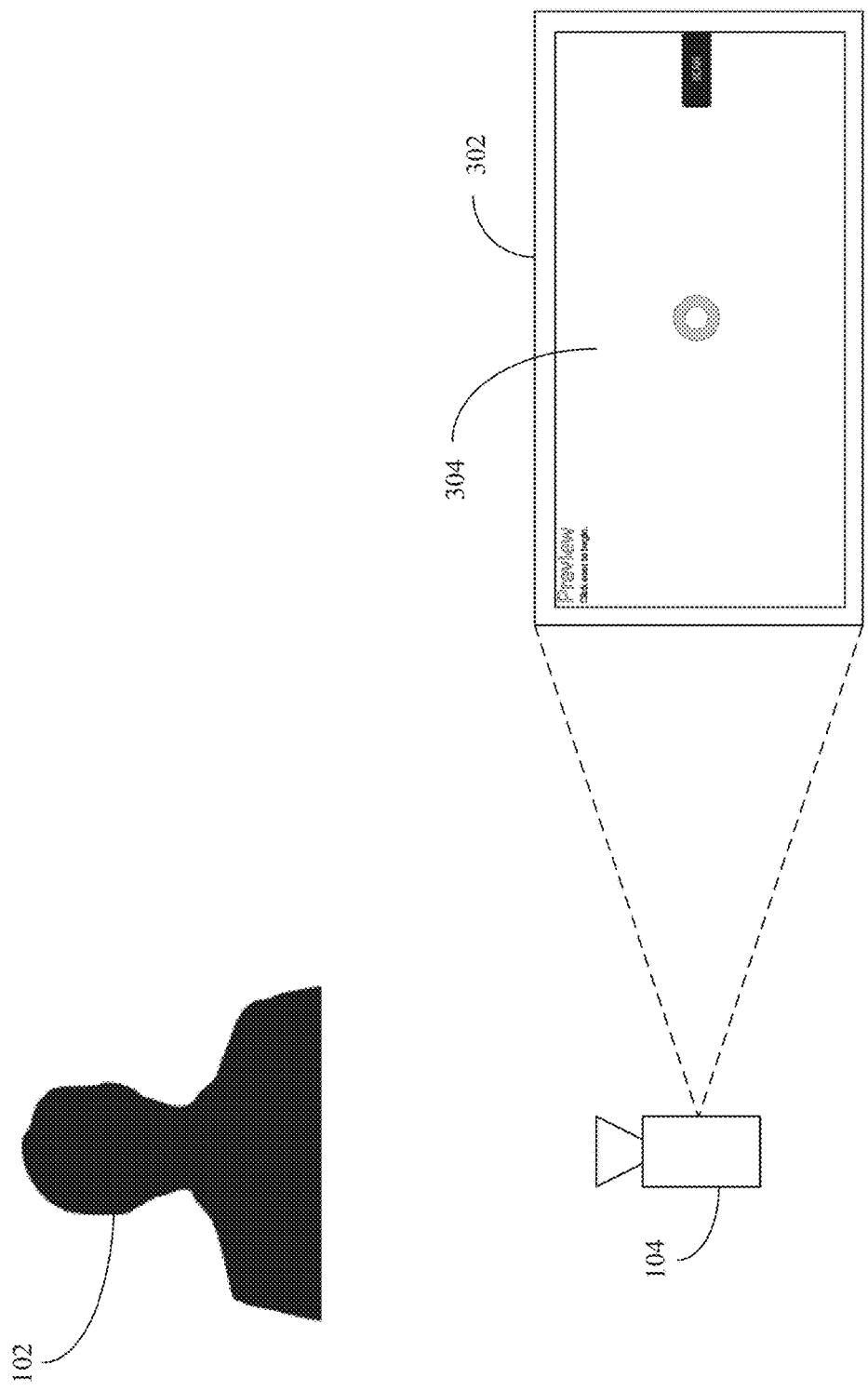
FIG. 3 is an illustration depicting an example initial setup of the system of FIG. 1 for scanning an object, in accordance with some aspects of the present disclosure.

FIG. 3 shows an example initial setup of the system 100 of FIG. 1 using a scanner 104. While the scanner 104 may utilize various scanning technologies, for explanation purposes only the scanner 104 will be discussed as a camera, such as the camera 262 of the user device 200 of FIG. 2. In some aspects of the present disclosure, the camera is part of or coupled to a user device that includes a display 302 (e.g., a touchscreen, such as display 228 in FIG. 2) in order to display a GUI 304 (such as GUI 290 in FIG. 2) in order to assist with a 3D scan of object 102.

Figure 4:
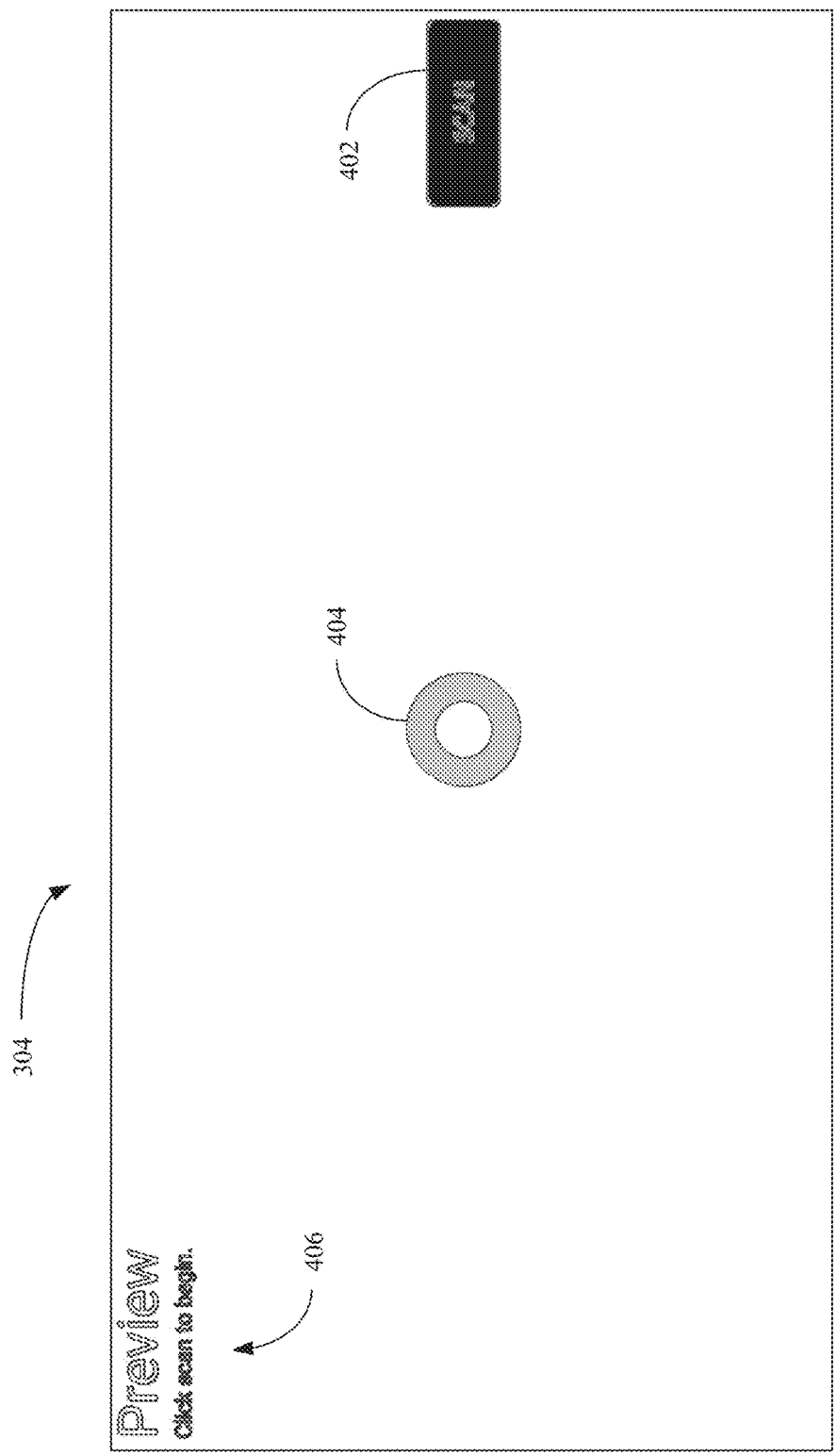
FIG. 4 is an illustration depicting an example initial display of the graphical use interface (GUI) before scanning the object, in accordance with some aspects of the present disclosure.

FIGS. 4-12 show some examples and illustrations of the GUI 304 to assist the user in performing a 3D scan. FIG. 4 illustrates an example initial display of the GUI 304 before scanning (e.g., before the camera sensor is initialized). In some aspects of the present disclosure, GUI 304 generally comprises a user action button 402, a scanner marker 404 (e.g., a camera marker), and a status 406. The user action button 402 may be pressed by the user in order to begin or end scanning. Alternatively or in addition, different controls may be used, such as touch controls including swiping or press and hold, voice commands, a hardware button of the user device, and so on.

The camera marker 404 may be used to assist the user in orienting the camera toward a desired point or area of an object to be scanned. The illustrated camera marker 404 is an annulus, but the marker 404 may be any shape or mark, such as a ring, a circle, a bounded square, an x, a point, a ring, and so on. Additionally or alternatively, the GUI 304 may provide to the user other visual cues (such as shading the screen when farther away from the center, using colors, and so on) or the user device may provide audible or haptic cues in order to assist the user in orienting the camera toward the object.

The center of the camera sensor in general may be the preferred portion of the sensor for capturing information (the "sweet spot"). For example, the center portion of a camera sensor pointed directly at the object may have less error and provide more relevant data for 3D scanning than a portion of the camera sensor off center or that is tilted in relation to the object. Thus, the GUI 304 may include the camera marker 404 to assist the user in improving the orientation of (e.g., centering) the camera for 3D scanning.

However, a scanner or camera may have a different sweet spot from other scanners or cameras because of, e.g., different manufacturing techniques or device technologies. Such differences may be model, device, or manufacturer specific. For example, one camera model's sweet spot may be slightly off center in one direction. Hence, to compensate, the camera marker 404 may be any location in the GUI 304.

In some aspects of the present disclosure, the status 406 may notify the user of the current state of the camera (such as if scanning has commenced, if the camera is ready to begin scanning, if the camera is busy, and so on). The status 406 may also provide directions to the user to assist with scanning (such as "click scan [402] to begin", "click scan to stop scanning", and so on). The status 406 may exist in any location and orientation. Additionally or alternatively, the status 406 may be a non-text notification, such as a grayed out action button 402 if the camera is busy, a green flash or indicator when the camera is ready, highlighting the scan button to direct the user to press when ready, and so on.

Figure 5:
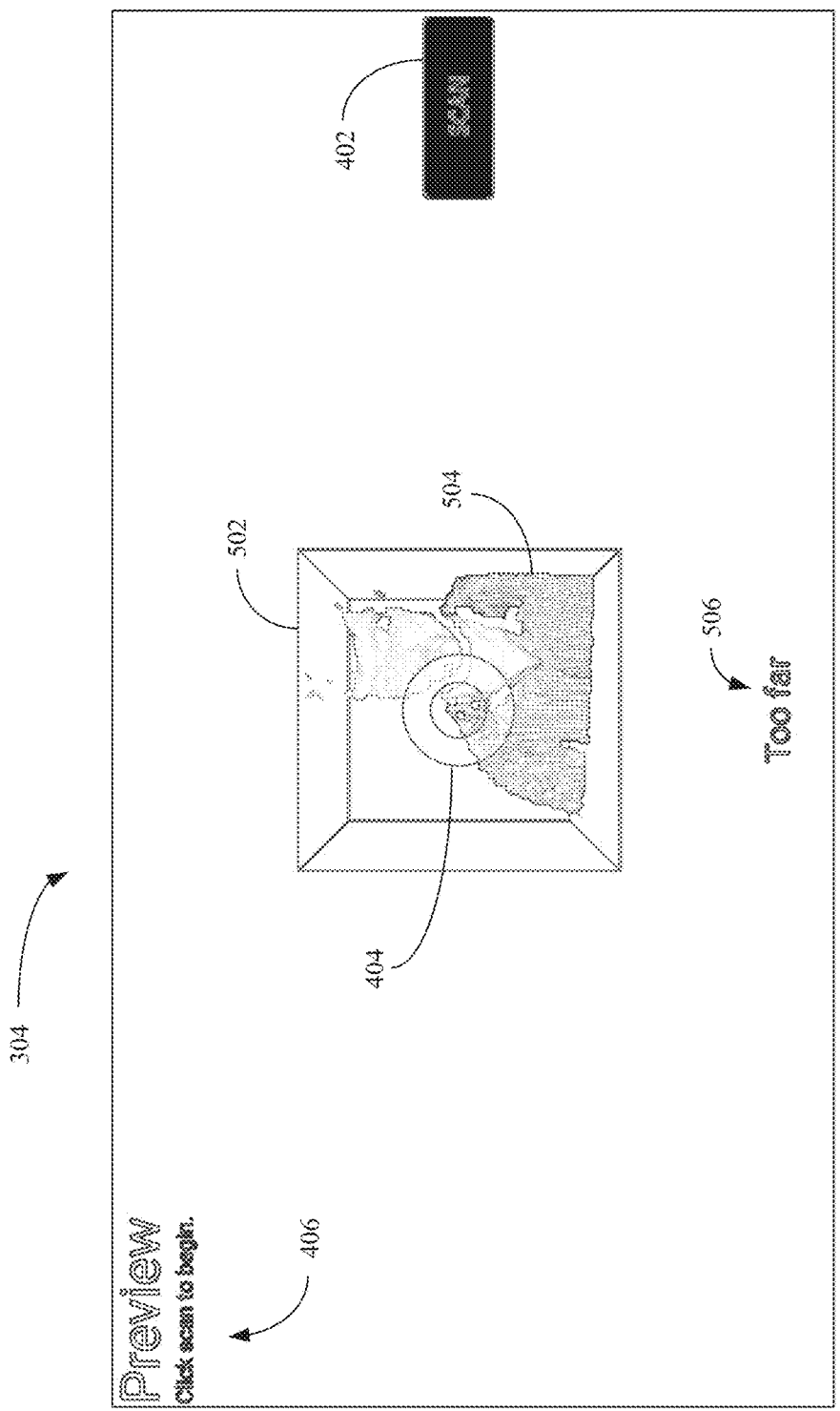
FIG. 5 is an illustration depicting an example display of a GUI before performing the scan but after a camera begins capturing frames, in accordance with some aspects of the present disclosure.

FIG. 5 illustrates an example display of the GUI 304 before scanning but after the camera begins capturing frames. In addition to the user action button 402, camera marker 404, and status 406, the GUI 304 may include a bounding box 502, an object preview 504, and a user direction 506. The background of the GUI may be a captured image by the camera or near real-time display of the stream of captured images by the camera. Thus, the GUI 304 may be an augmented reality, wherein a composite view of the captured images representing the real world and the computer generated images to assist the user with scanning are displayed seamlessly to the user.

The bounding box 502 may correspond to a region of interest defined by the user and to be scanned by the camera. The bounding box may be displayed relative to one or more of the captured images. A region of interest defined by the user (or determined by the user device) may be used by the user device to determine the dimensions and location of bounding box 502. The bounding box 502 may be associated with the object in a three dimensional model (e.g., a two-dimensional representation of the object) based on the captured images. For example, the bounding box may include or correspond to the region of interest based on object tracking as the camera moves relative to the object. In some aspects of the present disclosure, the captured image being displayed outside the bounding box 502 is blacked out or otherwise not displayed (e.g., to preserve computing resources for rendering or to focus the user's attention on scanning the intended object).

In some aspects of the present disclosure, the bounding box 502 may correspond to a cube or other geometric region in three dimensions that corresponds to or includes a portion (e.g., a volume) of the region of interest defined by the user. As the camera continues to capture images, a user device may track the region of interest or an object corresponding to the region of interest from one image frame to subsequent image frames. Based on the object tracking, the bounding box may be updated. For example, during generation of the three dimensional model when the camera moves closer to or further from the object, a size parameter of the bounding box may be adjusted based on the object tracking. The bounding box may be associated with multiple size parameters (such as (x, y, z) dimension parameters, a center point (x, y, z) coordinate and a spherical radius, and so on). A particular size parameter may be associated with or correspond to a particular dimension of the bounding box (e.g., length, width, or depth). The value of the size parameter may be adjusted based on determining that the object is larger or smaller in the bounding box in one image than in a previous image.

In another aspect, a value of a position parameter of the bounding box may be adjusted based on tracking the object within the bounding box. To illustrate, the object may move from image frame to image frame in the set of captured images based on movement of the object relative to the scene or movement of the object relative to the camera. The value of the position parameter may be adjusted based on the relative position of the object in the sequence of images.

In some aspects of the present disclosure, the bounding box is associated with the camera marker 404. For example, the bounding box 502 may ensure that the region of interest is at and around the area being captured by the sweet spot of the camera sensor. In some aspects, the bounding box 502 may be limited in absolute size by such sweet spot and/or may be dependent on the brand, model, or technical limitations of the camera. Additionally or alternatively, the bounding box 502 may be limited in absolute size by the processing resources of the user device.

The object preview 504 is a rendering of the object using the images being captured by the camera. In some aspects of the present disclosure, the images being captured before the user begins scanning are used exclusively for preview 504, with the user device using images for the final 3D model only after the user begins the scan by pressing the user action button 402. In other aspects, when the bounding box 502 is set, the 3D model (e.g., a point cloud) begins to be constructed (including before the user presses the user action button 402). The object preview 504 may be bound by the dimensions of the bounding box 502 so that portions of the object outside of the bounding box 502 are not displayed. Bounding the object preview 504 may assist the user in positioning the camera as desired.

Though not illustrated in FIG. 5, the GUI 304 may also display the environment around the object in addition to the object preview 504. Sometimes, the user may have difficulty discerning in the GUI the object being scanned from the environment or background. For example, the color and brightness between the object and bordering environment may cause difficulties for a user in discerning the edge of the object. As described later in reference to FIGS. 16A-16C, the user device 200 may determine that difficulty may exist for the user to discern the scanned object in the GUI (either automatically, through user input, or a combination of the two). In some examples, the user device may enhance the contrast between the displayed environment and the object to assist the user in discerning the displayed object from the displayed environment. For example, the user device may replace the background, shade the background, or otherwise alter the background so that the object is more easily discerned.

In some aspects of the present disclosure, scanning may need to be performed within a range of distances from the object. For example, if the camera is too close to the object, then the user device may not be able to recognize the object at some point in the sequence of image frames. If the camera is too far from the object, then the camera may not capture sufficient information of the object in order to fill in the point cloud. Thus, the GUI 304 may include the user direction 506 to assist the user in placing the camera an appropriate distance from the object. Additionally or alternatively, the user direction 506 can provide directions to the user regarding preferred orientation and location of the camera with respect to the object. For example, if the camera is too far from (or too close to) the object to be scanned, the user direction 506 may indicate such to the user. In some aspects of the present disclosure, the user direction 506 may also indicate to the user, for example, if the camera needs to be kept steady, movement of the camera needs to be slowed, or other instructions.

Figure 6:
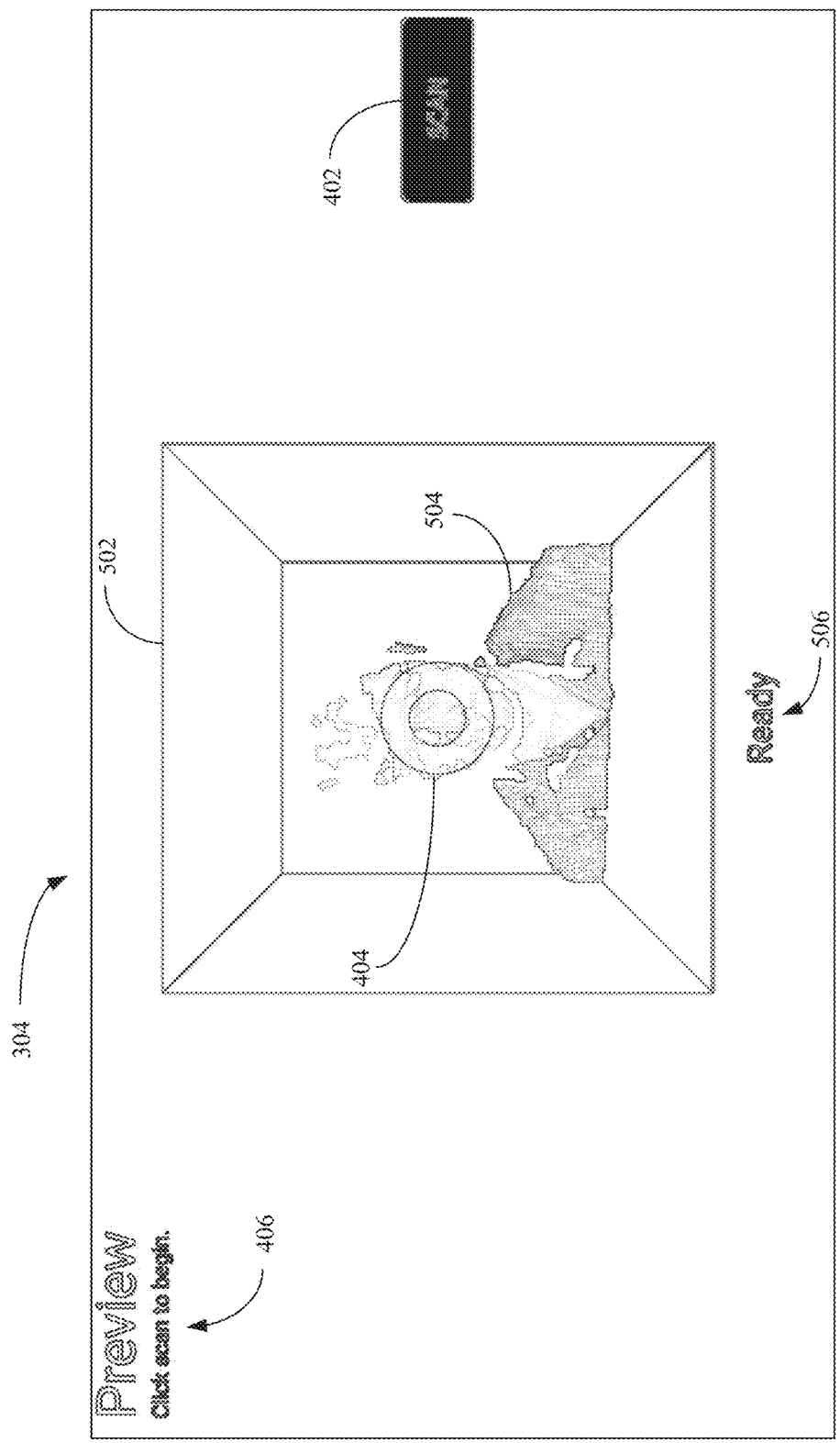
FIG. 6 is an illustration depicting an example display of the GUI when the scanner is ready to begin scanning, in accordance with some aspects of the present disclosure.

FIG. 6 illustrates an example display of the GUI 304 when the camera is ready to begin scanning. As illustrated, the user direction 506 may indicate to the user that the positioning and location of the camera relative to the object is satisfactory (e.g., within a predetermined number of ranges for distance, pitch, yaw, and so on). In some aspects of the present disclosure, the object to be scanned is a person's face, head, and/or bust. The preferred orientation/positioning of the camera may be with the camera marker 404 on the nose of the person with the camera oriented to capture the person in a front profile a preferred distance away from the person. Once the user is satisfied with the position and orientation of the camera in relation to the object, the user may begin scanning (e.g., by selecting the user action button 402). When scanning, the user moves the camera around the object, with the camera capturing images of the object at different vantages.

While not illustrated in the figures, the bounding box 502 may continue to be used after scanning begins (such as after the user action button 402 is selected). For example, the bounding box 502 may define the volume where points for the point cloud are to be added, thus acting as a cropping tool during scan. In some aspects of the present disclosure, any points captured outside of the bounding box may be disregarded. Therefore, computing resources may be preserved for processing captured information only for the volume within the bounding box 502.

Figure 7:
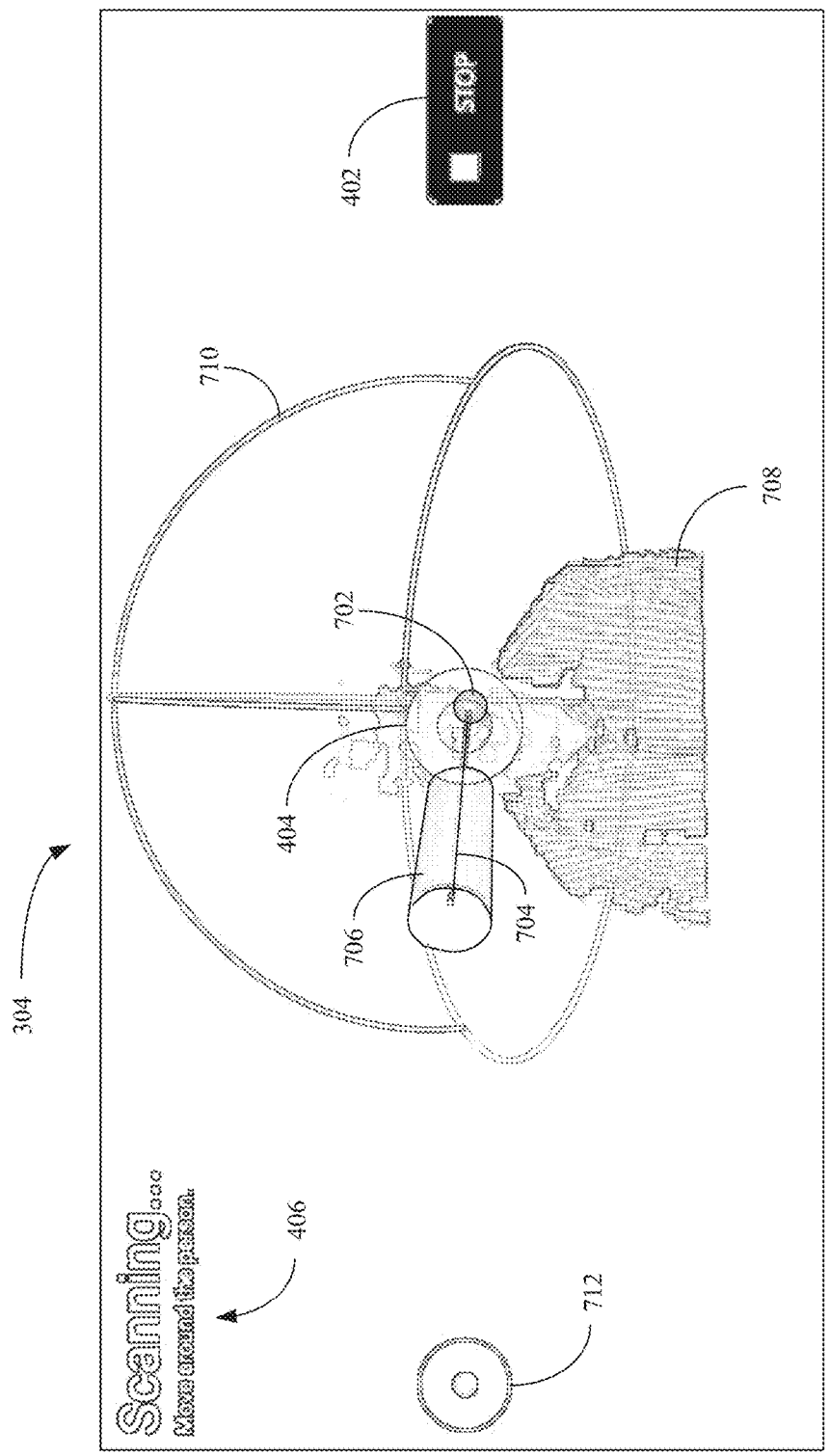
FIG. 7 is an illustration depicting an example display of the GUI when scanning begins, in accordance with some aspects of the present disclosure.

FIG. 7 illustrates an example display of the GUI 304 when scanning begins. The GUI 304 generally includes a target marker 702 and a scanner position marker 704. In some aspects of the present disclosure, the GUI 304 may also include a sight 706, a scanned object rendering 708, a visual boundary 710, and a progress indicator 712.

In some aspects of the present disclosure, the target marker 702 may be an indication of the approximate center of the object when the scan begins. For example, if a person's head is to be scanned, the target marker 702 is placed near the person's nose. The user device may detect the user's nose and place the target marker 702 near such location. In other aspects, the target marker placement may be associated with the camera marker 404. For example, the target marker 702 may be an origin marker placed at the center of the camera marker 404 when the user begins the scanning process. Thus, the target marker 702 may identify the starting point for the scans. In some aspects, the user is directed to align the camera marker 404 with the person's nose during the setup phase so that the target marker 702 will be placed near the person's nose when scanning begins.

The target marker 702 may be used to orient the camera toward the center of the object being scanned. Thus, as the camera is moved around the object and positioned such that the camera marker 404 approximately aligns with the target marker 702, the camera captures images from multiple vantages toward the same point highlighted by the target marker 702. With the example of scanning a person's head, moving the camera around the head and aligning the target marker 702 (located near the person's nose) with the camera marker 404 on the GUI 304 allows the camera to capture different aspects of the head (such as the face, sides, ears, back of the head, hair, and so on). The target marker 702 may also be located in the center of the bounding box for the region to be scanned (including the object).

Because the camera moves around the object during scanning, the location of the target marker 702 may need to be adjusted to compensate for the depth of the object. For example, if scanning a person's head, the preferable location of the target marker 702 may be the center of the person's head, beneath the surface, so that any portion of the surface of the head is approximately equidistant from the target marker 702. If the object is a building, the location of the target marker may be within the building where each corner of the building is approximately equidistant from the target marker. Hence, the user device may determine a depth to offset target marker 702 when initially placing the marker.

In some aspects of determining such offset, when scanning a person's head and locating the nose, the user device may calculate a depth of the nose (e.g., the distance from the tip or bridge to the face). Using the depth of the nose, the user device may estimate a depth to offset (e.g., push into the head in the GUI 304) the target marker 702. Additionally or alternatively, the user device may also estimate the size or circumference of the head in order to estimate the offset, the depth may be preset to a distance specific to the object (such as a first distance for a head, a second distance for a car, a third distance for a table, and so on), or the offset may be user-defined (such as by allowing the user to press and drag the target marker 702 on the GUI 304 to a desired location and/or pinch and zoom to change the depth).

While the target marker 702 is illustrated as a sphere (which may be of any shade, hue, color (such as blue, white, etc.) and so on), the marker may be any shape or style (such as a square, x, box, pyramid, triangle, circle, bullseye, and so on). Other aspects of the GUI may include a Cartesian coordinate value displayed on the GUI (to indicate horizontal and vertical drift in the orientation of the camera to be compensated in order to center the object in the camera field), a coloring system along portions of the camera marker (such as green for good, yellow for marginal, and red for adjustment needed for the orientation of the camera), or directions to the user in the status 406 (or located elsewhere) to instruct the user in reorienting the camera.

There may exist paths in moving and orienting the camera in order to reduce the amount of time needed to scan the object. For example, more variations generally exist in the topography of a person's face, ears, and areas around the ears (the ears and nose protrude from the head, eyes are sunken, and so on) than with the back of the head. Thus, when scanning a person's head, more captures at different vantages for the face and the ears as compared to the back of the head may be requested from the user. A path for the camera movement may ensure that those additional captures are obtained in a reduced amount of time than if the user is not provided a path (e.g., if the user moves the camera in a random pattern). The path may be a sequence of linear paths, arcs, circles or other movements. In some aspects, the path is a sequence of linear paths mapped along a visual boundary 710 (e.g., a hemisphere) centered at the target marker 702. The GUI 304 may assist the user in following a path by displaying the scanner position marker 704. The path determined by the user device may be called a scan path or a preferred path for scanning.

In directing a user to move the camera along a preferred path for scanning, the scanner position marker 704 may represent a first waypoint to where the camera is to be moved. For example, if the path proceeds left from the current camera position, then scanner position marker 704 may be illustrated to assist the user in moving the camera along such path. In some aspects, the scanner position marker 704 is a line extending outward from the target marker 702. However, the scanner position marker 704 may exist in any form or shape (such as a point, sphere, x, and so on). When the camera is in a preferred position indicated by the scanner position marker 704, at least a portion of the scanner position marker 704 and at least a portion of the target marker 702 may be aligned or superimposed in the GUI.

In the example of the scanner position marker 704 being a line as illustrated in FIG. 7, the user would move the camera so that the GUI displays the camera being directed toward the target marker 702 (such as camera marker 404 being positioned over target marker 702) approximately along the line representing the scanner position marker 704 such that at least a portion of the target marker 702 and at least a portion of the scanner position marker 704 are superimposed in the GUI. In some aspects of the present disclosure, the preferred path may be updated during scanning in order to further assist the user (such as to fill holes in the current point cloud or other rendering/model, to compensate for user tendencies during scanning, and so on). As described later in reference to FIG. 18, updating the preferred path may be based on information regarding, for example, the current scan, prior scans by the user, current holes in the model, severity of holes in the model, or a combination of the above. Additionally, machine learning may be used to further refine how to update the path during an active scan.

Figure 8:
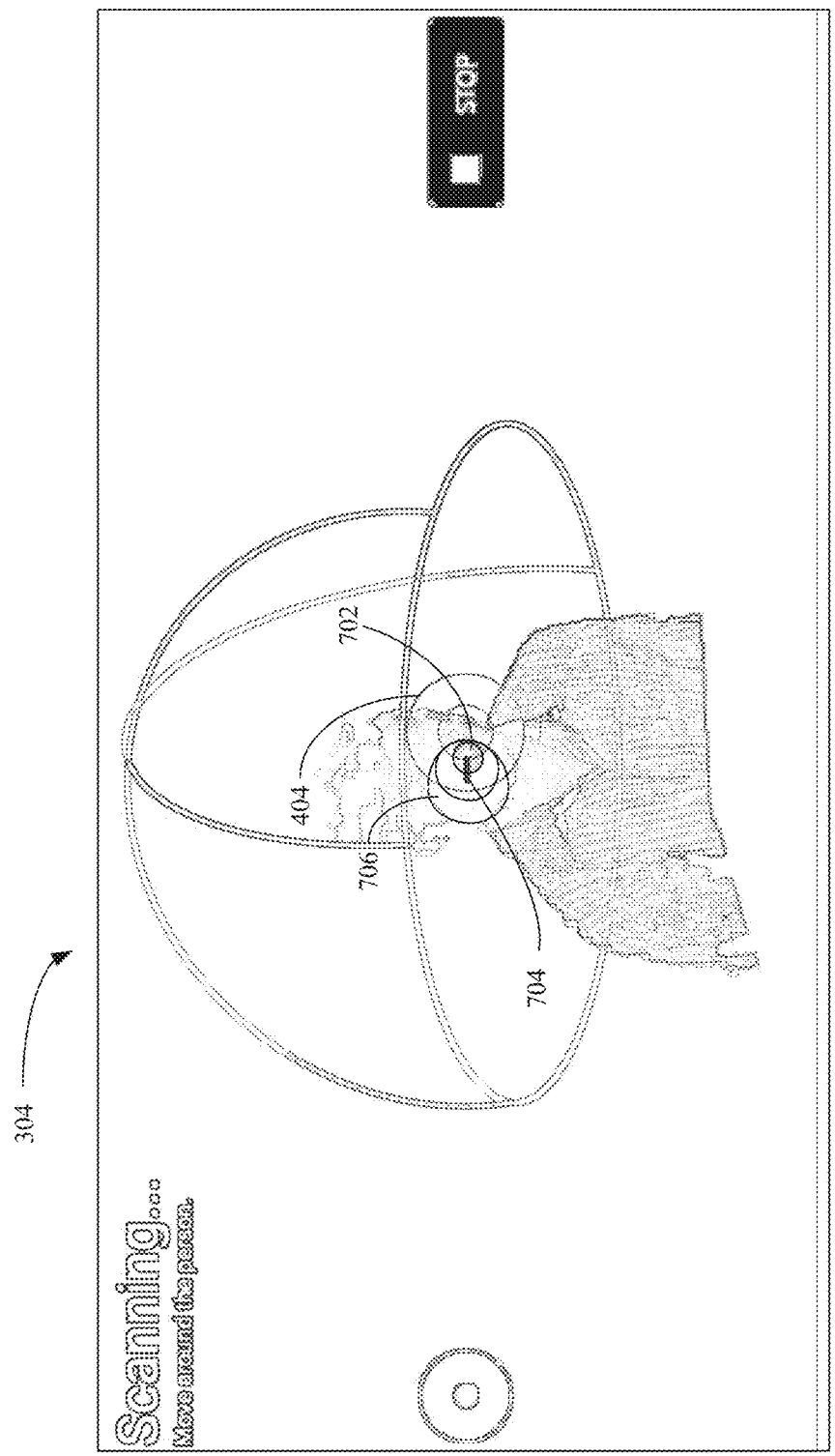
FIG. 8 is an illustration depicting an example display of the GUI when the scanner is oriented toward the target marker approximately along the scanner position marker, in accordance with some aspects of the present disclosure.

FIG. 8 illustrates an example display of the GUI 304 when the camera is positioned toward target marker 702 (such as camera marker 404 being positioned over target marker 702) approximately along scanner position marker 704. In some aspects of the present disclosure, the GUI 304 notifies the user that the camera has been successfully positioned such that the camera has passed along the desired path while scanning the object. Such notification may be audible (such as a beep, ring, ding, and so on), visual (such as a flash of light, color flash, movement of the scanner position marker 704, and so on), and/or haptic (such as a vibration). In some aspects with the camera to follow a desired path, once the camera has been successfully positioned for the first waypoint, the scanner position marker 704 may be moved to represent a second waypoint (such as by shifting the scanner position marker 704 to a new position, replacing the scanner position marker 704 at a first position with a scanner position marker 704 at a second position, and so on). The second waypoint may be for assisting the user to continue moving the camera along the desired path (e.g., along a second portion of the desired path) during scanning.

Referring back to FIG. 7, the GUI 304 may also display a sight 706 to assist the user in aligning the scanner position marker 704 with the target marker 702 as described above. In some aspects of the present disclosure, the sight 706 is an open cylinder around the scanner position marker 704. The user may move the camera into a desired position wherein the GUI displays the target marker 702 through the hole of the open cylinder (similar to a scope, as illustrated in FIG. 8). The sight 706 may be any shape or group of shapes and orientation. Some examples include, but are not limited to, a set of rings, squares, beads, etc. extending along the scanner position marker 704, a torus or ring placed an intermediate length between the end of the scanner position marker 704 and the target marker 702, or arrows (or other directional indicators) around the scanner position marker 704 displayed to illustrate the preferred movement of the scanner position maker 704 in the GUI 304.

In some aspects of the present disclosure, the GUI 304 may also display a visual boundary 710. In the illustrated example, the visual boundary 710 is a hemispherical dome placed around the target marker 702 and oriented to be approximately level with the earth's horizon. In some aspects, the visual boundary 710 is situated around target marker 702 such that the target marker 702 would be the center of a sphere constructed from the illustrated hemispherical dome and a mirror image of the hemisphere under the dome.

The visual boundary 710 may be used as a reference to where the camera is oriented and located in relation to the object being scanned. For example, if the scanned object rendering 708 is not available or provided, the visual boundary 710 can be used by the user to determine the orientation of the camera and the distance of the camera from the object being scanned. While the visual boundary 710 is illustrated as a hemispherical dome approximately level with the earth's horizon, the visual boundary may be any shape and orientation.

The shape of the visual boundary may be the same for all objects being scanned or may be different based on, e.g., the type or topography of the object being scanned, a user preference/selection, and so on. In some aspects, if the visual boundary 710 is fixed as a hemispherical dome approximately level with the earth's horizon, the displayed hemisphere may assist the user in placing the camera within a preferred range of distances from the object since any point of the surface may be equidistant from the target marker 702. In some examples of the visual boundary being variable, if a person's head, an orange, a ball, or other rounded object is being scanned, a hemispherical dome may be used. If a box of cereal or tea, a computer monitor, a business building, or other object with mostly vertical and horizontal straight edges is to be scanned, a shape such as, e.g., a cube or box may be used for the visual boundary.

If the shape may vary, the user device may identify the object (or the topography of the object) to be scanned in order to select the shape of the visual boundary 710. For example, the user device may use object recognition to identify the object. If the user device identifies a person's head to be scanned, then the hemispherical dome can be automatically selected by the user device as the shape of the visual boundary. In other aspects, the user may select the shape of the visual boundary 710 or select an object to be scanned (e.g., from a list of different objects, such as a person's head, furniture, statue, building, vehicle, and so on) in order for the user device to provide the shape of the visual boundary suitable for the object. Alternative to the visual boundary 710 being level with the earth's horizon, the visual boundary 710 may be oriented based on the orientation of the object being scanned. For example, if a person's head is tilted in relation to the earth's horizon, the GUI 304 may display a hemisphere where the vertex of the hemisphere is positioned relatively above the crown of the person's head with the hemisphere tilted similarly as the person's head. With the visual boundary able to be any shape, the user device may additionally or alternatively use a visual boundary that adheres to the contours of the object being scanned (as described later in reference to FIG. 14A-FIG. 16B and FIG. 17A-FIG. 17B).

The GUI 304 illustrated in FIG. 7 may also display scanned object rendering 708 which may illustrate to the user the completeness of the rendering (such as a point cloud) being created. Additionally or alternatively, the scanned object rendering 708 may be any representation of the object being scanned in order to assist the user in positioning the camera toward the object (such as displaying an image capture of the object, the visual boundary, and so on). The GUI 304 may also display a progress indicator 712. In some aspects, the progress indicator 712 may indicate, e.g., the completeness of the current scan, the proportion of the preferred path travelled by the camera for scanning, the portions of the object scanned and to be scanned, and so on. For example, the progress indicator 712 in FIG. 7 may be a top down view of the visual boundary 710, with the bottom portion of the progress indicator 712 associated with the front of the person's head and the top portion of the progress indicator 712 associated with the back of the person's head.

Figure 9:
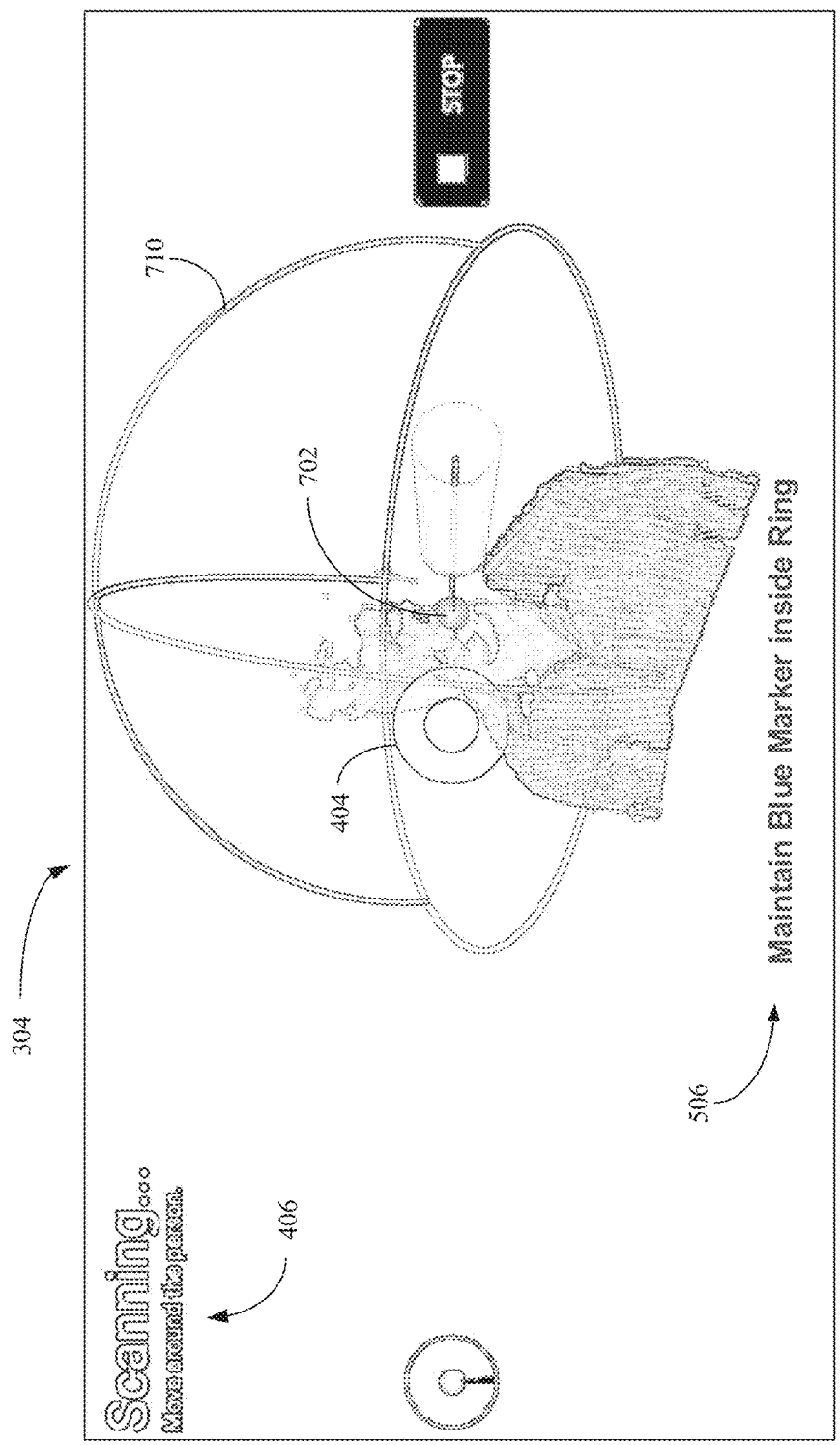
FIG. 9 is an illustration depicting an example display of the GUI notifying the user that the scanner is oriented away from the object, in accordance with some aspects of the present disclosure.

While the camera travels along the preferred path, the user direction (or the status) of the GUI 304 may notify the user if there is issue with the orientation, movement, and/or positioning of the camera. FIG. 9 illustrates an example display of the GUI 304 notifying the user that the camera is oriented away from the object. A camera marker 404 may assist a user to orient the camera relative to the target marker 702. The preferred camera orientation may be where at least a portion of the camera marker 404 and at least a portion of the target marker 702 are superimposed or aligned. In the example, the user may be notified by the user direction 506 (or alternatively by the status 406 or by other means) that the camera marker 404 and the target marker 702 are not superimposed or aligned. In some example implementations, the user is notified if no portion of the camera marker 404 and no portion of the target marker 702 are superimposed or aligned in the GUI. In further example implementations, the user may be notified if less than a predetermined portion of the camera marker 404 and target marker 702 are superimposed or aligned. Additionally or alternatively, the GUI 304 may notify the user if, e.g., the camera is moving too fast, there is too much jitter in the movement, a position identified by scanner position marker was not properly reached by the camera, and so on. The GUI 304 may also notify the user through user direction 506 and/or status 406 if the camera is too close to or too far from the object for scanning. In some aspects of the present disclosure, the visual boundary 710 may flash or momentarily disappear and reappear to gain the user's attention that correction of the camera's position or orientation is needed. Thus, the GUI 304 may assist the user to maintain the orientation and positioning of the camera while moving the camera around the object (such as along the preferred path for scanning).

Figure 10:
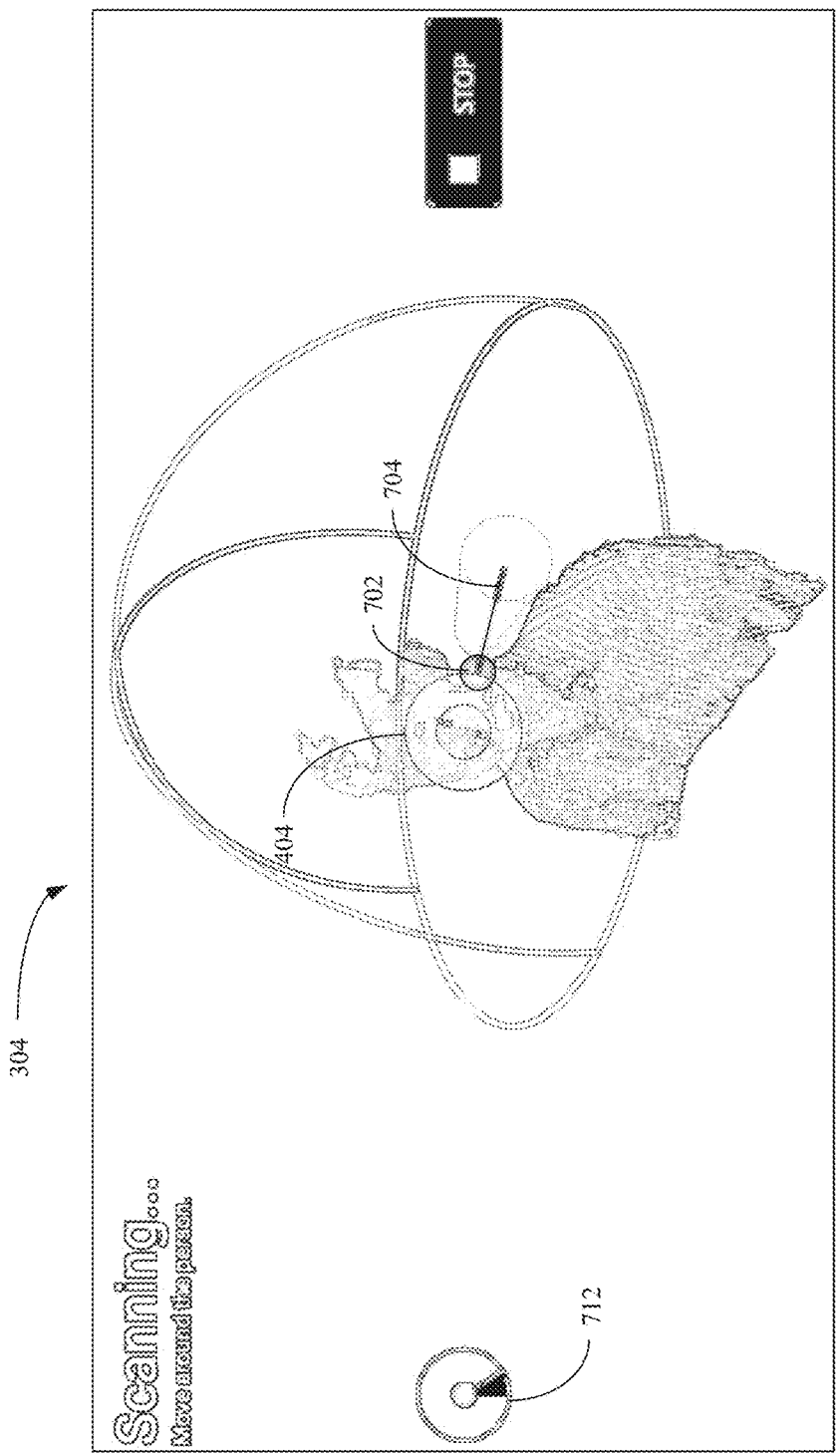
FIG. 10 is an illustration depicting an example display of the GUI when the scanner is moving relative to a movement of the scanner position marker from a first position to a second position, in accordance with some aspects of the present disclosure.
Figure 11:
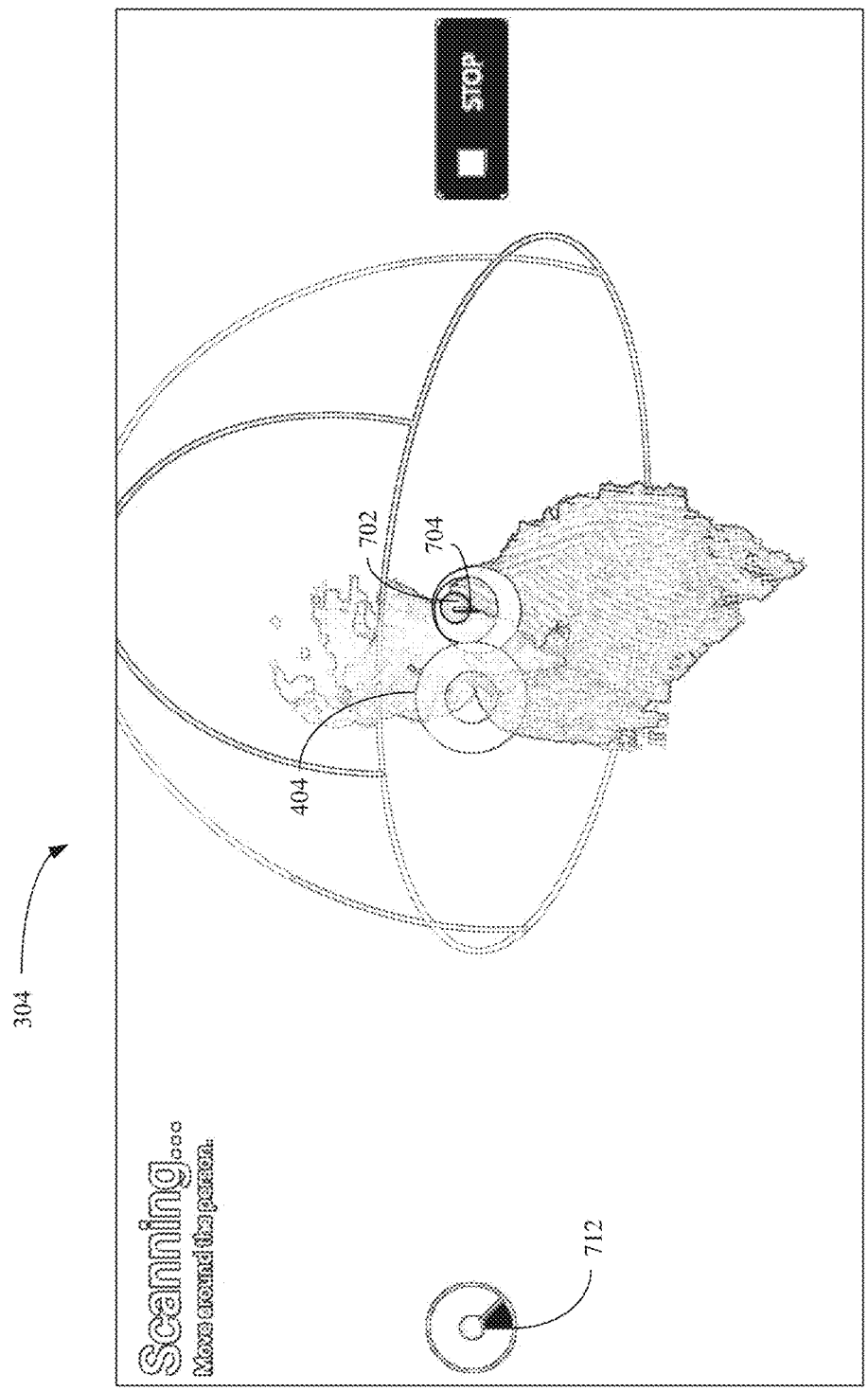
FIG. 11 is an illustration depicting an example display of the GUI when the scanner is oriented toward the target marker approximately along the scanner position marker at a second position, in accordance with some aspects of the present disclosure.

FIG. 10 illustrates an example display of the GUI 304 when the camera is moving relative to a movement of the scanner position marker 704 from a first position to a second position (e.g., to align the scanner position marker 704, the camera marker 404 and the target marker 702 in the GUI 304). For example, the camera is being moved from a beginning position when starting the scan to a first waypoint (illustrated in FIG. 8) and then toward a second waypoint (illustrated in FIG. 10) along a preferred path for moving the camera in scanning the object. The shaded portion of progress indicator 712 illustrates the portion of the object already scanned, with the unshaded portion illustrating the portions of the object yet to be scanned. FIG. 11 illustrates an example display of the GUI 304 when the camera is positioned toward target marker 702 approximately along scanner position marker 704 for a second waypoint. As can be observed in comparing the instance of the progress indicator 712 in FIG. 10 and the instance of the progress indicator 712 in FIG. 11, the shaded portion grows as more portions of the object are scanned and/or the camera progresses along the preferred path for scanning the object.

Figure 12:
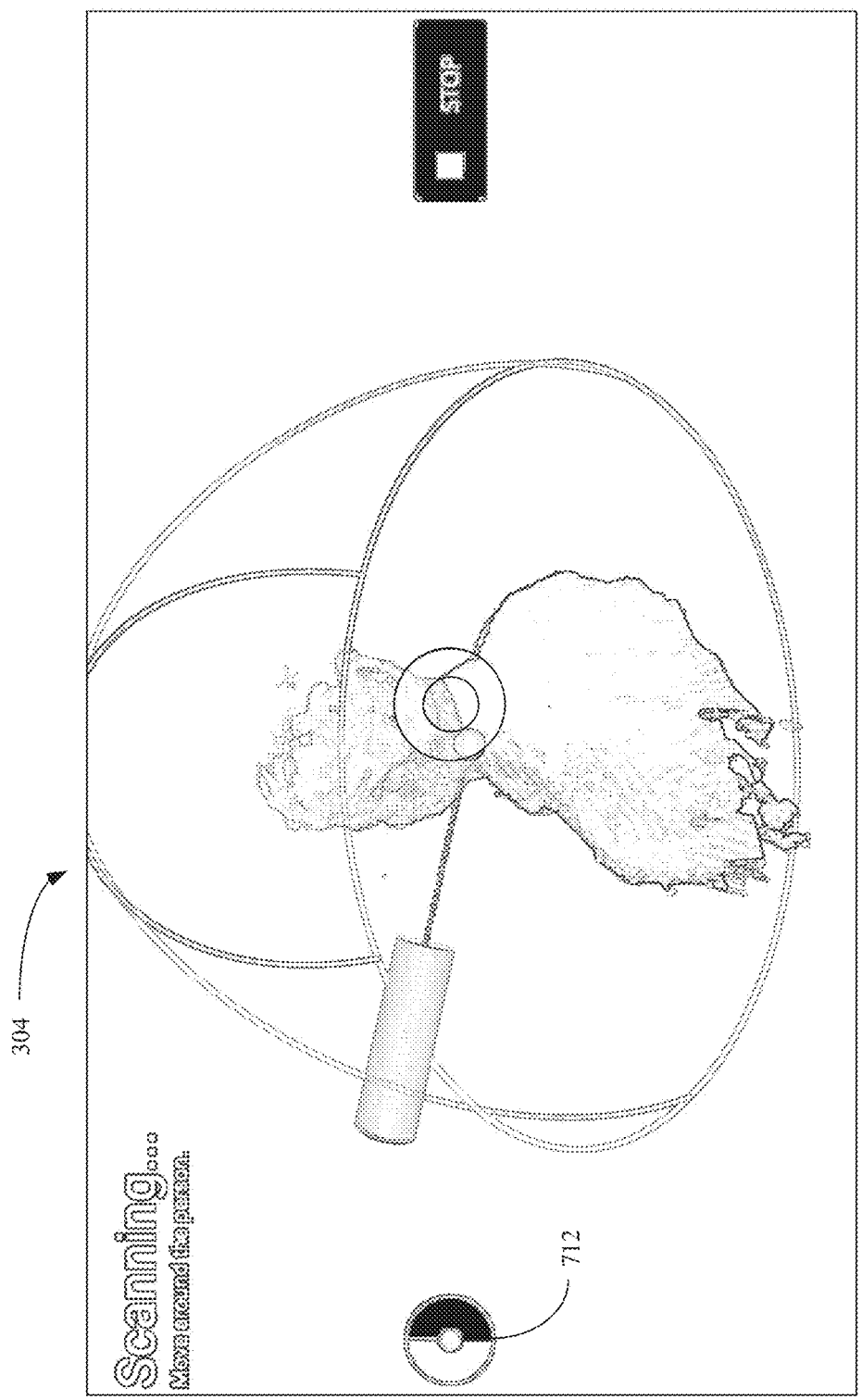
FIG. 12 is an illustration depicting an example display of the GUI when scanning the object is halfway complete, in accordance with some aspects of the present disclosure.

FIG. 12 illustrates an example display of the GUI 304 when scanning the object is halfway complete. In the example, the shaded portion of progress indicator 712 indicates that the left side of the person's head has been scanned. Thus, the GUI 304 can assist the user in moving the camera to scan the right side of the person's head (e.g., guiding the user to move the camera along the remainder of a preferred path).

Figure 13:
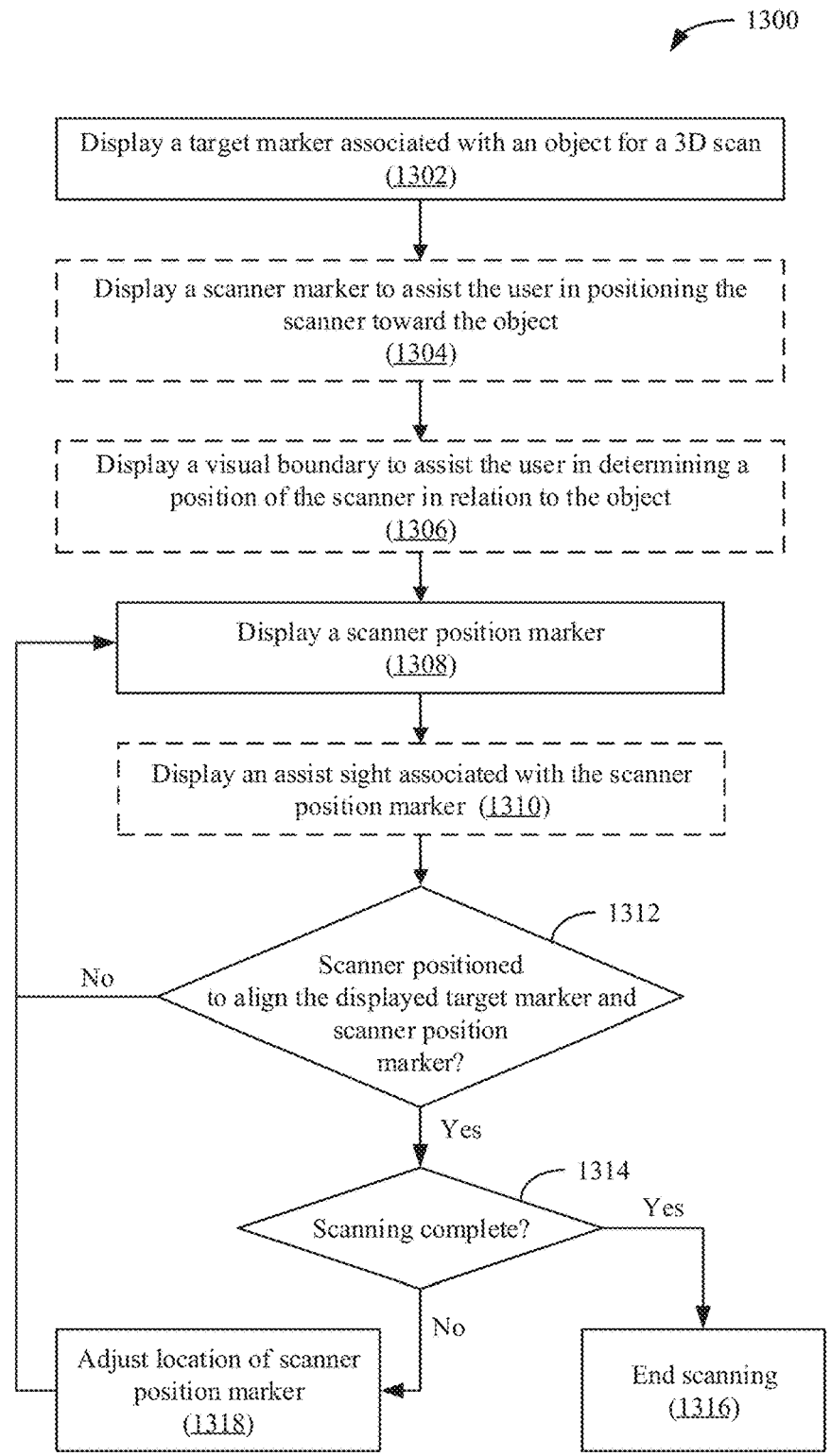
FIG. 13 is an illustrative flow chart depicting an example operation for a GUI of a user device to assist in performing a 3D scan of an object, in accordance with some aspects of the present disclosure.

FIG. 13 is an illustrative flow chart depicting an example operation 1300 for a GUI to assist a user in performing a 3D scan of an object. During scanning (e.g., upon the user pressing the user action button 402 of the GUI 304 in FIG. 6), the GUI displays a target marker associated with the object being scanned (1302). For example, GUI 304 in FIG. 7 displays target marker 702 for object 102 (FIG. 3). In 1304 of FIG. 13, the GUI may optionally display a scanner marker to assist the user in positioning the scanner toward the object. For example, the GUI 304 in FIG. 7 displays camera marker 404 to assist the user in positioning the camera so that the camera marker 404 overlays the target marker 702 in GUI 304.

In 1306, the GUI may optionally display a visual boundary 710 (such as the hemispherical dome of FIG. 7) to, e.g., assist the user in determining a position of the scanner in relation to the object while scanning. As previously described, the visual boundary may assist the user in keeping the scanner from drifting too far from or too close to the object (or to also help the user keep the scanner centered on the object being scanned while moving the camera in any direction around the object).

The GUI also displays a scanner position marker (e.g., at a first position or waypoint) at 1308 of FIG. 13. As previously described, the scanner position marker may assist the user in moving the scanner along a preferred path and/or moving the scanner to a preferred location and orientation. In 1310, the GUI may optionally display a sight associated with the scanner position marker. As previously described, the sight may be an open cylinder around the scanner position marker (e.g., sight 706 may be an open cylinder around position marker 704 in FIG. 7) so that the user can orient the scanner in order to see in the GUI the target marker through the hole of the open cylinder.

Proceeding to 1312, the user device determines if the scanner has been moved by the user such that the target marker and the scanner position marker are aligned in the GUI. If they are not aligned, then the GUI continues to display the scanner position marker (e.g., at the first position) until the target marker and the scanner position marker are aligned on the GUI. If the target marker and the scanner position marker are aligned in the GUI (1312), then the process flows to 1314.

In 1314, the user device may determine if scanning is "complete." Scanning may be complete if, e.g., the user ends scanning by pressing the user action button, there does not exist more positions or waypoints for the scanner position marker, the preferred path has been fully traversed by the scanner (such as no more waypoints exist), the user device has collected enough information for the rendering, a maximum scan time has been reached, the user device's storage is full in order to prevent more information capture, and so on. If scanning is complete, then scanning stops at 1316.

If scanning is not complete, the process continues at 1318. In some aspects of the present disclosure, if the scanner is being moved along a preferred path for scanning (e.g., the scanner position marker represents a waypoint along the path) or the scanner is being moved to specific vantages of the object, the user device may determine that the path has not been completely traversed or all vantages have not been reached by the scanner. Additionally or alternatively, holes may exist in the point cloud or other rendering of the object such that additional scanning is required. Hence, in 1318, the GUI adjusts the location of the scanner position marker (e.g., moving the scanner position marker from a first location to a second location relative to the object). The GUI then displays the scanner position marker at the new position (reverting back to 1308 in FIG. 13) in order to assist the user in moving the scanner, e.g., along the preferred path or to another vantage during scanning of the object.

Figure 14A:
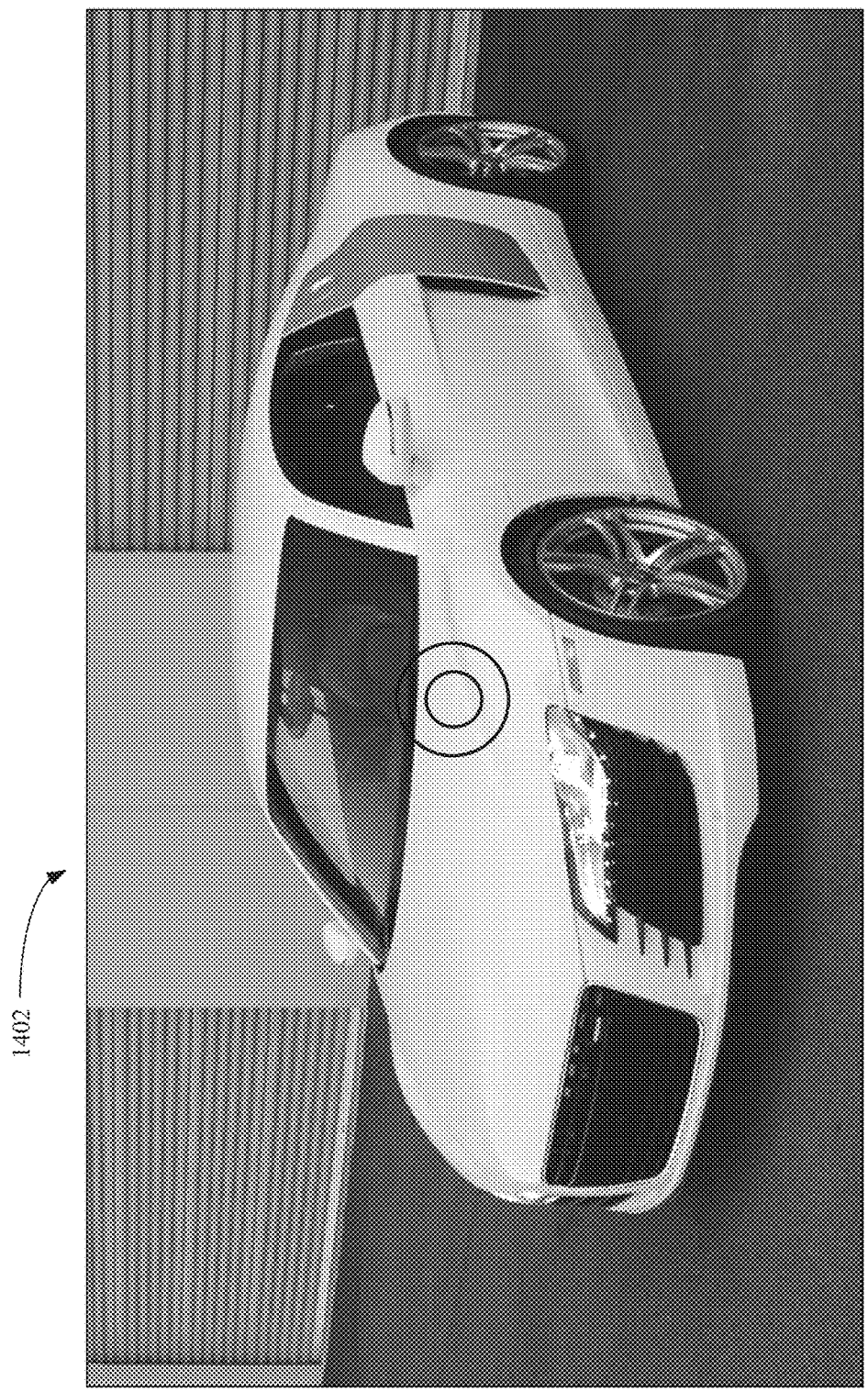
FIG. 14A is an illustration depicting an example display of an object to be scanned, in accordance with some aspects of the present disclosure.

Referring back to the visual boundary 710 displayed in the GUI 304 (such as in FIG. 7), the visual boundary may adhere to the contours of the object to be scanned. FIG. 14A illustrates an example display of GUI 1402 displaying an object to be scanned. The object to be scanned in the example is a car, and more specifically, a sports car, and even more specifically, a two door coupe. In some examples (as described below in reference to FIG. 17A and FIG. 17B), the user device detects the object in order to select a visual boundary to be used for the object. The detection may be at any fidelity (such as an automobile, a car, a sports car, a two door coupe, a specific make and model of the car, and so on) and may use any feature of the object for detection (such as, in the example of the car, model year, distinguishing features, similar images, and so on). For example, the user device may match the image to similar images taken by others in order to determine the current object to be scanned. After determining the object to be scanned, the user device may select one from a plurality of visual boundaries to be used for scanning the object.

Alternatively, the user may select a visual boundary from a plurality of visual boundaries. In other examples, the user may provide information about the object to be scanned (such as the object is a car with two doors and appears to be a sports model) to assist the user device in narrowing the number of possible visual boundaries for the object to be scanned. In further examples, the GUI may display the visual boundary (or a selection of visual boundaries) based on the object so that the user may verify that the selection is correct (or pick the visual boundary from the selections provided by the user device). In other examples, the user device may determine the contours and edges of the object in order to generate a custom visual boundary for the object. Similarly, the user device may request a confirmation from the user that the custom visual boundary should be used.

Figure 14B:
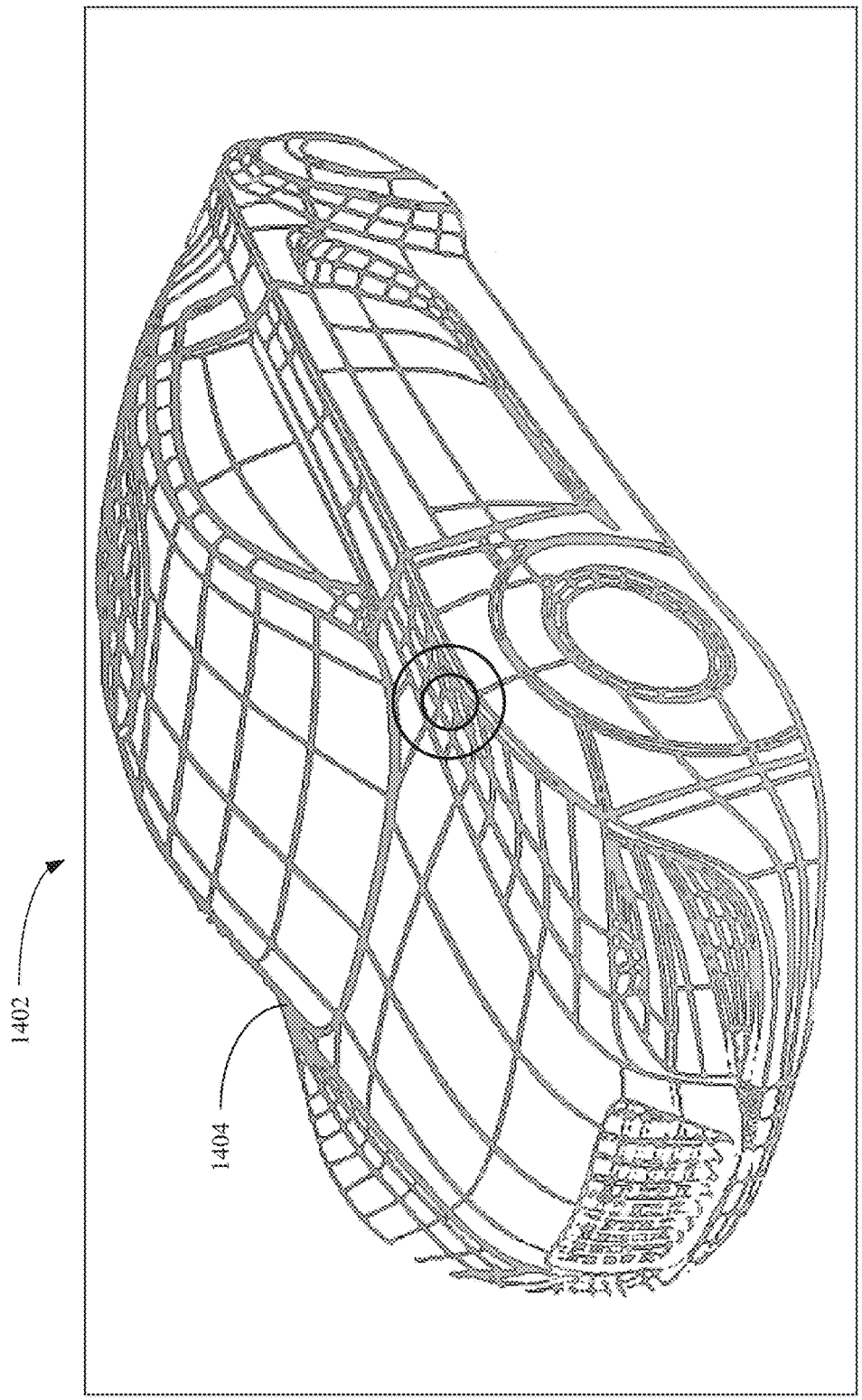
FIG. 14B is an illustration depicting an example visual boundary, displayed in a GUI, for the object displayed in FIG. 14A.

FIG. 14B illustrates an example display of GUI 1402 displaying a visual boundary 1404 for the object in FIG. 14A. As illustrated, the visual boundary 1404 adheres to the contours of the object for scanning. In some example implementations, the stored visual boundary may be a generic boundary for an object that is to be morphed or molded for the specific object to be scanned. In morphing or molding the visual boundary, the user device may, for example, rotate and tilt the visual boundary so that the orientation matches the present orientation of the object to be scanned. Additionally, the user device may stretch the visual boundary, expand the visual boundary, shrink the visual boundary, mold portions of the visual boundary to match the contours of the object to be scanned, remove portion of the visual boundary, add to the visual boundary, combine multiple visual boundaries (e.g., if the object to be scanned is a combination of two separate objects), and so on. For example, a generic boundary for a car may include outlines for four wheels, a basic body comprising the doors, hood, trunk and four wheel wells, and a top portion comprising the windows and roof. The user device may stretch (or shrink) the wheel outlines to match the wheel size. The wheel outlines may also be contoured to outline the rims or hubcaps of the car. The user device may also stretch the hood to correspond to the hood length of the car to be scanned. Additionally, the hood of the visual boundary may be molded to adhere to the contours of the hood of the car to be scanned. The same can be done for other aspects of the basic body and for the top portion comprising the windows and roof.

Figure 15A:
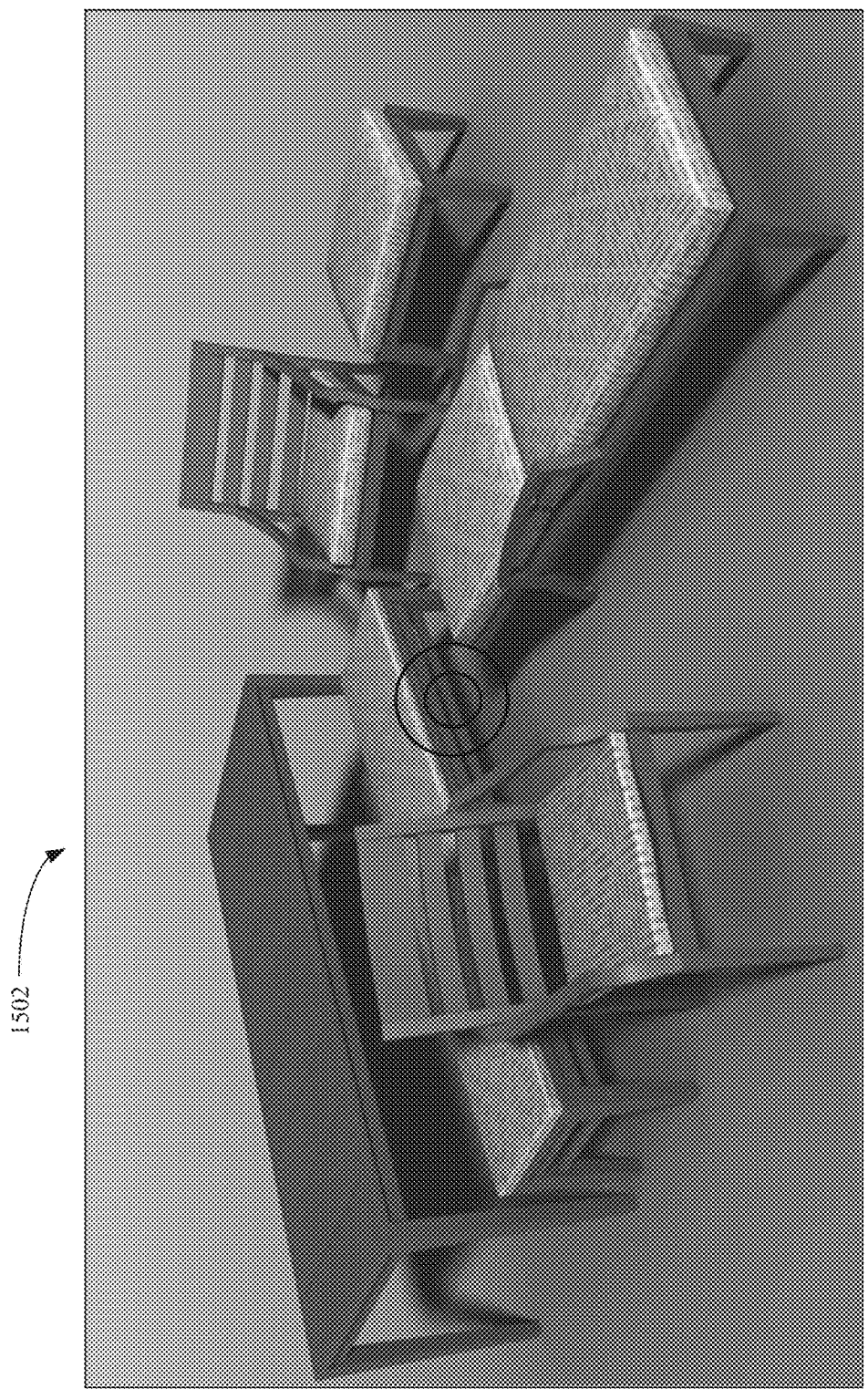
FIG. 15A is an illustration depicting an example display of a plurality of objects to be scanned, in accordance with some aspects of the present disclosure.

In determining a visual boundary for an object to be scanned, the user device (through object recognition, user selection, or a combination of both) may determine that multiple objects are to be scanned. FIG. 15A illustrates an example display of GUI 1502 displaying a plurality of objects to be scanned. In identifying an object to be scanned, the user device may determine that multiple objects to be scanned are being displayed. For example, the user device determines that multiple objects of a similar type (such as multiple pieces of outdoor furniture as illustrated in FIG. 15A) are being displayed. Similar to determining a visual boundary, any features of the objects may be used to determine if multiple objects for scanning exist. For example, the user device may use the pattern of the seat cushions in the furniture displayed in FIG. 15A to determine that the furniture is from one furniture set (and thus multiple objects may exist for scanning). Additionally or alternatively, the user device may identify the multiple chairs and benches as part of a set (such as from the pattern on the seat cushions) and determine that a table typically accompanies such a set. Thus, an identified table (as illustrated in FIG. 15A) may be included as an object to be scanned.

Figure 15B:
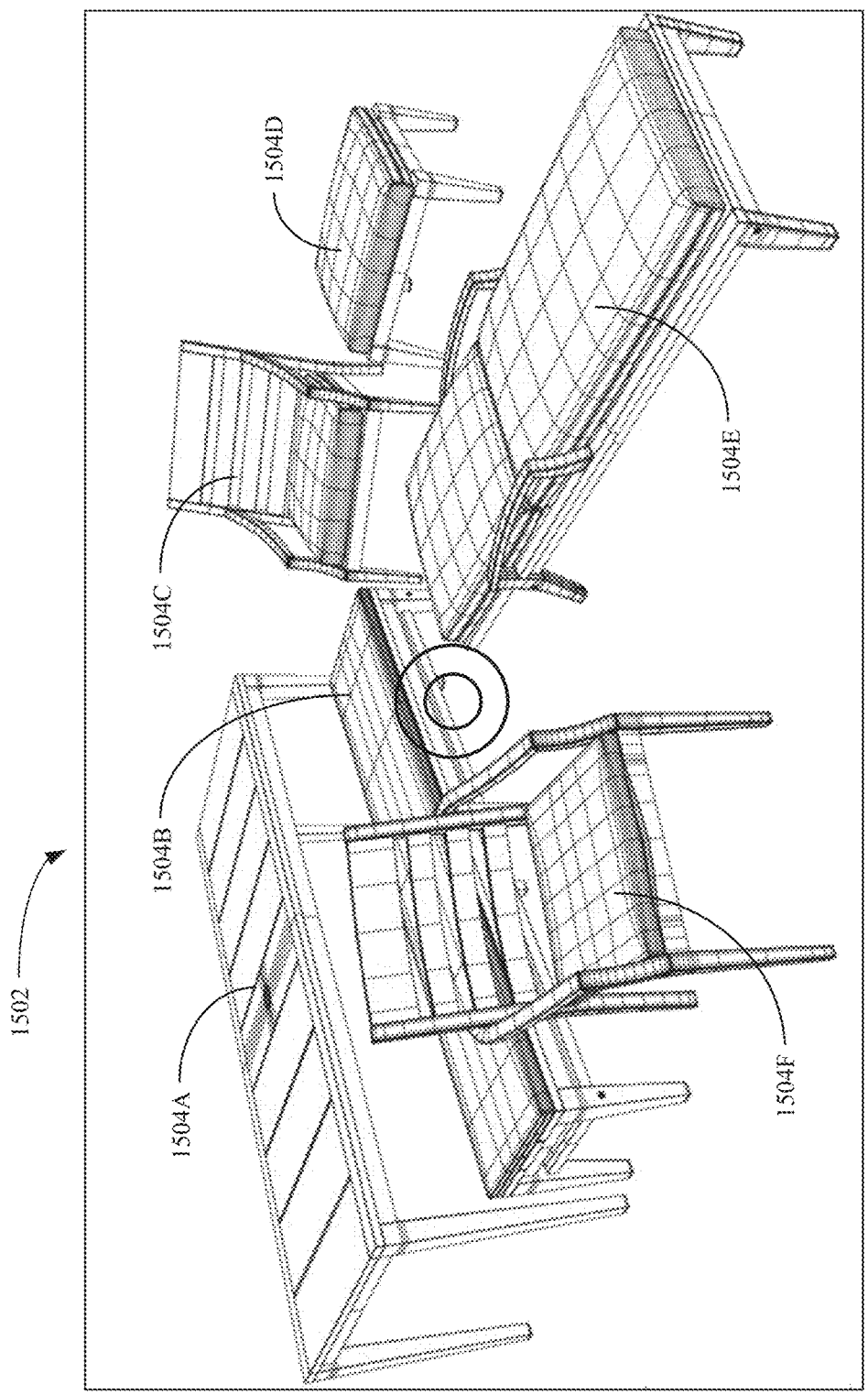
FIG. 15B is an illustration depicting example visual boundaries, displayed in a GUI, for the plurality of objects displayed in FIG. 15A.

FIG. 15B illustrates an example display of GUI 1502 displaying visual boundaries 1504A-F for the multiple objects displayed in FIG. 15A. Similar to FIG. 14B, the visual boundaries adhere to the contours of the objects to be scanned. If multiple objects are to be scanned, the user device may guide the user in scanning one object at a time. For example, the user device may guide the user to scan the object using a sequence of preferred paths, where a preferred path corresponds to one of the objects being scanned. Alternatively, the user device may guide the user to scan more than one object concurrently. Therefore, the preferred path may be for scanning more than one object at a time. For example, two objects in close proximity may both be scanned from one side and then the other side instead of guiding the user to proceed around and scan each side of one object before repeating for the next object. Additional computing resources may be required to scan multiple models concurrently than to scan objects sequentially, but scanning multiple objects concurrently may reduce the total time required for scanning all of the objects.

Figure 15C:
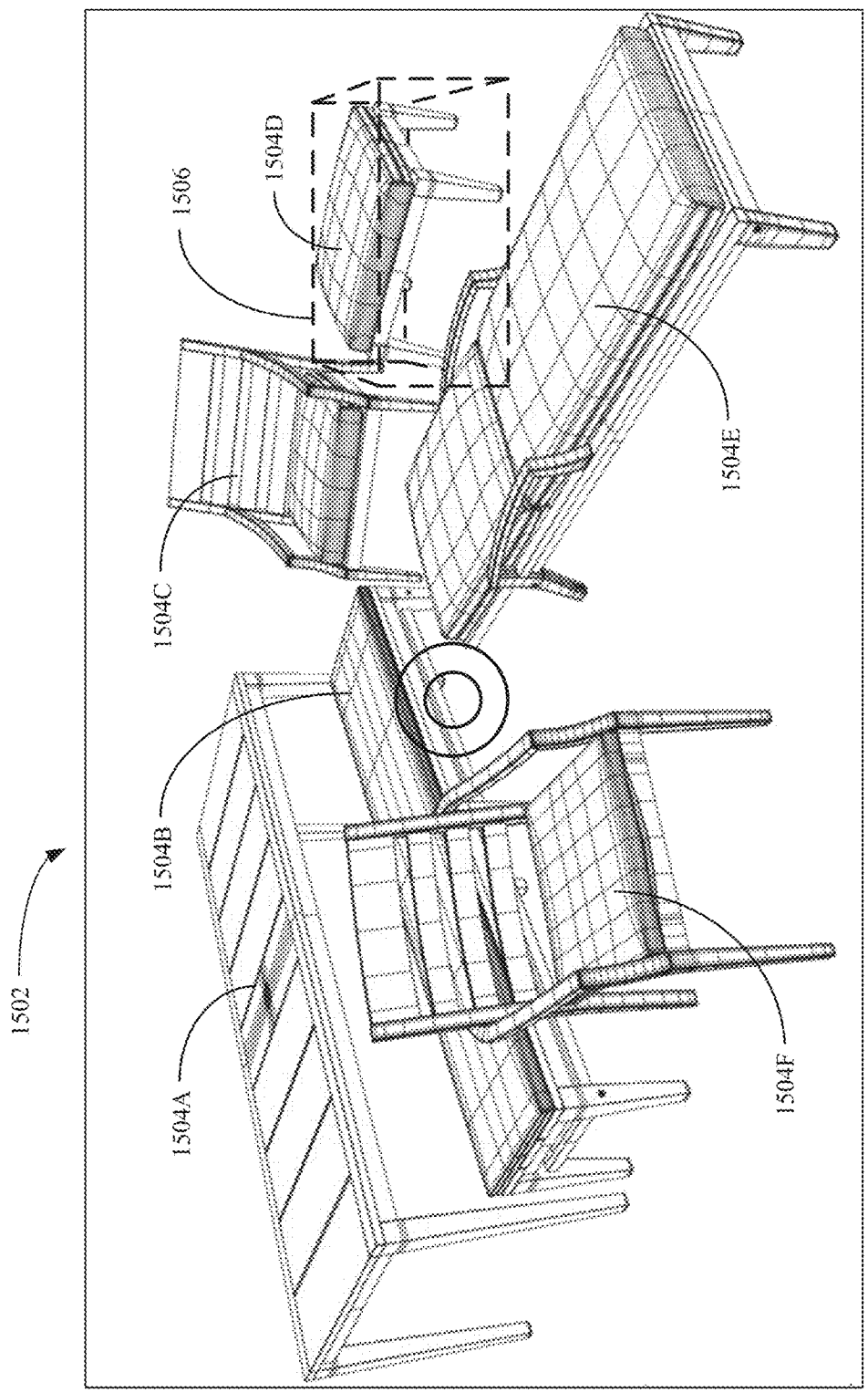
FIG. 15C is an illustration depicting an example display of a GUI displaying the example visual boundaries in FIG. 15A, where the object associated with the identified visual boundary is to be scanned.

The user device may also adjust what is being displayed by the GUI to assist the user in seeing the rendering and if any holes exist (and the severity of the holes) in the rendering. In some examples, if an object is further from the scanner than typical for scanning, the GUI may focus on the object being scanned (such as zooming in on the object). FIG. 15C illustrates an example display of GUI 1502 displaying visual boundaries 1504A-F, where the object associated with visual boundary 1504D is to be scanned. In some example aspects, the user device uses a bounding box 1506 to crop the display so that objects only in the bounding box may be displayed (such as the ottoman associated with visual boundary 1504D). The bounding box 1506 may also be used to crop the rendering to information captured within the designated volume or area (which may preserve computing resources). The user device may use any information to determine how to crop and preview the image within bounding box 1506, as well as how to position and size the bounding box 1506. For example, the resolution of the display, the size of the display, the processing power of the user device, the type of object to be scanned, the distance of the object from the scanner, the amount of detail of the object (such as ornate carvings, inscriptions, and so on), user tendencies in scanning (such as how well the user recognized holes for previous scans), and so on may be used by the user device to determine the dimensions and location of the bounding box 1506 for scanning the object.

Figure 15D:
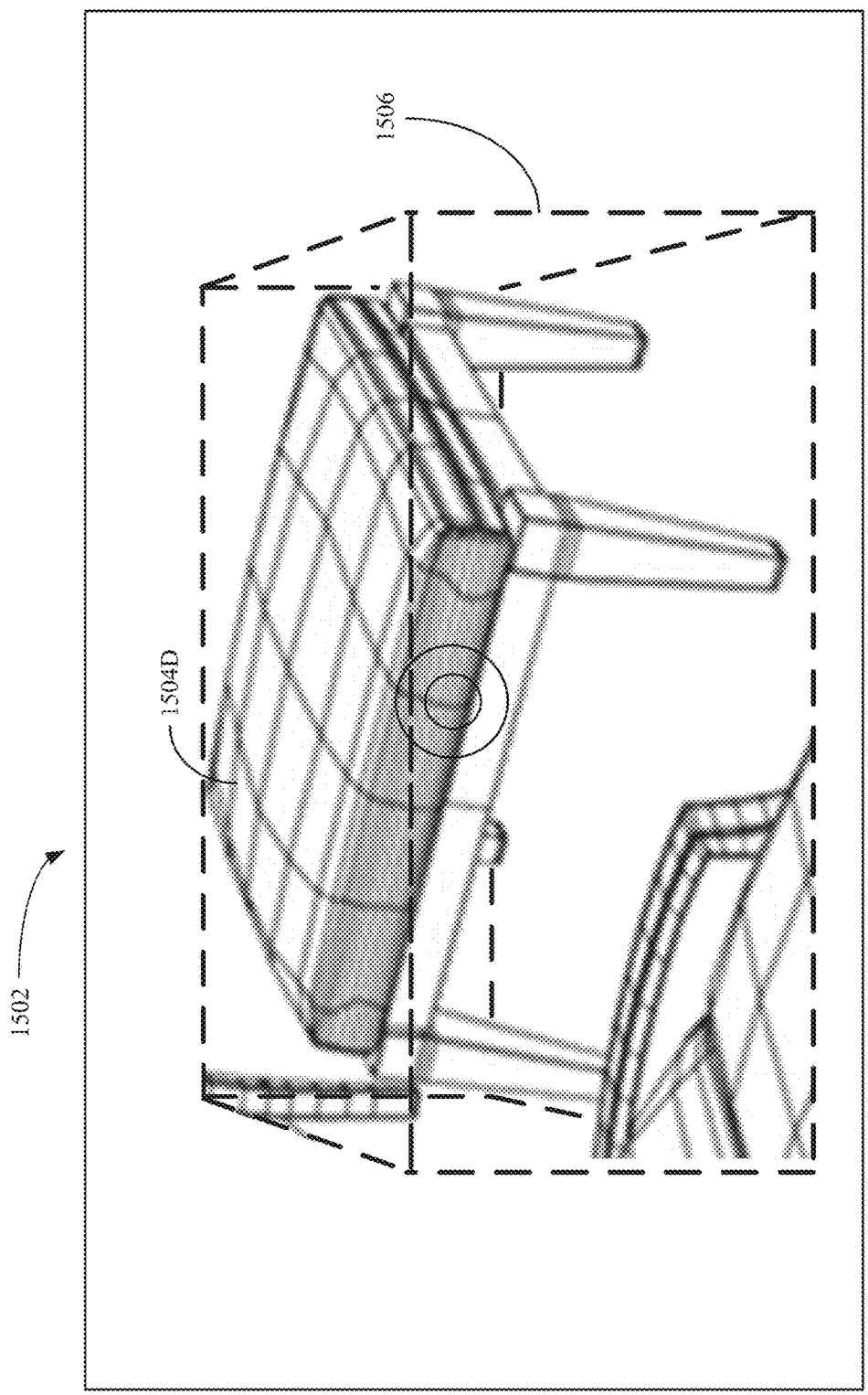
FIG. 15D is an illustration depicting an example display of the GUI in FIG. 15C displaying a zoomed view of the identified visual boundary in FIG. 15C.

Upon creating the bounding box 1506, the GUI may zoom in on the bounding box 1506 (such as to a predefined size on the screen, beyond a threshold size for the bounding box, and so on). FIG. 15D illustrates an example display of GUI 1502 displaying a zoomed view of the bounding box 1506 in order to assist the user in scanning the object associated with visual boundary 1504D. In an example of the bounding box being used to crop what is captured by the scanner, a point cloud being rendered may include only points for areas within the bounding box 1506, or the GUI 1502 may display a rendering for only what is in bounding box 1506. As a result, the user may be able to more readily identify holes in the rendering for the object associated with visual boundary 1504D because the holes will be larger in the GUI 1502 than if the GUI does not show a zoomed view of the rendering (such as in FIG. 15C). Alternatively, the GUI may instruct the user to move the scanner closer to the object (such as by requesting the user to fit the bounding box 1506 from FIG. 15C to an approximate size and location of bounding box 1506 in FIG. 15D).

Figure 16A:
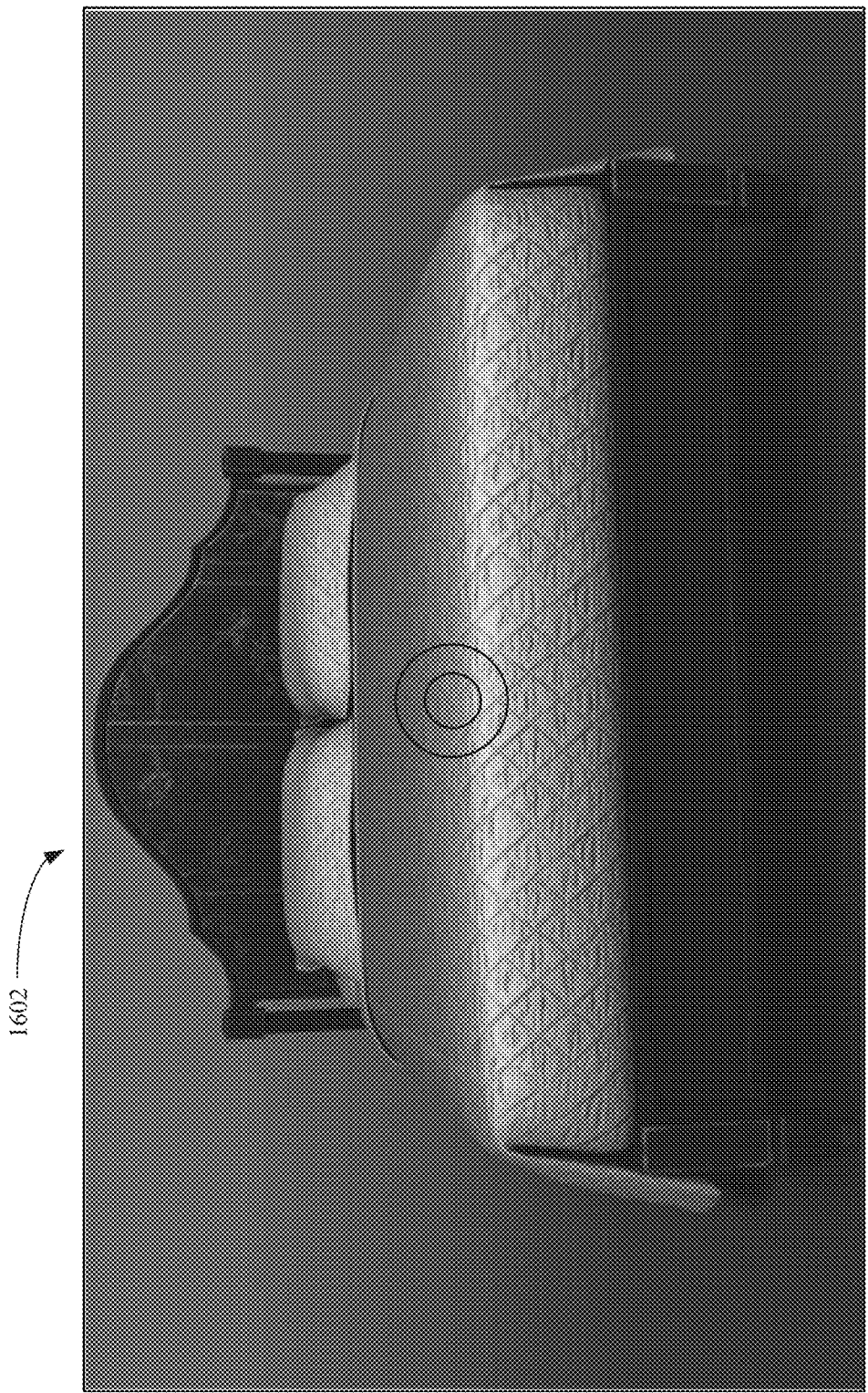
FIG. 16A is an illustration depicting an example display of an object to be scanned in accordance with some aspects of the present disclosure.
Figure 16B:
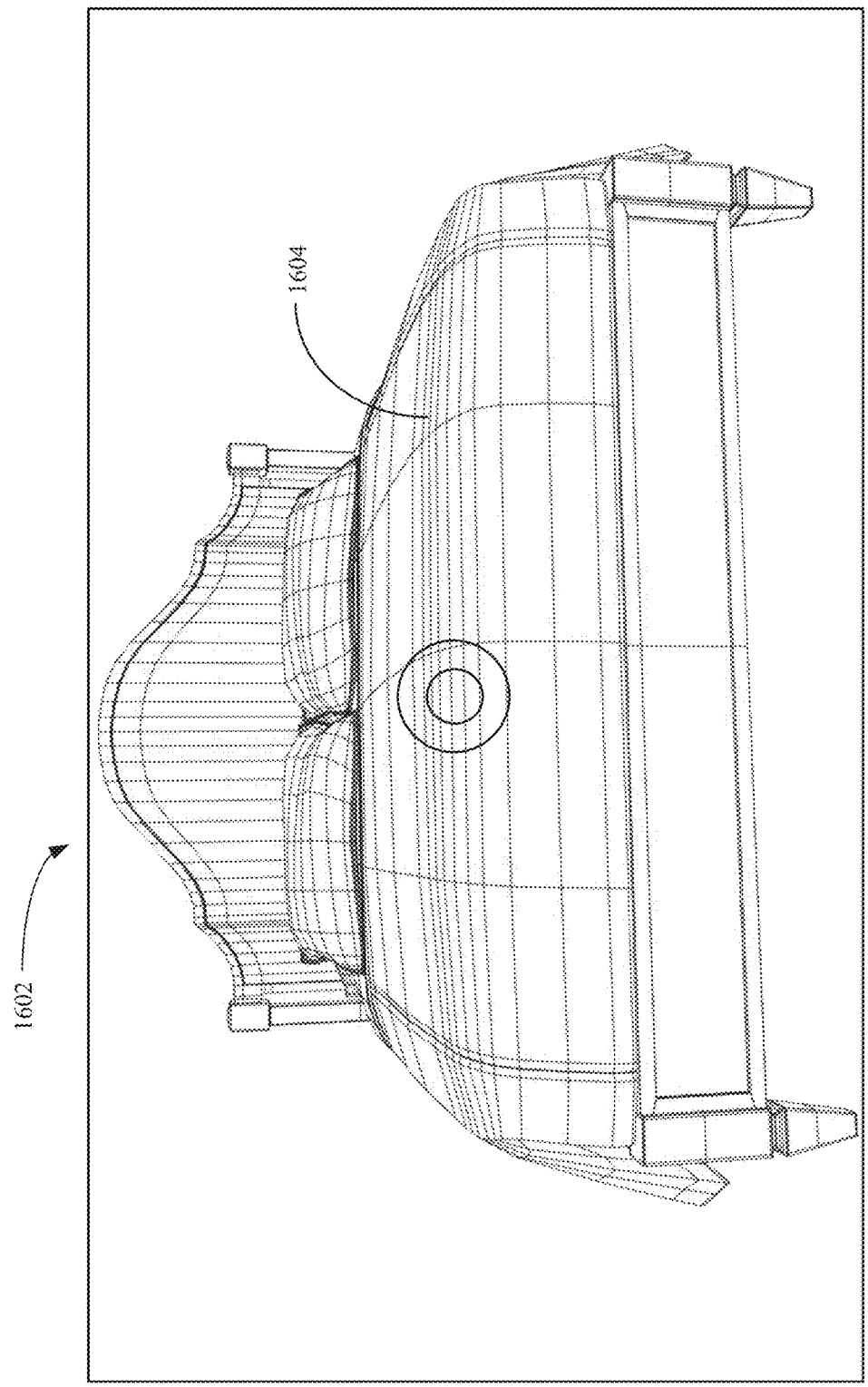
FIG. 16B is an illustration depicting an example visual boundary, displayed in a GUI, for the object displayed in FIG. 16A.

FIG. 16A illustrates an example display of GUI 1602 for yet another object to be scanned. In the example, a king size bed is to be scanned. As similarly described for FIG. 14A and FIG. 15A, the visual boundary may adhere to the contours of the object. FIG. 16B illustrates an example display of GUI 1602 displaying an example visual boundary 1604 for the object in FIG. 16A.

Referring back to FIG. 16A, portions of the object may be difficult to discern or differentiate from the background or environment. Shadows, low lighting, or other conditions may cause difficulty for the user to determine the borders of the object in a displayed image. For example, the baseboard of the bed in FIG. 16A blends with the floor underneath the bed so that it is difficult to discern the edges of the bed.

Figure 16C:
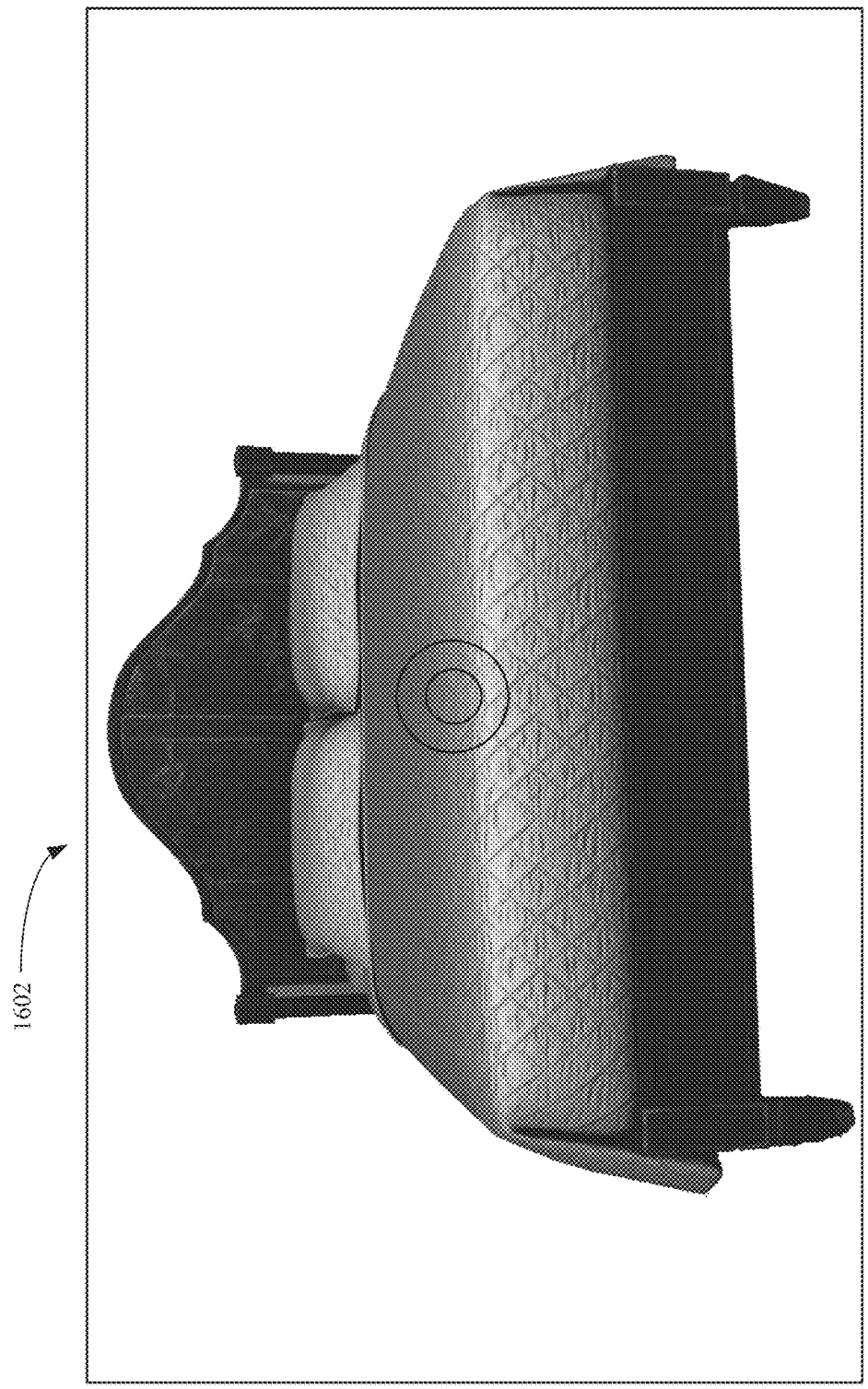
FIG. 16C is an illustration depicting the example display of a GUI displaying the object in FIG. 16A, where the background for the object is replaced.

In some examples, the GUI 1602 may overlay the visual boundary (such as visual boundary 1604) on the object being scanned (such as the bed in FIG. 16A) to assist the user in identifying the edges of the object. Additionally or alternatively, the user device may alter the image being displayed on GUI 1602 so as to better differentiate between the object and the background. For example, the brightness, contrast, and/or other features of the displayed image may be adjusted. In another example, the displayed background may be replaced with a uniform color (such as black or white). To do so, the user device may, e.g., use the visual boundary to crop the background or environment so that it can be replaced in the displayed image on the GUI 1602. FIG. 16C illustrates the example display of GUI 1602 where the background for the object being scanned is replaced with a uniform white background. In comparing FIG. 16A to FIG. 16C, the edges of the bed (including the baseboard) are more easily discernible in FIG. 16C than in FIG. 16A. Being able to better identify edges of the object in the GUI 1602 may allow the user to better focus on or direct the scanner toward the object during scan.

As previously described regarding FIG. 15C and FIG. 15D, the GUI may display a zoomed view to assist the user in better identifying holes and the severity of the holes in a rendering. In some aspects of the present disclosure, the GUI may be able to display objects, renderings, visual boundaries, and so on at different zoom levels so that the GUI displays different user perceived distances from the object to be scanned. Additionally, the GUI assisting a user in performing a scan may include moving between different zoom levels to assist the user in identifying portions of the object to be scanned or holes in the rendering to be filled. For example, the user device may guide the user to move the scanner along a preferred path at the lowest zoom level (the zoom level perceived by the user to place the object farthest away). The user device may then guide the user to move the scanner along a preferred path in scanning at increasing zoom levels. As a result, scanning when the GUI displays at the lowest zoom level may be for a general rendering where larger features of the object are captured, but smaller details of the object may not yet be completely captured. Zoom may be optical, digital, or a combination of both. Additionally, zoom levels may be at any value and not limited to uniform increments (e.g., 1×, 1.2×, 2×, 3.5×, and so on). Zoom levels may also be user defined and/or a sliding scale instead of a step function of zoom levels.

For example, referring back to FIG. 16B and FIG. 16C, the GUI 1602 is displaying the object or visual boundary at the lowest zoom level (e.g., 1×). Scanning the bed at the lowest zoom level may create a rendering of the bed including general features (such as the bed having legs, the general shape of the baseboard, the general shape of the headboard, the positioning of a quilt or comforter, the existence and positioning of two pillows, and so on). In one example, though, the rendering may not include details regarding carvings in the legs, baseboard or headboard, patterns or undulations in the quilt or comforter, folds and creases in the fabrics, topographical features and designs of the pillows, and so on. For the example object in FIG. 16C, the rendering may not include sufficient information for where the two pillows meet on the bed. Therefore, the GUI may zoom in to the location on the bed where the two pillows meet in order to assist the user in moving the scanner to obtain such information.

Figure 16D:
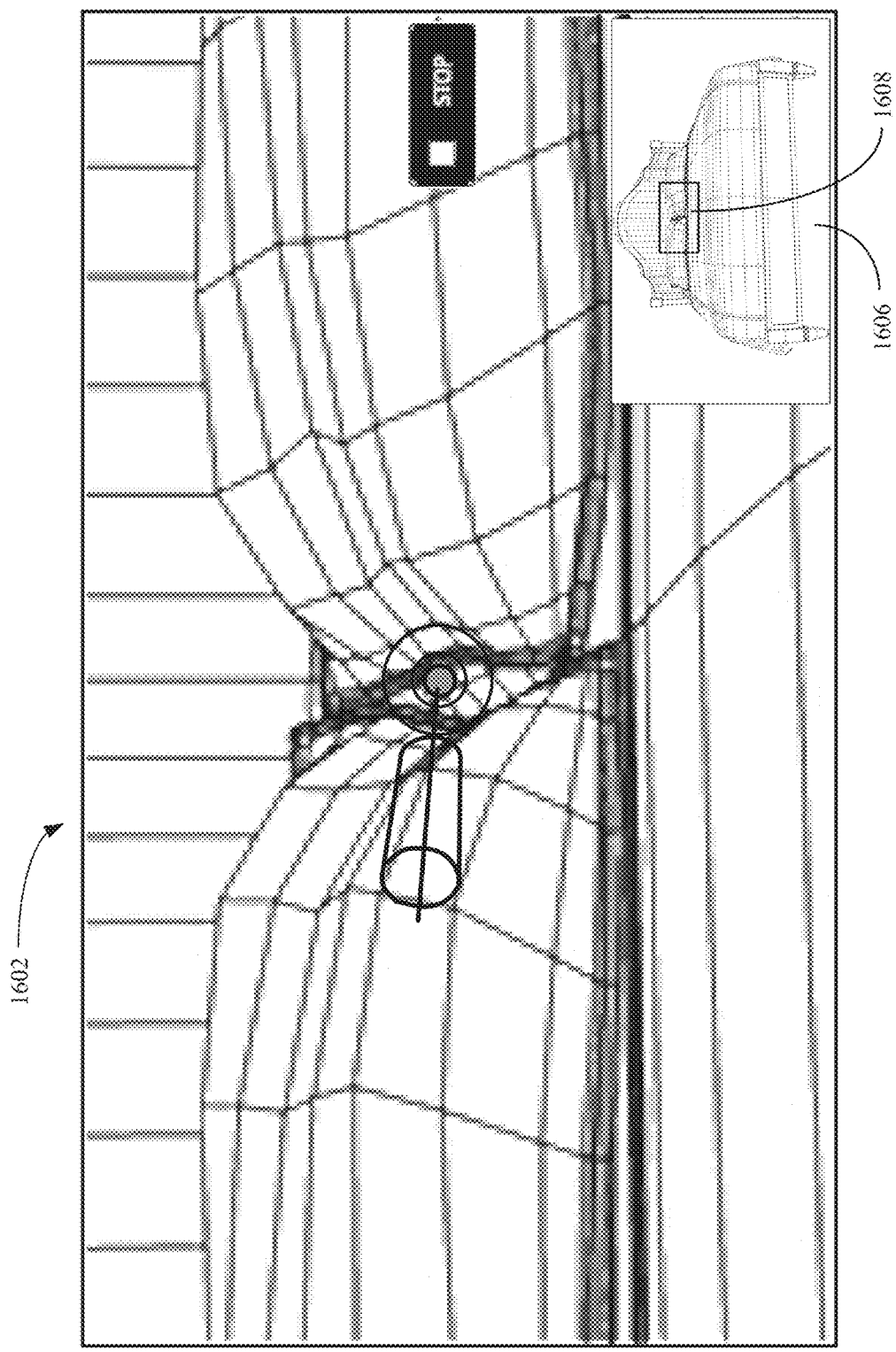
FIG. 16D is an illustration depicting an example display of the GUI in FIG. 16C displaying the visual boundary in FIG. 16B at a higher zoom level than illustrated in FIG. 16B.
Figure 16E:
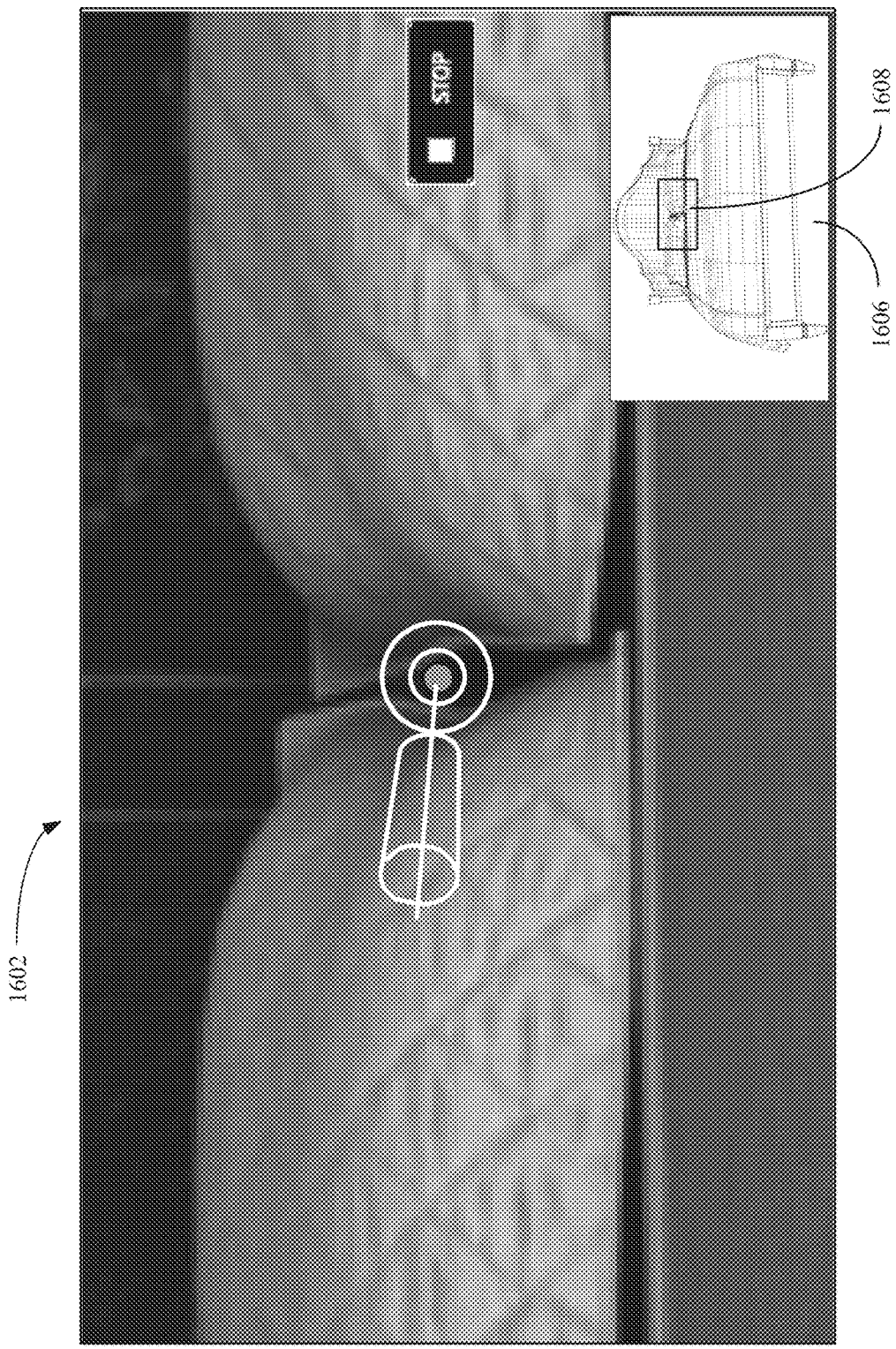
FIG. 16E is an illustration depicting an example display of the GUI in FIG. 16C displaying the portion of the object (or rendering of the object) in FIG. 16A corresponding with the displayed portion of the visual boundary in FIG. 16D, where the object (or rendering of the object) is displayed at a higher zoom level than illustrated in FIG. 16A.

When displaying portions of the object (or rendering) at different zoom levels, the GUI may include a window or preview displaying the overall object, rendering or visual boundary (or alternatively, a lowest zoom level view) within the higher zoom level view. The window may thus give perspective to the user as to what portion of the object relates to the current image by the GUI. FIG. 16D illustrates an example display of GUI 1602 displaying a visual boundary at a higher zoom level than in FIG. 16B. Referring back to the example of scanning in more detail where the pillows meet on the bed, the user device may display the higher zoom level view to show the portion of the bed where the two pillows meet. The GUI 1602 may display window 1606 to show the user what portion of the object the GUI is currently displaying (such as 1608 identifying the area being displayed at a higher zoom level). The GUI 1602 shows a target marker, position marker, and a sight for assisting the user in moving the scanner. However, any appropriate objects may be displayed or processes may be used for assisting the user in scanning while the GUI illustrates at a higher zoom level. FIG. 16E displays an example display of GUI 1602 displaying the object (or a rendering of the object) at a higher zoom level, corresponding with the visual boundary displayed at a higher zoom level in FIG. 16D.

In some examples where the user device may adjust the preferred path for scanning (such as adjusting the number of waypoints, order of waypoints, and so on), the user device may adjust when and the frequency for the GUI to change zoom levels during scanning. Additionally or alternatively, when the user device updates the preferred path as a result of holes in the current rendering, the GUI may provide a visual notification that the scan path is being updated. For example, the zoom level may be increased to assist the user in identifying locations needing further scanning so that the user understands why the preferred path is updated to retrace portions of the object already scanned.

While the window 1606 is illustrated as displaying the visual boundary in FIG. 16D and FIG. 16E, the window may show any representation of the object, such as a current view of the object, a previous scan capture of the object, the current rendering of the object, and so on. Additionally, while the window 1606 appears in the lower right hand corner of the GUI 1602, the window 1606 may be positioned anywhere (and may be any size) within GUI 1602. Furthermore, the user may be able to move the window 1606 by touching and dragging the window to a new position, or resize the window 1606 by pinching in or out the user's fingers while touching the window 1606. Additionally, the user may be allowed to change the display settings of the window 1606, such as cycling through views of the object, the current rendering, the visual boundary, or a combination thereof. The GUI may also be configured to allow the user to switch the window 1606 display with the current display (such as by double tapping the window 1606 so that the higher zoom level is displayed within the window 1606 while the lower zoom level is displayed within the remaining portion of the GUI 1602).

In other aspects, the GUI 1602 may allow the user to determine what zoom level is to be displayed by the GUI 1602. For example, a user may want to verify that portions of the object are sufficiently captured by the present scan. Therefore, when the GUI 1602 displays the rendering at a first zoom level (such as the lowest zoom level), the user may select a portion of the rendering to view at a higher zoom level (such as by double tapping, pinching, and so on). The window 1606 may thus display the previous view while the GUI 1602 displays the higher zoom level for the desired location. As a result, the user may be able to look through portions of the rendering at higher zoom levels to verify that the scanning is complete for the corresponding portions of the object.

As illustrated in the examples for FIGS. 14A-16E and as previously described, the visual boundary may adhere to the contours of the object being scanned. In some examples, the user device may determine the visual boundary by identifying the object to be scanned and generating a visual boundary. In generating the visual boundary, the user device may select a predefined visual boundary associated with the object (such as a generic chair visual boundary for chairs, a generic car visual boundary for different cars, and so on) and adjust the predefined visual boundary to adhere to the contours of the specific object to be scanned.

Figure 17A:
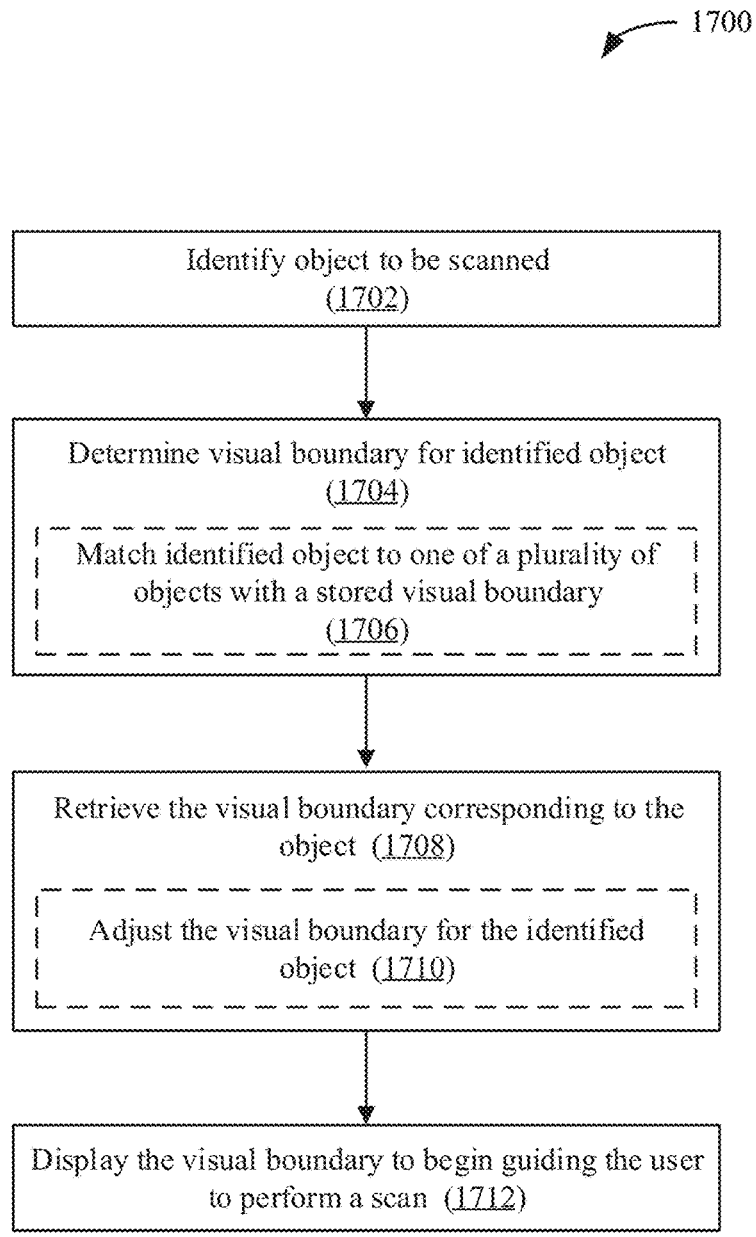
FIG. 17A is an illustrative flow chart depicting an example operation for a user device to generate a visual boundary for an object to be scanned.

FIG. 17A is an illustrative flow chart depicting an example operation 1700 for a user device to generate a visual boundary for an object to be scanned. Beginning at 1702, the user device may identify the object to be scanned. In some aspects, the user inputs information regarding the object (such as the type of object, the general shape of the object, and so on). In further aspects, the user device may use object recognition to identify the object (or the general shape of the object). Proceeding to 1704, the user device determines a visual boundary to be used for the identified object. For example, the user device may have stored (or have access to a database that stores) a plurality of different visual boundaries, wherein each visual boundary corresponds to a type of object. As an option for determining the visual boundary, the user device may search the stored visual boundaries to match the identified object to a type of object associated with one of the stored visual boundaries (1706). In another option, the user device may generate a new visual boundary by determining the edges and contours of the object and creating the visual boundary using such edges and contours. Alternatively, if the user device does not match the identified object with a type of object in 1706, the user device may also generate a new visual boundary. Alternative to 1702-1706, a user may select a stored, preexisting visual boundary to be used for the object. In yet another alternative, the user may draw the visual boundary on the GUI.

With the visual boundary determined by the user device in 1704, the user device may retrieve the visual boundary in 1708. In retrieving the visual boundary, the user device may adjust the retrieved visual boundary for the identified object (1710). Example adjustments include resizing the visual boundary, stretching or pinching portions of the visual boundary, adding contours and undulations to portions of the visual boundary, removing portions of the visual boundary, adjusting the orientation of the visual boundary, and so on. For example, if the identified object is the car illustrated by GUI 1402 in FIG. 14A and the retrieved visual boundary is a boundary for a generic car (irrespective of the car's make and model, year, and so on), the user device may expand the wheel well portions of the retrieved visual boundary (since the tires are larger racing tires than typically used for cars), remove portions of the visual boundary associated with backdoors (since the car is a two door coupe), smooth the contours of the visual boundary (since the car is more aerodynamic than, e.g., a 4 door sedan), and so on. Upon retrieving the visual boundary, the user device may display the visual boundary on the GUI (1712). The visual boundary may then be used by the user device to guide the user in moving the scanner along a preferred path for scanning.

Figure 17B:
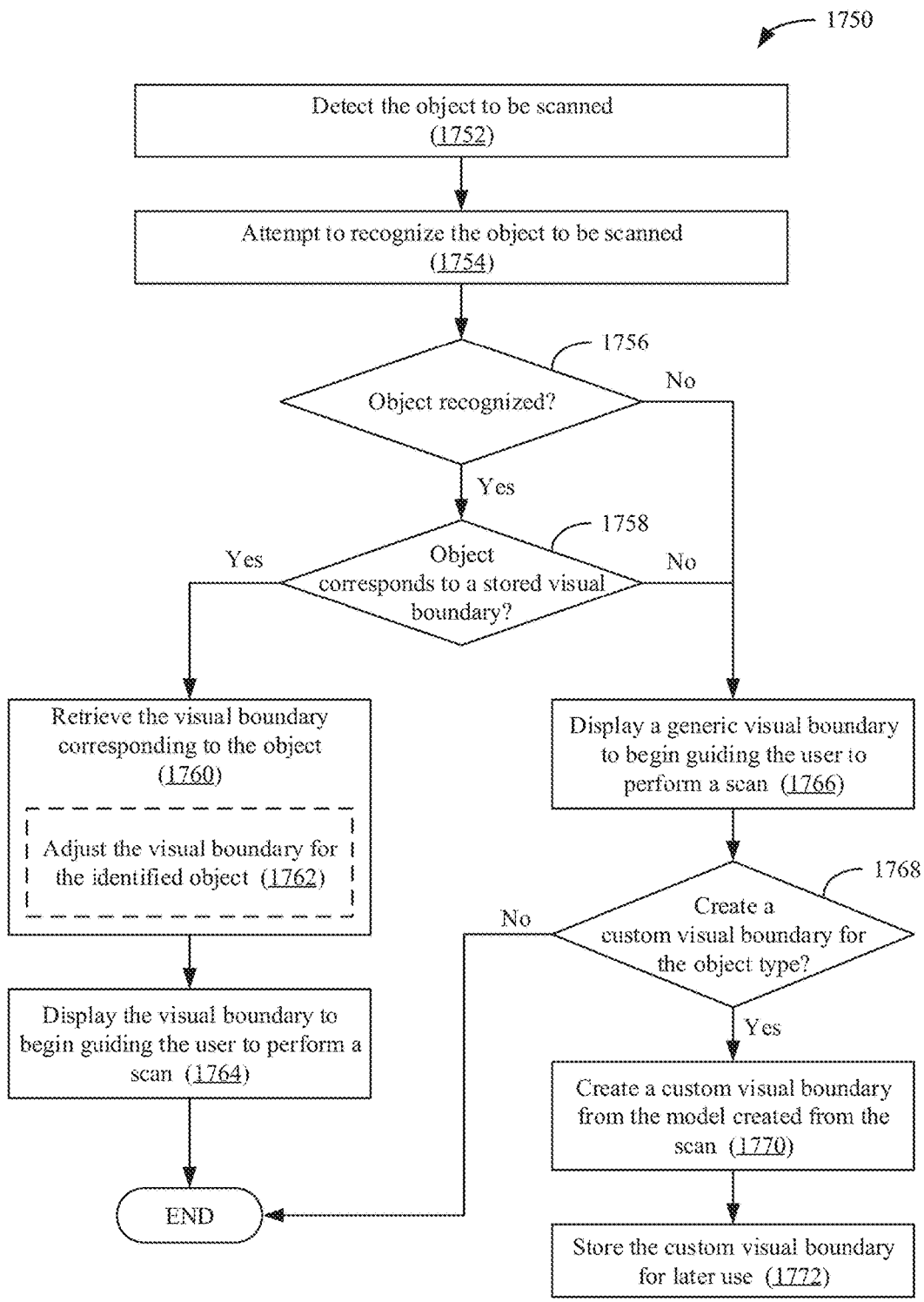
FIG. 17B is an illustrative flow chart depicting another example operation for a user device to determine a visual boundary for an object to be scanned.

FIG. 17B is an illustrative flow chart depicting another example operation 1750 for a user device to determine a visual boundary for an object to be scanned. With the user device storing one or more visual boundaries (which may correspond to some types of objects), the user device may update the catalog of stored visual boundaries as different types of objects are scanned. Beginning at 1752, the user device may detect the object to be scanned. In some example implementations, the user device may determine the border of an object centered by the target marker on the GUI. Additionally or alternatively, the user device may use machine learning to determine the types of objects typically scanned by a user or the user device, and attempt to detect such types of objects for scanning.

Once the user device detects the object to be scanned (1752), the user device may attempt to recognize the object to be scanned (1754). In recognizing the detected object, the user device may attempt to recognize the type of object (such as a car, truck, person, head, chair and so on). In some example implementations, the user device may use machine learning on previous scans in order to determine characteristics of different types of objects. Thus, the user device may compare characteristics of the object to be scanned with the determined characteristics of previously scanned objects. Further, characteristics of different types of objects may be provided to the user device for use in attempting to recognize the object to be scanned. Additionally, types of objects may be separated at any level of granularity (such as from automobiles, to personal vehicles or commercial vehicles, to cars, vans, or trucks, and so on).

For example, the user device may recognize the object to be an automobile, but the user device is to further recognize whether the automobile is a van, truck, or car (such as when the user device includes a different visual boundary for a van, for a truck, and for a car). Thus, the user device may attempt to determine the size of the back of the automobile relative to the rest of the automobile. If the bed of the automobile is extended and heightened, then the user device may recognize the object as a van. If the bed of the automobile is extended but not heightened or shorter than the cab of the automobile, the user device may recognize the object as a truck. If the back of the automobile is neither extended nor changes height in relation to the front of the automobile, the user device may recognize the object as a car. While some examples are providing in recognizing an object to be scanned, any process of object recognition may be used (such as a user selectable menu and so on). Therefore, the present disclosure should not be limited to the provided examples.

Referring back to FIG. 17B, if the object is recognized (1756), the user device may attempt to find a corresponding visual boundary for the object. In some example implementations, the user device may attempt to find a corresponding visual boundary stored on the user device. In some further example implementations, the user device may access a database or other remote repository of visual boundaries to attempt to find a corresponding visual boundary. If the recognized object corresponds to a stored visual boundary (1758), the user device may retrieve the corresponding visual boundary (1760). In retrieving the visual boundary, the user device may optionally adjust the visual boundary for the object to be scanned (1762). For example, the user device may orient the visual boundary, stretch or modify the contours of the visual boundary, and so on. The user device may then display the visual boundary to begin guiding the user to perform a scan of the object (1764).

If the user device does not recognize the detected object (1756) or the user device does not identify a visual boundary corresponding to the recognized object (1758), the user device may display a generic visual boundary to be used for the scan (1766). For example, if the generic visual boundary is a dome (such as the visual boundary illustrated in FIG. 7-FIG. 12), the user device may size a dome to the size of the detected object and place the dome over the object on the GUI. Hence, the user device performs the scan of the object using the dome.

When a model is created or rendered for the object from the scan performed using a generic visual boundary, the user device may determine whether to create a custom visual boundary for the detected object type using the newly created model (1768). For example, the user may be asked whether to create and store a custom dome. In another example, the user device may learn the type of object being scanned has been scanned repeatedly without a corresponding visual boundary, and thus determine to create a new visual boundary for the object type. If the user device is not to create a custom visual boundary, the process ends with the scan completed using the generic visual boundary. If the user device is to create a custom visual boundary (such as the user selecting to create a custom visual boundary), the user device may use the model created from the scan to create the custom visual boundary (1770). In some example implementations, the user device may smooth the contours or dilate a copy of the created model in order to create the custom visual boundary. Once the custom visual boundary is created, the user device may store the boundary for later use (1772). For example, the user device may store the custom visual boundary in a local storage, or the user device may provide the custom visual boundary to a remote repository for storage.

Referring back to 1764, once the scan is complete, the user device may determine whether to update the recently used visual boundary. In some example implementations, the user device may use machine learning to determine improvements to the visual boundary. For example, the user device may observe that the same contouring is performed each time the visual boundary is adjusted for the object type. As a result, the user device may adjust the visual boundary for future use. Alternatively, the user device may create an additional visual boundary for a subset of objects in the object type, thus increasing the granularity in recognizing objects.

In some aspects of the present disclosure, the preferred path (such as the number of waypoints or vantages) may be static. Hence, once the scanner traverses the path (or all vantages are reached by the scanner), scanning is complete. In other aspects of the present disclosure, the preferred path may be dynamic during scanning. Hence, the user device may determine that adjustments are to be made to the preferred path during scanning.

For example, if the user is moving the scanner too quickly along the path such that there is insufficient capture information to fill in some holes in the point cloud, or if the quality of the information is degraded through, e.g., shaking of the scanner by the user, directing the scanner too far off center from the object, and so on, the user device may determine that the GUI should display a sequence of more waypoints along the path, different waypoints to deviate from the path, and/or different or more vantages in order for the scanning to fill any holes in the point cloud. In some aspects, the user device may determine the relative locations of holes in the point cloud and the severity of the holes in order to determine a new or altered path along which to guide the user to move the scanner in order to reduce the amount of time needed to fill in those holes. In other aspects, the user device may use machine learning during the user's operation of the scanner to determine an altered path or sequence of vantages specific to the user's operation of the scanner. For example, if the user better moves the scanner left and right as compared to up and down, the user device may alter the path to include more horizontal movement of the camera as compared to vertical movement of the camera in relation to the object being scanned. In some example implementations, adjusting path or sequence of vantages comprises adjusting the waypoints during a scan. For example, the user device may observe the scan being performed and adjust the number of waypoints and/or location of waypoints based on the current scan. The user device learning and adjusting the waypoints is described below in discussing FIG. 18-FIG. 20. Additionally or alternatively, as previously described, the user device may update when and how frequent to change the zoom level if the GUI changes zoom levels during scanning.

Figure 18:
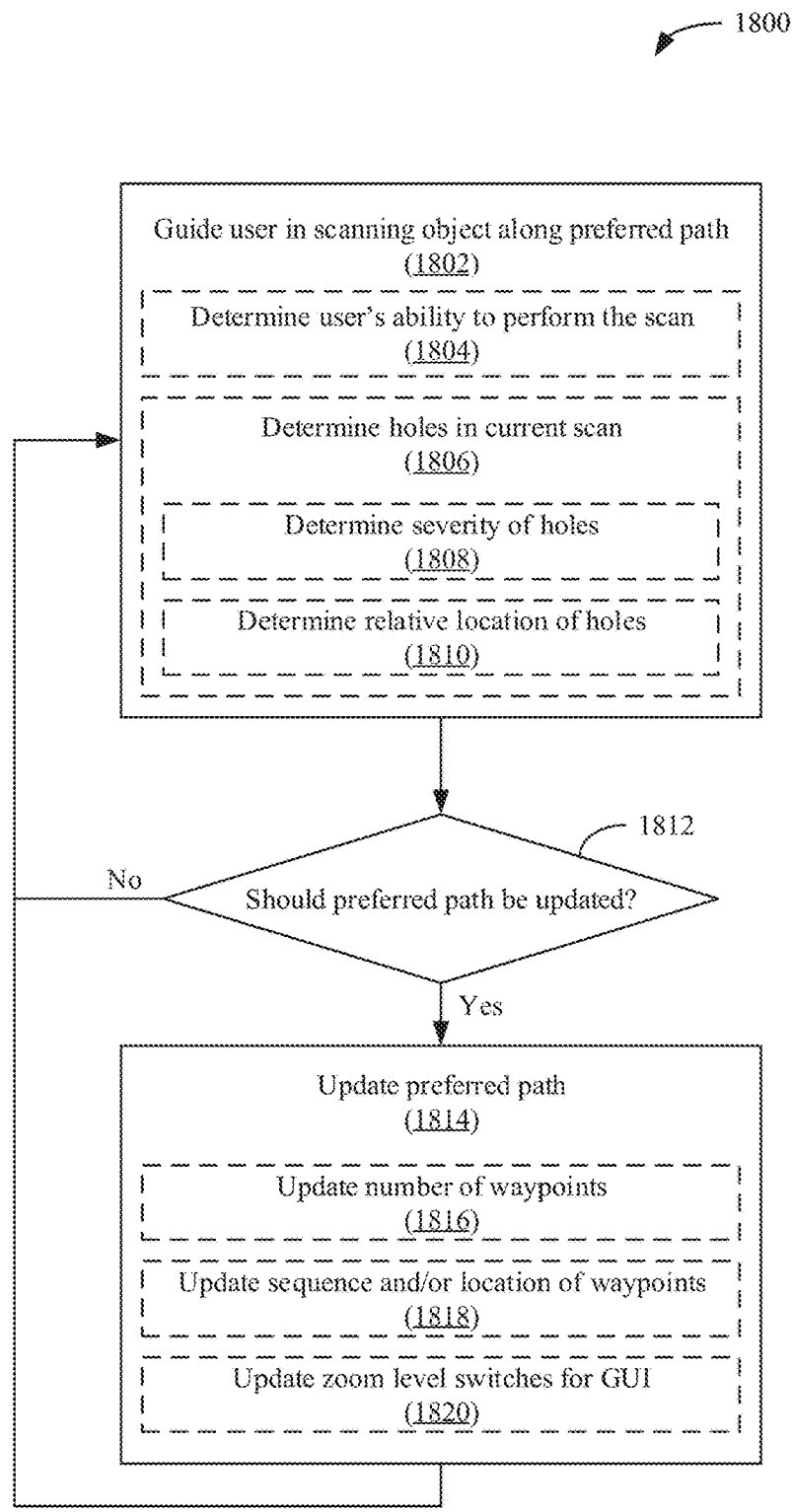
FIG. 18 is an illustrative flow chart depicting an example operation for a user device to update the preferred path for moving the scanner in assisting with scanning.

FIG. 18 is an illustrative flow chart depicting an example operation 1800 for a user device to update the preferred path for moving the scanner in assisting with scanning. Beginning at 1802, the user device guides the user in scanning the object along a preferred path. For example, a GUI may direct the user to move the scanner so that a scanner position marker and a target marker displayed on the GUI align, progressing the user to move the scanner along a plurality of waypoints of the preferred path.

In guiding a user to scan an object along a preferred path, the user device may observe the scan being performed and determine whether to adjust the preferred path. Determining to update or adjust the preferred path may be based on one or more of a plurality of factors. As previously described, such factors may include a user's ability to scan (such as from previous scans by the user or information regarding the current scan), existence of holes in the current scan or rendering, severity of holes in the current scan or rendering, relative location of holes, and so on. If updating the preferred path may be based, at least in part, on the user's ability to perform the scan, the user device may optionally determine such ability (1804). For example, the user device may determine if a user has a difficult time moving the scanner slow enough for a sufficient scan along the preferred path. In another example, the user device may determine if the user shakes the scanner (such as nervousness or shaking hands) so as to impact the scan. In a further example, the user device may determine a user's tendencies for scanning (such as is the scanner directed so that the target marker is consistently slightly off center). In yet another example, the user may provide feedback (such as through the GUI) if the user is having difficulty in performing the scan. The user may also provide feedback if portions of the object need more focus during scanning (such as for carvings, inscriptions, facial features of a person, and so on). In another example, the user device may determine if the scanner deviates from the preferred path (such as by a threshold distance, a threshold amount of time, or a combination of both) to determine if the preferred path is to be updated to place the scanner back on the preferred path.

Figure 19:
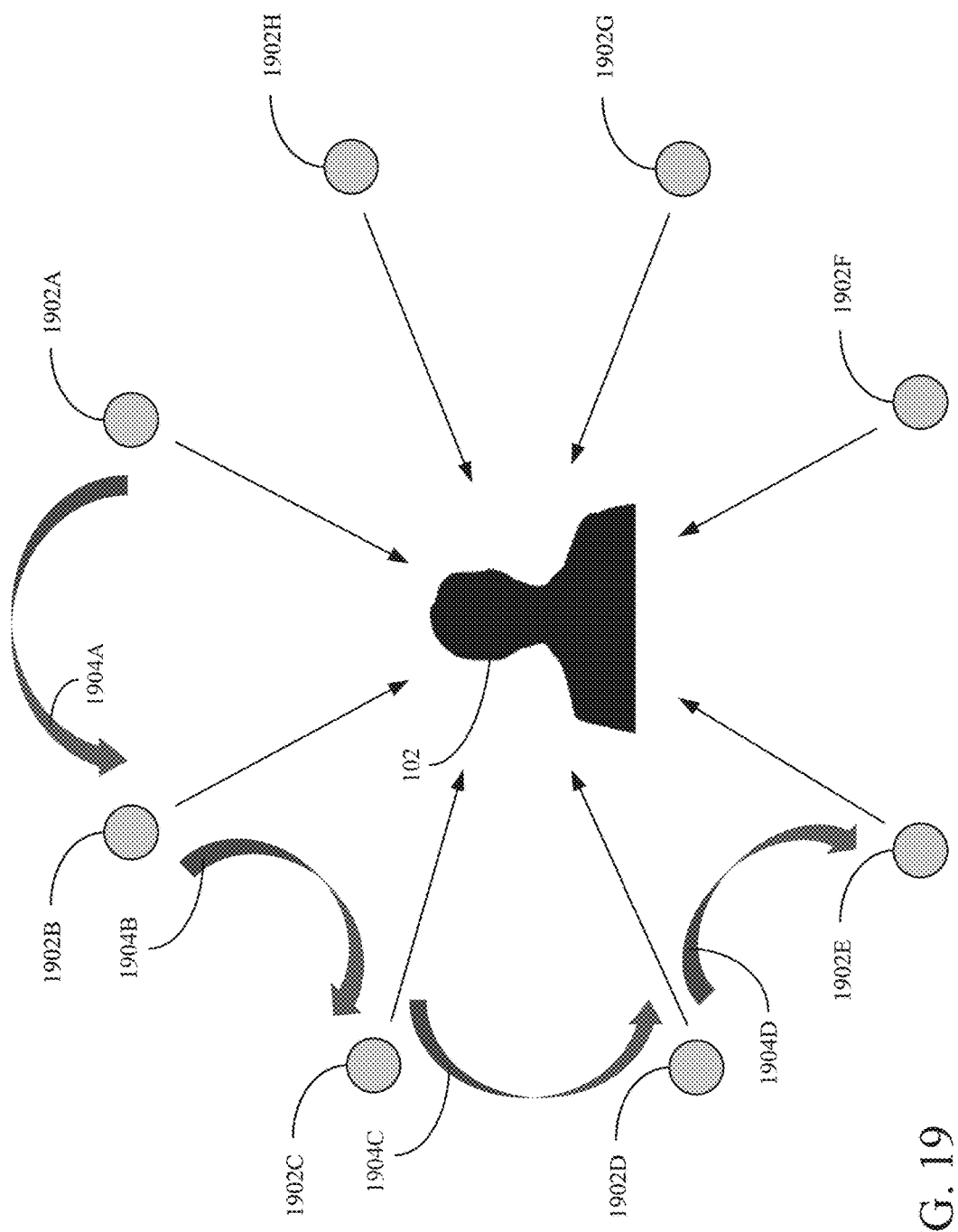
FIG. 19 is an illustration depicting an example scanner movement between waypoints during scanning.

FIG. 19 is an illustration depicting an example scanner movement 1904A-1904D between waypoints 1902A-1902E during scanning. In some example implementations, the user device learns of a user's tendencies or habits during scanning to determine an initial number and location of waypoints 1902A-1902H for guiding the user during scanning. For example, if the user includes bad habits in moving the scanner (such as shaking, inconsistent movements, and so on), the user device may learn from previous scans to include a greater number of waypoints. If the user includes good habits in moving the scanner (such as steady and consistent movements between waypoints), the user device may learn from previous scans to reduce the number of waypoints.

As illustrated in FIG. 19, the scanner moves toward and away from the object 102 when moving between waypoints. For example, when the scanner moves between waypoint 1902A and waypoint 1902B, the scanner moves away from the object 102 (as indicated by movement 1904A). When the scanner moves between waypoint 1902B and waypoint 1902C, the scanner moves away from the object 102 (as indicated by movement 1904B). The scanner again moves away from object 102 during movement 1904C and toward object 102 during movement 1904D. The user device may observe the scanner movements 1904A-1904D and determine that the preferred scan path should be updated (such as by updating the number and/or location of the remaining waypoints 1902F-1902H).

Referring back to FIG. 18, if updating the preferred path is based, at least in part, on holes or missing portions of the model being generated by the current scan, the user device may optionally determine such holes (1806). For example, if the rendering is a point cloud, the user device may determine if there exists an absence of points in any portion of the point cloud. Additionally or alternatively, the user device may determine if the density of points in some areas of the point cloud is less than the density of points in other areas of the point cloud (or below a reference density). In determining holes in the current scan (1806), the user device may optionally determine the severity of the holes (1808). For example, the user device, in determining a density of points in an area of a point cloud, may determine the difference between the density of points of the area and another area of the point cloud (or from a reference density). In another example, the user device may determine the size of a hole (such as the size of an area with no points in the point cloud or the size of an area where the density of points is less than, e.g., a reference density).

Additionally or alternatively in determining holes in the current scan (1806), the user device may optionally determine the location of the holes relative to one another (1810). The location of holes may be used by the user device to determine if a certain portion of the object is not being scanned sufficiently using the preferred path. For example, if lighting comes from one direction toward the object being scanned, portions of the object may not be sufficiently illuminated so that the scanner collects as many points for a point cloud model as desired using the preferred path. Therefore, multiple holes may be located near one another on the distal side of the object from the light source.

Using the determined information (such as from processes 1804-1810), the user device may determine if the preferred path should be updated in 1812. If the user device determines that the preferred path is not to be updated in 1812, then the user device continues to guide the user in scanning the object using the current preferred path (reverting to 1802). If the user device determines that the preferred path is to be updated in 1812, then the user device updates the preferred path in 1814 and guides the user in scanning the object using the adjusted preferred path (reverting to 1802). The user device may determine whether to update the preferred path at any frequency or periodicity. In some examples, the user device might not update the preferred path until an error threshold is reached (such as if a threshold number of holes exist, the severity of the holes reaches a threshold, the current rendering is below a threshold of information at a certain point along the preferred path, and so on). Additionally or alternatively, the user may request that the user device determine if the preferred path should be updated (such as by pressing a button on the GUI, keeping the scanner stationary for a predetermined amount of time, and so on).

Referring back to 1814 (and as previously described), the user device may update the preferred path in a variety of ways. In one aspect, the user device may optionally update the number of waypoints (1816). For example, if the user device determines that the user moves the scanner too quickly between waypoints, the user device may include additional waypoints in between existing waypoints in an attempt to slow the movement of the scanner. In another example, if the user device determines that the user is performing a detailed scan such that the scan can be sped up without impacting the rendering, the user device may remove some of the waypoints in an attempt to speed up the scan. In yet another example, the user device may increase the number of waypoints at locations in the rendering with holes to be filled.

Machine learning may be used to automatically increase or decrease the number of waypoints and/or update the location of the remaining waypoints during a scan. In some aspects of the present disclosure, the user device may learn a user's scanning habits from previous scans. Thus, the initial number of waypoints may be determined based on the user's scanning habits. For example, the device may learn that previous scans include a significant number of holes (e.g., as a result of unsteady scanner movements). As a result, the device may determine to set the initial number of waypoints to assist the user in scanning at a higher number than typical for an object to scanned Updating waypoints and using machine learning to update the waypoints in assisting a user in performing a scan are described below in relation to FIG. 20 FIG. 23.

Figure 20:
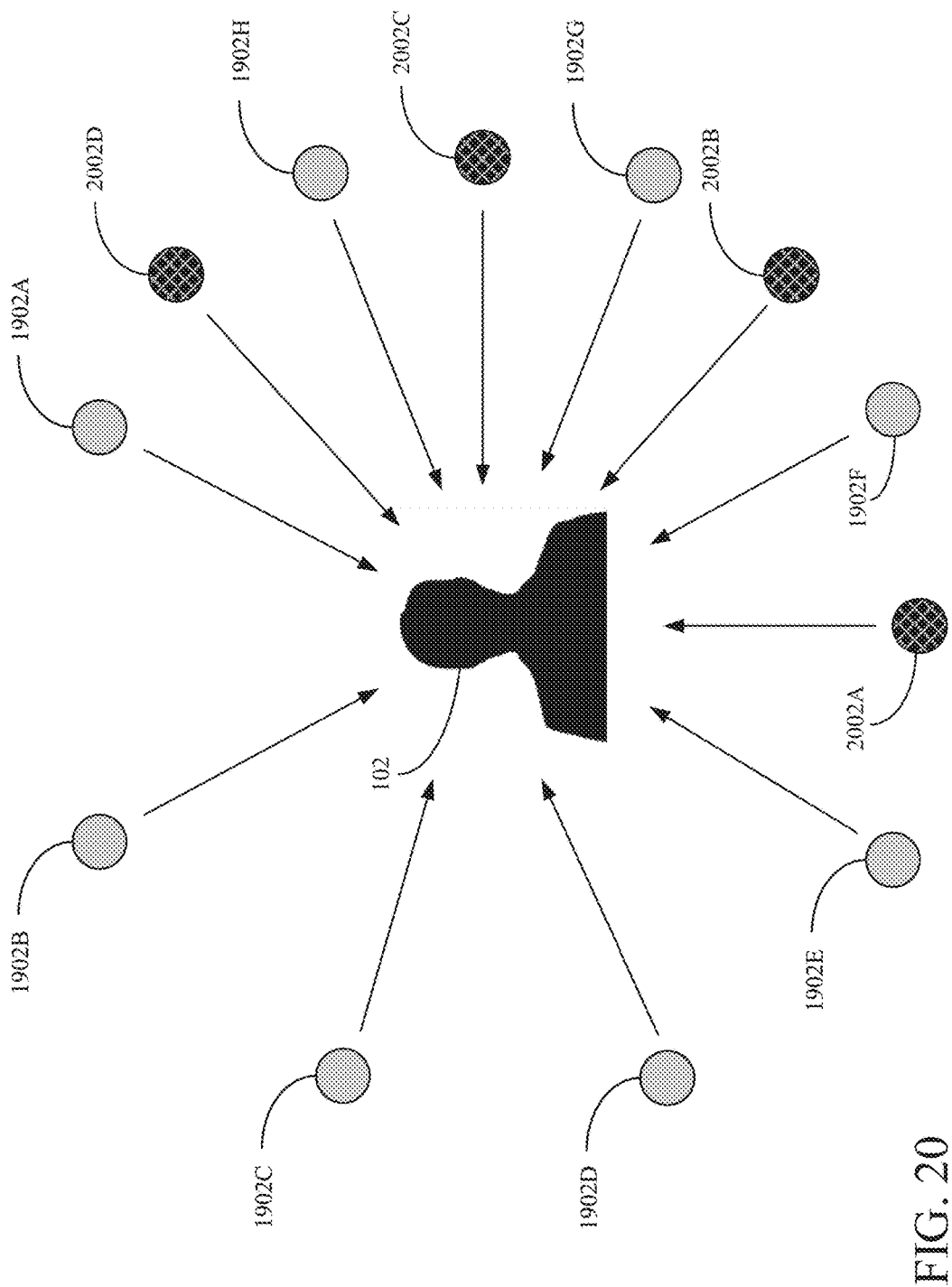
FIG. 20 is an illustration depicting increasing the number of waypoints during scanning based on the scanner movement illustrated in FIG. 19.

In updating the number of waypoints (1816), the user device may increase the number of waypoints to improve the scan quality. For example, the scanner movement 1904A-1904D (FIG. 19) illustrates the scanner swinging toward and away from the object 102 between waypoints. Thus, to prevent such swinging movements, the user device may determine to increase the number of waypoints. FIG. 20 is an illustration depicting increasing the number of waypoints during scanning based on the scanner movement illustrated in FIG. 19. With the scanner located near waypoint 1902E, the user device may decide to include additional waypoints 2002A-2002D among remaining waypoints 1902F-1902H. The decreased distance the scanner may travel between waypoints may improve the scanner movement to thus increase the scan quality. As a result, the user device may guide the scan along an updated preferred path from waypoint 1902E to waypoint 2002A, to waypoint 1902F, to waypoint 2002B, and so on. The amount to increase the number of waypoints may be based on any number of factors. In some example implementations, the user device may determine different levels or thresholds of quality of the present scan. For example, the user device may observe any holes existing from the previous scanner movements. The size and frequency of the holes may then be used to determine the quality of the scan. The quality of the scan may then be used to determine the number of waypoints to include. Worse scan qualities may thus lead to a larger number of waypoints to be added.

Figure 21:
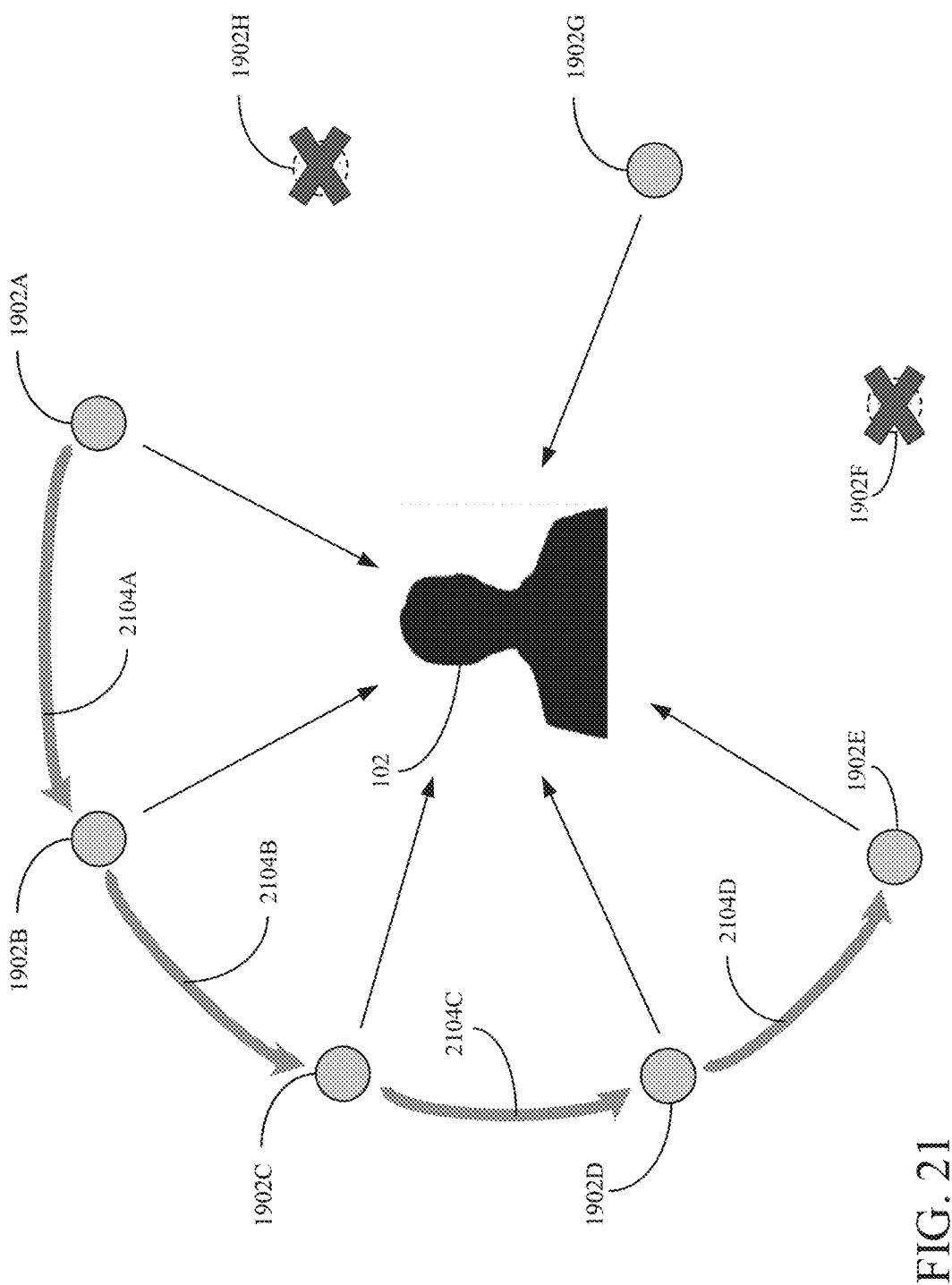
FIG. 21 is an illustration depicting another example scanner movement and decreasing the number of waypoints during scanning based on the scanner movement.

Counter to increasing the number of waypoints, the user device may decrease the number of waypoints if the scan quality is above a threshold. As a result, a scan may be completed in a shorter amount of time with the scan quality still acceptable. FIG. 21 is an illustration depicting a scanner movement 2104A-2104D different from the example illustrated in FIG. 19. The user device may determine that the scanner movement 2104A-2104D between waypoints 1902A-1902E provide a scan of sufficient quality so far that the number of remaining waypoints 1902F-1902H during scanning may be decreased. The amount to decrease the number of waypoints may be based on any number of factors. Similar to determining the number of waypoints to add for poor scan quality, the user device may determine different levels or thresholds of quality of the present scan. The size and frequency of the holes may then be used to determine the quality of the scan. The quality of the scan may then be used to determine the number of waypoints to remove. Hence, better scan qualities may lead to a larger number of waypoints to be removed. While one example of determining the number of waypoints to remove or add is described, any process may be used to determine the number of waypoints to be removed or added. Thus, the present disclosure should not be limited to the examples.

Referring back to FIG. 21, based on observing the scanner movement 2104A-2104D, the user device may determine to remove waypoints 1902F and 1902H, thus leaving remaining waypoint 1902G for use in guiding the scanner. Thus, the user device may guide the user to move the scanner from waypoint 1902E to waypoint 1902G and back to waypoint 1902A to complete the scan. As previously described, the user device may determine whether to update the preferred path at any frequency or periodicity. In some example implementations, the user device may determine the update the number of waypoints a number of times during a scan.

Figure 22A:
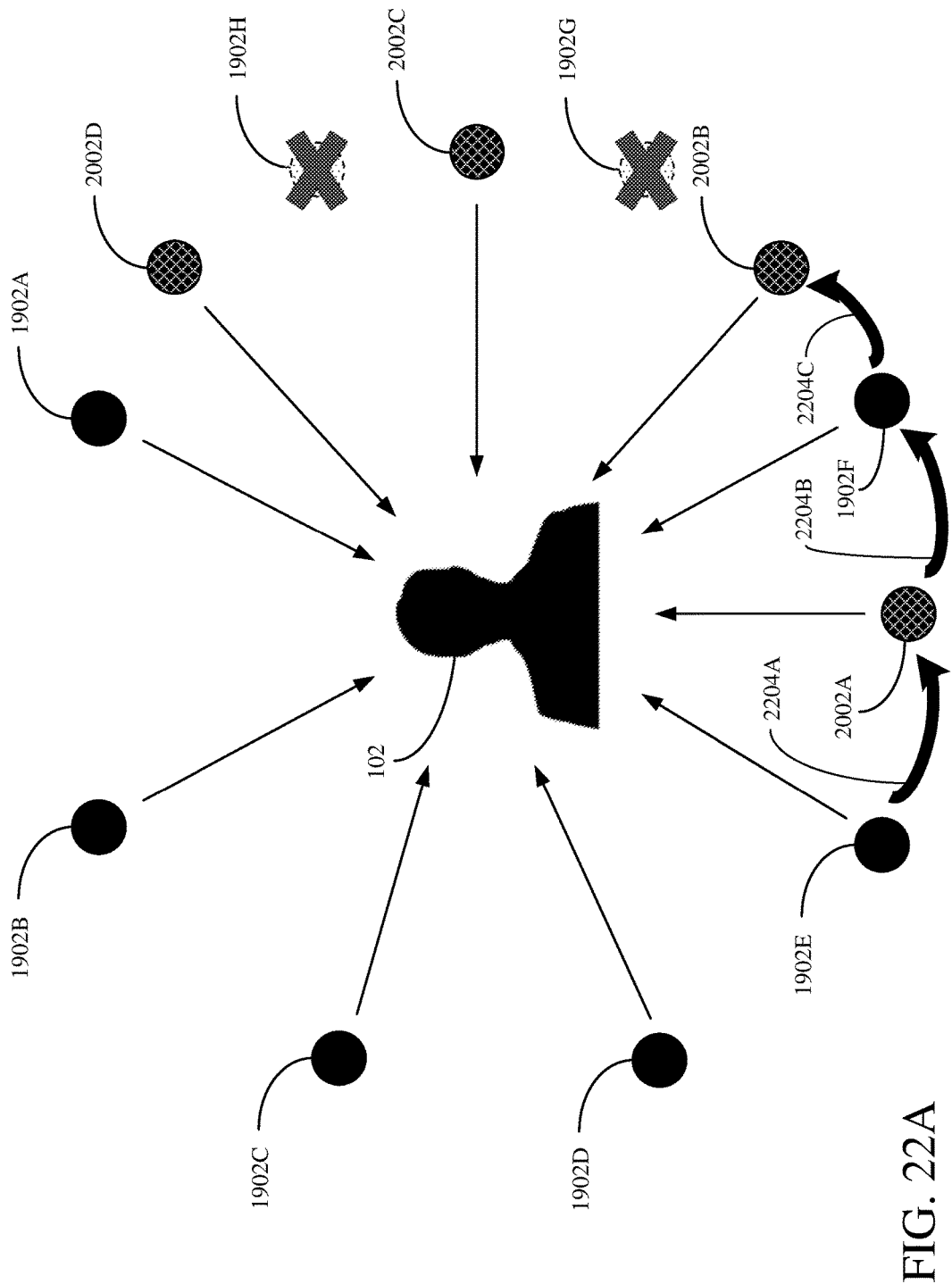
FIG. 22A is an illustration depicting further scanner movement between waypoints illustrated in FIG. 20 and decreasing the remaining number of waypoints during scanning based on the further scanner movement.

FIG. 22A is an illustration depicting further scanner movement 2204A-2204C between waypoints 1902E, 2002A, 1902F, and 2002B in the example illustrated in FIG. 20. The user device may continue the observe the scanner movement, thus observing the scanner movements 2204A-2204C long the previously adjusted scan path. The user device may determine that the scan quality is improving enough, or that the scanner movements are improving enough (such as from scanner movements 1904A-1904D in FIG. 19 to scanner movements 2204A-2204C in FIG. 22A), to decrease the remaining number of waypoints during scanning. Again, the user device may use thresholds to determine whether to again adjust the number of waypoints. In the example illustrated in FIG. 22A, the user device may determine to remove waypoints 1902G and 1902H, leaving waypoints 2002C and 2002D to be used in guiding the scanner along the readjusted path.

Over time, the user device may also adjust the thresholds, levels, or other processes used to determine when and the amount to adjust the number of waypoints. In some example implementations, multiple scans and scan models may be reviewed to determine if the user device should more frequently adjust the number of waypoints. For example, if the models consistently show holes after reducing the number of waypoints during the respective scans, the user device may determine to increase the required scan quality before removing waypoints.

Referring back to FIG. 18, in another aspect of updating the preferred path (1814), the user device may update the sequence and/or the location of the waypoints (1818). For example, if moving the scanner vertically is not as productive as moving the scanner horizontally (with respect to the horizon) for the user during scan (such as because of drift, shaking, and so on), the user device may update the sequence of waypoints so that the user moves the scanner along the preferred path more horizontally and less vertically. In another example, if a hole exists in the rendering on a distal side of the object from a light source, the user device may update the locations of waypoints to concentrate scanning on the distal side of the object as compared to the proximal side of the object from the light source. In another example, if multiple holes are located relatively close to one another, the user device may update the sequences and locations of waypoints to guide the user to efficiently direct the scanner among areas of the object associated with the holes in the rendering.

Figure 22B:
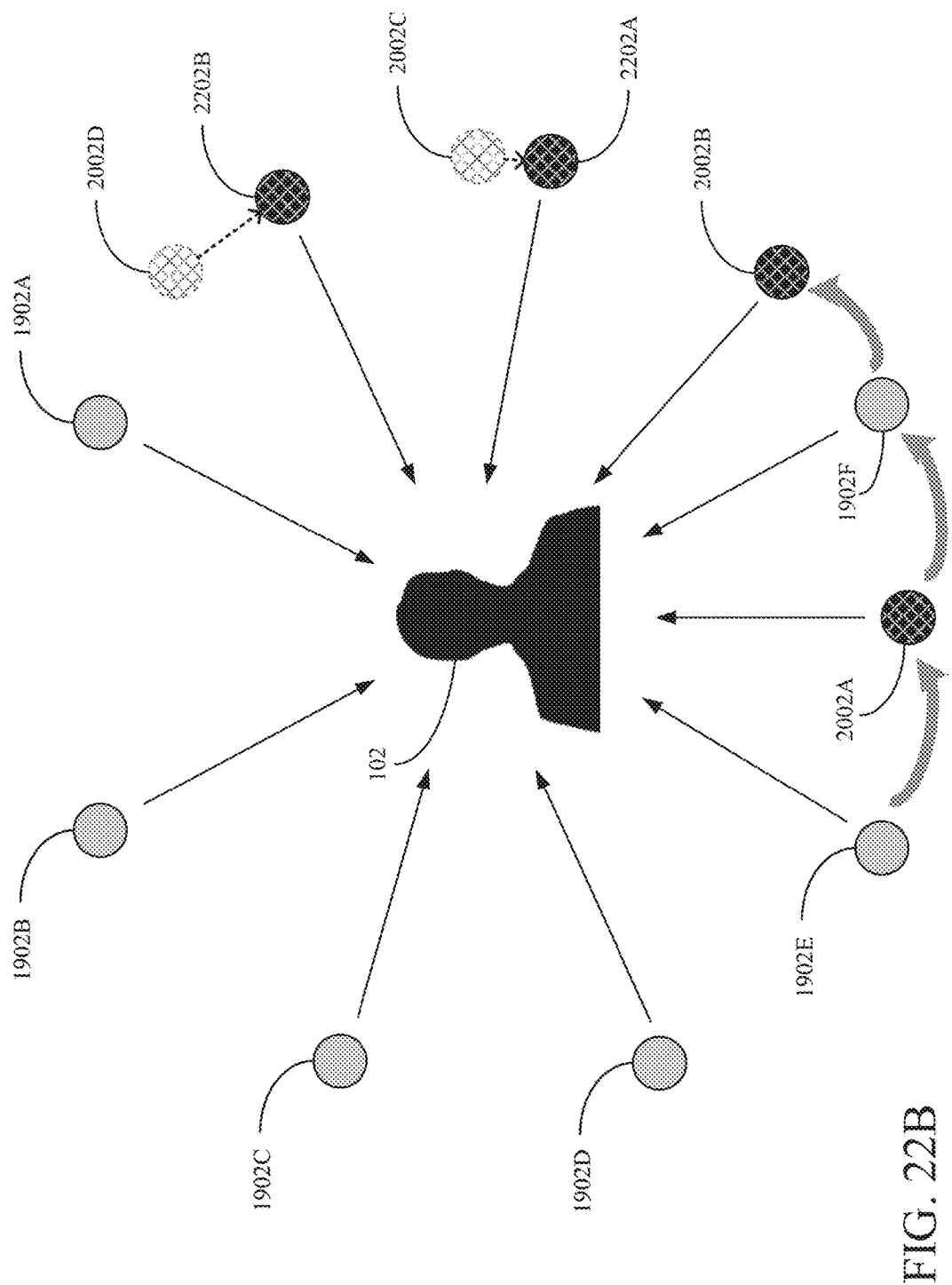
FIG. 22B is an illustration depicting adjusting the location of the remaining waypoints illustrated in FIG. 22A.

FIG. 22B is an illustration depicting adjusting the location of the remaining waypoints 2002C and 2002D in the example illustrated in FIG. 22A. In some example implementations, the user device may adjust the locations of the remaining waypoints in order to spread the waypoints evenly along the remaining portion of the preferred path. Additionally or alternatively, the user device may learn or determine where to place the remaining waypoints in order to increase the scan quality. For example, if a scan of object 102 indicates that the scan of one ear previously scanned should be improved, the user device may determine to place a waypoint in a location to direct the scanner specifically toward the other ear along the remaining path for scanning.

As illustrated in the example of FIG. 22B, the user device may adjust waypoint 2002C to be located at waypoint 2202A and adjust waypoint 2002D to be located at waypoint 2202B. The user device may then use waypoint 2202A and waypoint 2202B to guide the scanner along the remaining portion of the scan path. Updating the waypoints in updating the preferred path are further described below in describing the example flowchart in FIG. 23.

Referring back to FIG. 18, in a further aspect of updating the preferred path (1814), and if the user device supports displaying and automatically switching between multiple zoom levels on the GUI, the user device may optionally update when and how frequently to switch between zoom levels for displaying the rendering (or object) on the GUI (1820). For example, if the object includes areas of ornate carvings, facial features, or other aspects that may require additional scanning to sufficiently capture than provided using the preferred path at one zoom level, the user device may determine to zoom in one or more zoom levels on the GUI when the waypoints associated with those areas are to be passed along the preferred path. The user device may also determine when to zoom out, such as when the waypoints associated with the areas are passed or completed. In another example, if the user device determines that the scan is insufficient for certain areas of interest (such as the user is not paying sufficient attention to scanning the areas of interest), the user device may alter when to change zoom levels so as to bring attention to the user as to when such areas are to be scanned.

Holes in the rendering are described above as one factor that may be used in adjusting the preferred path. Additionally or alternatively, inconsistent scan data may also be used by the user device to determine if the preferred path is to be updated (such as to rescan portions of the object for where conflicting data was collected). For example, if an area of the object is first scanned to be at a first depth, but again scanned to be at a different depth, the user device may determine that the area should be rescanned to verify which depth is correct.

Figure 23:
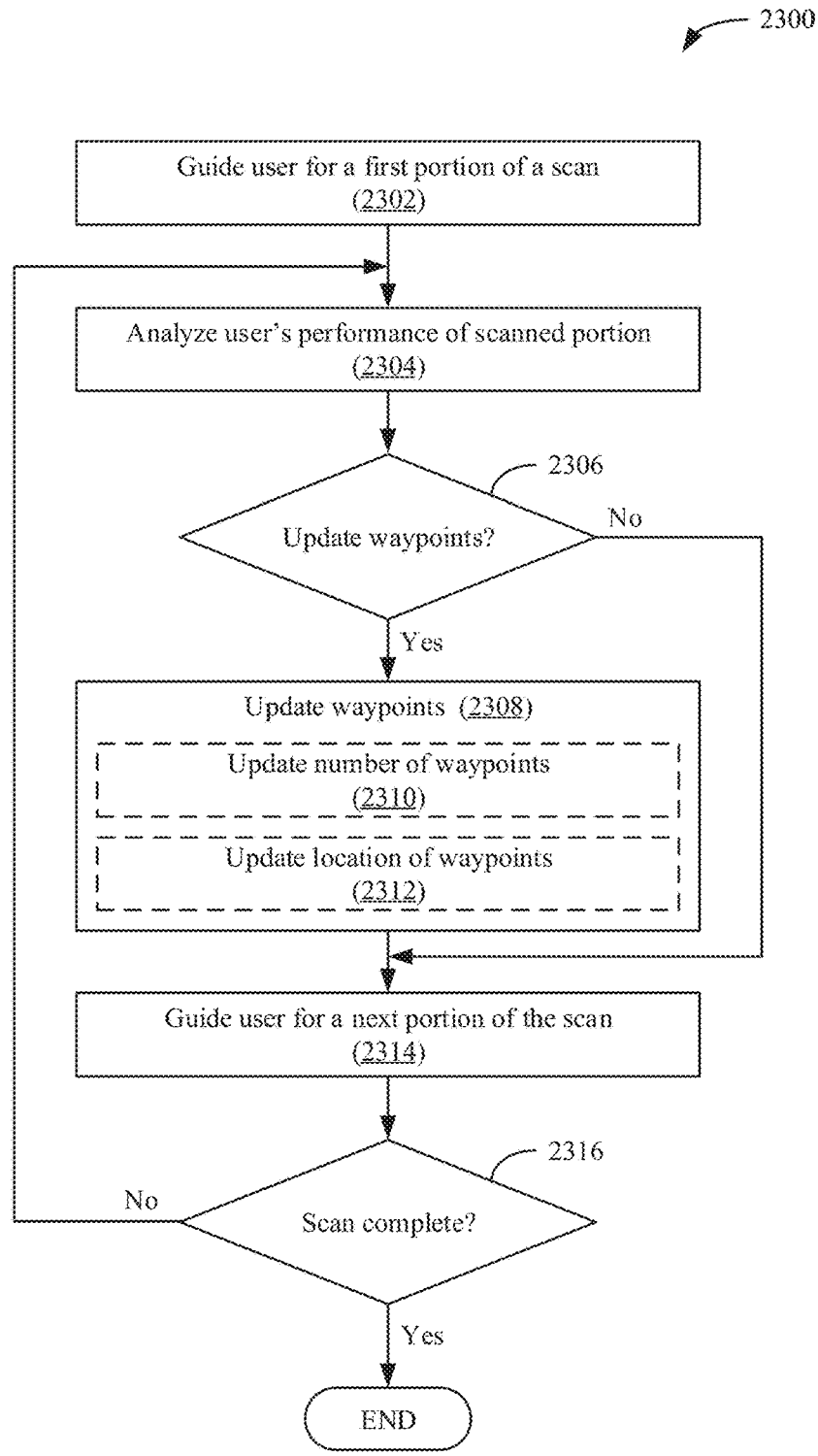
FIG. 23 is an illustrative flow chart depicting an example operation for a user device to determine and update the waypoints during a scan, in accordance with some aspects of the present disclosure.

FIG. 23 is an illustrative flow chart depicting an example operation 2300 for a user device to determine and update the waypoints during a scan, in accordance with some aspects of the present disclosure. Portions of example operation 2300 may be used in place of or additional to portions of example operation 1800 illustrated in FIG. 18. The user device may guide a user to move the scanner along a first portion of a scan path (2302). In some example implementations, the length of the first portion is fixed or related to the visual boundary or object type. In some further example implementations, the first portion is a minimum length in order to provide a minimum amount of scan data for observation to the user device. However, the user device may adjust the first portion dependent on, e.g., the type of object being scanned, the current speed of moving the scanner, current observed habits in moving the scanner, and so on.

The user device may analyze the user's performance for the scanned portion (2304) to determine if the waypoints are to be updated. For example, the user device may determine if the scanner motion exhibits good or bad habits in movement. The user device may also determine the current scan quality. From the analysis, if the waypoints are not to be updated (2306), then the user device guides the user to move the scanner along a next portion of the preferred path (2314). If the user device determines that the waypoints are to be adjusted (2306), the user device proceeds to update the waypoints (2308). As previously described, the user device may optionally update the number of waypoints (2310). Additionally or alternatively, the user device may optionally update the location of the waypoints (2312). With the waypoints updated, the user device may guide the user to move the scanner along the updated preferred path of a next portion (2314).

If the scan is complete after the next portion (2316), then the scan ends and the user device may stop guiding the user. If the scan is not complete after the next portion (2316), then the user device may again analyze the user's performance for the recently scanned portion (2304) to determine if the remaining waypoints are to be updated. The process of scanning and reviewing the scanned portions may continue until the scan is complete. While the term "portion" is used for traversing a part of the scan path, portions do not need to be the same length, frequency, amount of time, or otherwise related to one another. The user device may determine at any point when to end a portion before updating the waypoints.

While the above described examples and aspects of the present disclosure include a user being guided to move a scanner along a preferred path, aspects of the present disclosure may also be used for scanners in other scenarios and environments. For example, the scanner may be mounted to an unmanned vehicle (such as an Unmanned Aerial Vehicle, drone, and so on). Therefore, if the scanner is attached to, for example, a drone, the user device may guide the drone along the preferred path for scanning an object. For example, to guide the drone in maneuvering the scanner along a preferred path, the user device may provide navigation commands to the drone in order to pilot the drone along the preferred scan path. Therefore, instead of assisting a user in scanning an object, the user device commands the movements of a drone with the scanner in order to scan the object.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as memory 232 in FIG. 2) comprising instructions (292) that, when executed by one or more processors (210), performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the examples disclosed herein may be executed by one or more processors, such as processor 210 in FIG. 2. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. For example, while the bounding box is described as box displayed in a GUI, the bounding box may be any shape, such as a sphere, polygon, user defined shape, and so on. Additionally, the functions, steps or actions of the method claims in accordance with aspects described herein need not be performed in any particular order unless expressly stated otherwise. For example, 1804-1810 in FIG. 18, if performed by the user device, may be performed in any order and at any frequency. Furthermore, although elements may be described or claimed in the singular, the plural is contemplated unless limitation to the singular is explicitly stated. For example, while one path is described for moving the scanner, the scanner may travel a sequence of paths or the user device may provide a plurality of possible paths to allow the user to select which to traverse at the moment. Therefore, updating a preferred path may include updating more than one path. Accordingly, the disclosure is not limited to the illustrated examples and any means for performing the functionality described herein are included in aspects of the disclosure.

What is claimed is:

1. A user device to assist with three dimensional scanning of an object, comprising:
   a processor;
   a scanner coupled to the processor and configured to perform a three dimensional scan of the object;
   a display to display a graphical user interface (GUI), the display coupled to the processor;
   a memory coupled to the processor and the display, the memory including one or more instructions that when executed by the processor cause the GUI to:
   display a target marker for the object being scanned;
   display a visual boundary;
   display a first scanner position marker, located on the visual boundary, the first scanner position marker indicating an orientation of the scanner and a preferred position of the scanner in relation to the target marker; and
   display a sight to assist a user to move the scanner to the preferred position,
   wherein the sight extends from the visual boundary along the orientation of the scanner.

2. The user device of claim 1, wherein the one or more instructions when executed by the processor further cause the GUI to:
   display a scanner marker to assist a user to orient the scanner relative to the target marker.

3. The user device of claim 1, wherein the one or more instructions when executed by the processor further cause the GUI to:
   superimpose at least a portion of the first scanner position marker and at least a portion of the target marker when the scanner is at the preferred position.

4. The user device of claim 3, wherein:
   the visual boundary is used to define, for the object, a scan path for moving the scanner.

5. The user device of claim 4, wherein the one or more instructions when executed by the processor further cause the user device to determine the visual boundary based on at least one from the group consisting of:
   type of object being scanned; and
   contours of the object being scanned.

6. The user device of claim 5, wherein the memory stores a plurality of predefined visual boundaries, and wherein the one or more instructions when executed by the processor further cause the user device to:
   determine the type of object being scanned; and
   select the visual boundary from the stored plurality of predefined visual boundaries based on the determination.

7. The user device of claim 4, wherein the one or more instructions when executed by the processor further cause the GUI to:
   upon the at least portion of the target marker and the at least portion of the first scanner position marker being superimposed, display a second scanner position marker at a new location, on the visual boundary, indicating a new preferred position of the scanner in relation to the target marker.

8. The user device of claim 7, wherein the second scanner position marker is the first scanner position marker, and the one or more instructions when executed by the processor further cause the GUI to:
move the first scanner position marker along a portion of the scan path to the new location, wherein the portion of the scan path indicates a desired path for moving the scanner from the preferred position to the new preferred position.

9. The user device of claim 7, wherein the one or more instructions when executed by the processor further cause:
the GUI to display a first portion of a plurality of scanner position markers in a determined sequence to assist moving the scanner along the scan path; and
the user device to adjust a second portion of the plurality of scanner position markers based on information from a current scan while displaying the first portion, including adjusting at least one from the group consisting of:
a quantity of the plurality of scanner position markers;
the determined sequence for displaying scanner position markers; and
a location, on the visual boundary, of one or more of the plurality of scanner position markers.

10. The user device of claim 9, wherein adjusting the second portion is further based on user information from prior scans.

11. The user device of claim 1, wherein the one or more instructions when executed by the processor further cause the GUI to display, during the three dimensional scan, a rendering of the object from collected scan information.

12. The user device of claim 11, wherein the one or more instructions when executed by the processor further cause:
the user device to determine that an actual background for the object is similar to the object being scanned; and
the GUI to display a rendered background altered from the actual background to assist a user to distinguish the object from the actual background during scanning.

13. The user device of claim 11, wherein the one or more instructions when executed by the processor further cause the GUI to zoom into a portion of the rendering of the object to assist a user to scan a portion of the object associated with the portion of the rendering.

14. A method for performing a three dimensional scan of an object by a user device including a scanner, comprising:
displaying, on a display of the user device, a graphical user interface (GUI) to assist with scanning the object, comprising:
displaying a target marker for the object being scanned;
displaying a visual boundary;
displaying a first scanner position marker, located on the visual boundary, the first scanner position marker indicating an orientation of the scanner and a preferred position of the scanner in relation to the target marker; and
displaying a sight to assist a user to move the scanner to the preferred position, the sight extending from the visual boundary along the orientation of the scanner.

15. The method of claim 14, wherein displaying the GUI further comprises:
superimposing at least a portion of the first scanner position marker and at least a portion of the target position marker when the scanner is at the preferred position.

16. The method of claim 15, wherein
the visual boundary is used to define, for the object, a scan path for moving the scanner.

17. The method of claim 16, further comprising:
determining, by the user device, the visual boundary based on at least one from the group consisting of:
type of object being scanned; and
contours of the object being scanned.

18. The method of claim 17, further comprising:
storing, in a memory, a plurality of predefined visual boundaries;
determining the type of object being scanned; and
selecting the visual boundary from the stored plurality of predefined visual boundaries based on the determination.

19. The method of claim 16, wherein displaying the GUI further comprises:
upon the at least portion of the target marker and the at least portion of the first scanner position marker being superimposed, displaying a second scanner position marker at a new location, on the visual boundary, indicating a new preferred position of the scanner in relation to the target marker.

20. The method of claim 16, further comprising:
displaying, in the GUI, a first portion of a plurality of scanner position markers in a determined sequence to assist moving the scanner along the scan path; and
adjusting, by the user device, a second portion of the plurality of scanner position markers based on information from a current scan while displaying the first portion, including adjusting at least one from the group consisting of:
a quantity of the plurality of scanner position markers;
the determined sequence for displaying scanner position markers; and
a location, on the visual boundary, of one or more of the plurality of scanner position markers.

21. The method of claim 14, wherein displaying the GUI further comprises:
displaying a rendering of the object from scan information collected during scanning.

22. The method of claim 21, wherein displaying the GUI further comprises:
zooming into a portion of the rendering of the object to assist a user to scan a portion of the object associated with the portion of the rendering.

23. A non-transitory computer-readable storage medium storing one or more programs containing instructions that, when executed by one or more processors of a user device using a scanner to perform a three dimensional scan of an object, cause the user device to perform operations comprising:
displaying, on a display of the user device, a graphical user interface (GUI) to assist with scanning the object, comprising:
displaying a target marker for the object being scanned;
displaying a visual boundary;
displaying a first scanner position marker, located on the visual boundary, the first scanner position marker indicating an orientation of the scanner and a preferred position of the scanner in relation to the target marker, wherein at least a portion of the first scanner position marker and at least a portion of the target marker are superimposed when the scanner is at the preferred position;

displaying a sight to assist a user to move the scanner to the preferred position, the sight extending from the visual boundary along the orientation of the scanner;

wherein:

the visual boundary is used to define, for the object, a scan path for moving the scanner; and upon the at least portion of the target marker and the at least portion of the first scanner position marker being superimposed, displaying a second scanner position marker at a new location, on the visual boundary, indicating a new preferred position of the scanner in relation to the target marker.

24. The non-transitory computer-readable storage medium of claim 23, wherein execution of the instructions causes the user device to perform operations further comprising:

determining a type of object being scanned; and selecting, based on the determination, the visual boundary from a plurality of predefined visual boundaries.

25. The non-transitory computer-readable storage medium of claim 23, wherein execution of the instructions causes the user device to perform operations further comprising:

displaying, in the GUI, a first portion of a plurality of scanner position markers in a determined sequence to assist moving the scanner along the scan path; and adjusting a second portion of the plurality of scanner position markers based on information from a current scan while displaying the first portion, wherein adjusting the second portion includes adjusting at least one from the group consisting of:

a quantity of the plurality of scanner position markers;

the determined sequence for displaying scanner position markers; and a location, on the visual boundary, of one or more of the plurality of scanner position markers.

26. The non-transitory computer-readable storage medium of claim 23, wherein execution of the instructions causes the user device to perform operations further comprising:

displaying a rendering of the object from scan information collected during scanning.

27. The non-transitory computer-readable storage medium of claim 26, wherein execution of the instructions causes the user device to perform operations further comprising:

zooming, in the GUI, into a portion of the rendering of the object to assist a user to scan a portion of the object associated with the portion of the rendering.

* * * * *